(12) United States Patent
Bunandar et al.

(10) Patent No.: US 12,373,687 B2
(45) Date of Patent: Jul. 29, 2025

(54) MACHINE LEARNING MODEL TRAINING USING AN ANALOG PROCESSOR

(71) Applicant: Lightmatter, Inc., Boston, MA (US)

(72) Inventors: Darius Bunandar, Boston, MA (US); Ludmila Levkova, Chevy Chase, MD (US); Nicholas Dronen, Newton, MA (US); Lakshmi Nair, Somerville, MA (US); David Widemann, Danville, CA (US); David Walter, Boston, MA (US); Martin B. Z. Forsythe, Jamaica Plain, MA (US); Tomo Lazovich, Cambridge, MA (US); Ayon Basumallik, Framingham, MA (US); Nicholas C. Harris, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 913 days.

(21) Appl. No.: 17/537,156

(22) Filed: Nov. 29, 2021

(65) Prior Publication Data

US 2022/0172052 A1 Jun. 2, 2022

Related U.S. Application Data

(60) Provisional application No. 63/160,592, filed on Mar. 12, 2021, provisional application No. 63/119,472, filed on Nov. 30, 2020.

(51) Int. Cl.
*G06N 3/06* (2006.01)
*G06F 7/487* (2006.01)
(Continued)

(52) U.S. Cl.
CPC ............. *G06N 3/08* (2013.01); *G06F 7/4876* (2013.01); *G06N 3/065* (2023.01)

(58) Field of Classification Search
CPC .......... G06N 3/065; G06N 3/08; G06F 7/4876
See application file for complete search history.

(56) References Cited

U.S. PATENT DOCUMENTS 3,872,293 A 3/1975 Green
4,567,569 A 1/1986 Caulfield et al.
(Continued)

FOREIGN PATENT DOCUMENTS

CN 101630178 A 1/2010
CN 106814924 A 6/2017
(Continued)

OTHER PUBLICATIONS

Verhoef, Bram-Ernst, et al. "Fq-conv: Fully quantized convolution for efficient and accurate inference." arXiv preprint arXiv:1912. 09356 (2019). (Year: 2019).*
(Continued)

*Primary Examiner* — Hal Schnee
(74) *Attorney, Agent, or Firm* — Wolf, Greenfield & Sacks, P.C.

(57) ABSTRACT

Described herein are techniques of training a machine learning model and performing inference using an analog processor. Some embodiments mitigate the loss in performance of a machine learning model resulting from a lower precision of an analog processor by using an adaptive block floating-point representation of numbers for the analog processor. Some embodiments mitigate the loss in performance of a machine learning model due to noise that is present when using an analog processor. The techniques involve training the machine learning model such that it is robust to noise.

26 Claims, 21 Drawing Sheets

(51) Int. Cl.
*G06N 3/065* (2023.01)
*G06N 3/08* (2023.01)

(56) References Cited

U.S. PATENT DOCUMENTS

| | | |
|---|---|---|
| 4,607,344 A | 8/1986 | Athale et al. |
| 4,633,428 A | 12/1986 | Byron |
| 4,686,646 A | 8/1987 | Goutzoulis |
| 4,739,520 A | 4/1988 | Collins, Jr. et al. |
| 4,809,204 A | 2/1989 | Dagenais et al. |
| 4,849,940 A | 7/1989 | Marks, II et al. |
| 4,877,297 A | 10/1989 | Yeh |
| 4,948,212 A | 8/1990 | Cheng et al. |
| 5,004,309 A | 4/1991 | Caulfield et al. |
| 5,077,619 A | 12/1991 | Toms |
| 5,095,459 A | 3/1992 | Ohta et al. |
| 5,333,117 A | 7/1994 | Ha et al. |
| 5,383,042 A | 1/1995 | Robinson |
| 5,394,257 A | 2/1995 | Horan et al. |
| 5,428,711 A | 6/1995 | Akiyama et al. |
| 5,495,356 A | 2/1996 | Sharony et al. |
| 5,550,993 A | 8/1996 | Ehlig et al. |
| 5,576,873 A | 11/1996 | Crossland et al. |
| 5,640,261 A | 6/1997 | Ono |
| 5,699,449 A | 12/1997 | Javidi |
| 5,784,309 A | 7/1998 | Budil |
| 5,953,143 A | 9/1999 | Sharony et al. |
| 5,995,748 A | 11/1999 | Guttag et al. |
| 6,005,998 A | 12/1999 | Lee |
| 6,060,710 A | 5/2000 | Carrieri et al. |
| 6,178,020 B1 | 1/2001 | Schultz et al. |
| 6,728,434 B2 | 4/2004 | Flanders |
| 7,136,587 B1 | 11/2006 | Davis et al. |
| 7,173,272 B2 | 2/2007 | Ralph |
| 7,536,431 B2 | 5/2009 | Goren et al. |
| 7,660,533 B1 | 2/2010 | Meyers et al. |
| 7,876,248 B2 | 1/2011 | Berkley et al. |
| 7,985,965 B2 | 7/2011 | Barker et al. |
| 8,018,244 B2 | 9/2011 | Berkley |
| 8,023,828 B2 | 9/2011 | Beausoleil et al. |
| 8,026,837 B1 | 9/2011 | Valley et al. |
| 8,027,587 B1 | 9/2011 | Watts |
| 8,035,540 B2 | 10/2011 | Berkley et al. |
| 8,129,670 B2 | 3/2012 | Laycock et al. |
| 8,190,553 B2 | 5/2012 | Routt |
| 8,223,414 B2 | 7/2012 | Goto |
| 8,386,899 B2 | 2/2013 | Goto et al. |
| 8,560,282 B2 | 10/2013 | Macready et al. |
| 8,604,944 B2 | 12/2013 | Berkley et al. |
| 8,620,855 B2 | 12/2013 | Bonderson |
| 8,700,184 B2 | 4/2014 | Latham et al. |
| 8,837,544 B2 | 9/2014 | Santori |
| 9,009,560 B1 | 4/2015 | Matache et al. |
| 9,250,391 B2 | 2/2016 | McLaughlin et al. |
| 9,354,039 B2 | 5/2016 | Mower et al. |
| 9,513,276 B2 | 12/2016 | Tearney et al. |
| 9,791,258 B2 | 10/2017 | Mower |
| 10,095,262 B2 | 10/2018 | Valley et al. |
| 10,268,232 B2 | 4/2019 | Harris et al. |
| 10,359,272 B2 | 7/2019 | Mower et al. |
| 10,382,139 B2 | 8/2019 | Rosenhouse et al. |
| 10,534,189 B2 | 1/2020 | Miller |
| 10,803,258 B2 | 10/2020 | Kenney et al. |
| 10,803,259 B2 | 10/2020 | Kenney et al. |
| 11,023,691 B2 | 6/2021 | Kenney et al. |
| 11,775,779 B2 | 10/2023 | Kenney et al. |
| 11,886,942 B2 | 1/2024 | Kenney et al. |
| 2003/0086138 A1 | 5/2003 | Pittman et al. |
| 2003/0235363 A1 | 12/2003 | Pfeiffer |
| 2003/0235413 A1 | 12/2003 | Cohen et al. |
| 2004/0243657 A1 | 12/2004 | Goren et al. |
| 2005/0036786 A1 | 2/2005 | Ramachandran et al. |
| 2005/0156775 A1 | 7/2005 | Petre et al. |
| 2006/0215949 A1 | 9/2006 | Lipson et al. |
| 2007/0180586 A1 | 8/2007 | Amin |
| 2008/0031566 A1 | 2/2008 | Matsubara et al. |
| 2008/0212186 A1 | 9/2008 | Zoller et al. |
| 2008/0212980 A1 | 9/2008 | Weiner |
| 2008/0273835 A1 | 11/2008 | Popovic |
| 2008/0304600 A1 | 12/2008 | Bottomley |
| 2009/0028554 A1 | 1/2009 | Anderson et al. |
| 2010/0165432 A1 | 7/2010 | Laycock et al. |
| 2010/0194956 A1 | 8/2010 | Yuan et al. |
| 2010/0215365 A1 | 8/2010 | Fukuchi |
| 2013/0011093 A1 | 1/2013 | Goh et al. |
| 2013/0121706 A1 | 5/2013 | Yang et al. |
| 2014/0003761 A1 | 1/2014 | Dong |
| 2014/0032635 A1 | 1/2014 | Pimmel et al. |
| 2014/0056585 A1 | 2/2014 | Qian et al. |
| 2014/0241657 A1 | 8/2014 | Manouvrier |
| 2014/0299743 A1 | 10/2014 | Miller |
| 2015/0354938 A1 | 12/2015 | Mower et al. |
| 2015/0382089 A1 | 12/2015 | Mazed |
| 2016/0103281 A1 | 4/2016 | Matsumoto |
| 2016/0112129 A1 | 4/2016 | Chang |
| 2016/0118106 A1 | 4/2016 | Yoshimura et al. |
| 2016/0162781 A1 | 6/2016 | Lillicrap et al. |
| 2016/0162798 A1 | 6/2016 | Marandi et al. |
| 2016/0182155 A1 | 6/2016 | Taylor et al. |
| 2016/0245639 A1 | 8/2016 | Mower et al. |
| 2016/0301478 A1 | 10/2016 | Luo et al. |
| 2016/0352515 A1 | 12/2016 | Bunandar et al. |
| 2017/0031101 A1 | 2/2017 | Miller |
| 2017/0201813 A1 | 7/2017 | Sahni |
| 2017/0237505 A1 | 8/2017 | Lucamarini et al. |
| 2017/0285373 A1 | 10/2017 | Zhang et al. |
| 2017/0351293 A1 | 12/2017 | Carolan et al. |
| 2017/0372202 A1 | 12/2017 | Ginsburg et al. |
| 2018/0004708 A1 | 1/2018 | Muralimanohar et al. |
| 2018/0081388 A1 | 3/2018 | Kielpinski et al. |
| 2018/0107237 A1 | 4/2018 | Andregg et al. |
| 2018/0274900 A1 | 9/2018 | Mower et al. |
| 2018/0293208 A1 | 10/2018 | Gokmen et al. |
| 2018/0323825 A1 | 11/2018 | Cioffi et al. |
| 2018/0335574 A1 | 11/2018 | Steinbrecher et al. |
| 2018/0373902 A1 | 12/2018 | Muralimanohar et al. |
| 2019/0110084 A1 | 4/2019 | Jia et al. |
| 2019/0346685 A1 | 11/2019 | Miller |
| 2019/0354894 A1 | 11/2019 | Lazovich et al. |
| 2019/0356394 A1 | 11/2019 | Bunandar et al. |
| 2019/0370644 A1 | 12/2019 | Kenney et al. |
| 2019/0372589 A1 | 12/2019 | Gould et al. |
| 2020/0117997 A1 | 4/2020 | Yao et al. |
| 2020/0133994 A1 | 4/2020 | Chatterjee et al. |
| 2020/0150923 A1 | 5/2020 | Muralimanohar et al. |
| 2020/0211649 A1 | 7/2020 | Park |
| 2020/0226454 A1* | 7/2020 | Cambier ............... G06N 3/049 |
| 2020/0272794 A1 | 8/2020 | Kenney et al. |
| 2020/0272795 A1 | 8/2020 | Kenney et al. |
| 2020/0380217 A1 | 12/2020 | Kenney et al. |
| 2021/0064958 A1* | 3/2021 | Lin ........................ G02F 1/313 |
| 2021/0279432 A1 | 9/2021 | Kenney et al. |
| 2022/0100973 A1 | 3/2022 | Kenney et al. |
| 2022/0172052 A1 | 6/2022 | Bunandar et al. |
| 2023/0110047 A1 | 4/2023 | Bunandar |
| 2023/0177284 A1 | 6/2023 | Bunandar et al. |
| 2024/0193410 A1* | 6/2024 | Shen ...................... G02F 3/024 |

FOREIGN PATENT DOCUMENTS

| | | |
|---|---|---|
| CN | 107408103 | 11/2017 |
| CN | 108475348 | 8/2018 |
| CN | 108780492 | 11/2018 |
| JP | 2019-003546 A | 1/2019 |
| TW | 201815196 A | 4/2018 |
| WO | WO 2005/029404 A2 | 3/2005 |
| WO | WO 2006/023067 A2 | 3/2006 |
| WO | WO 2008/069490 A1 | 6/2008 |
| WO | 2017/127086 A1 | 7/2017 |
| WO | WO 2018/098230 A1 | 5/2018 |
| WO | WO 2019/217835 A1 | 11/2019 |

(56) References Cited

OTHER PUBLICATIONS

OTHER PUBLICATIONS

Fan, Hongxiang, et al. "Static block floating-point quantization for convolutional neural networks on FPGA." 2019 International Conference on Field-Programmable Technology (ICFPT). IEEE, 2019. (Year: 2019).*
International Preliminary Report on Patentability for International Application No. PCT/US2020/019747, mailed Sep. 10, 2021.
International Search Report and Written Opinion for International Application No. PCT/US19/32181 mailed Sep. 23, 2019.
International Search Report and Written Opinion for International Application No. PCT/US2019/032272 mailed Sep. 4, 2019.
International Search Report and Written Opinion for International Application No. PCT/US2020/019747, mailed Jul. 2, 2020.
International Search Report and Written Opinion from International Application No. PCT/US2015/034500, dated Mar. 15, 2016, 7 pages.
Invitation to Pay Additional Fees for International Application No. PCT/US19/32181 mailed Jul. 23, 2019.
Invitation to Pay Additional Fees for International Application No. PCT/US2019/032272 mailed Jun. 27, 2019.
Invitation to Pay Additional Fees for International Application No. PCT/US2020/019747 mailed Apr. 30, 2020.
[No Author Listed], Optical Coherent Receiver Analysis. 2009 Optiwave Systems, Inc. 16 pages. URL:https://dru5cjyjifvrg.cloudfront.net/wp-content/uploads/2017/03/OptiSystem-Applications-Coherent-Receiver-Analysis.pdf [retrieved on Aug. 17, 2019].
[No Author Listed], Training with Mixed Precision. User Guide. Nvidia. Jan. 2020. 43 pages.
Aaronson et al., Computational complexity of linear optics. Proceedings of the 43rd Annual ACM Symposium on Theory of Computing. 2011. 101 pages. ISBN 978-1-4503-0691-1.
Abu-Mostafa et al., Optical neural computers. Scientific American. 1987:88-95.
Albert et al., Statistical mechanics of com-plex networks. Reviews of Modern Physics. 2002;(74):47-97.
Almeida et al., All-optical control of light on a silicon chip. Nature. 2004;431:1081-1084.
Amir et al., Classical diffusion of a quantum particle in a noisy environment. Physical Review E. 2009;79. 5 pages. DOI: 10.1103/PhysRevE.79.050105.
Amit et al., Spin-glass models of neural networks. Physical Review A. 1985;32(2):1007-1018.
Anitha et al., Comparative Study of High performance Braun's multiplier using FPGAs. IOSR Journal of Electronics and Communication Engineering (IOSRJECE). 2012;1:33-37.
Appeltant et al., Information processing using a single dynamical node as complex system. Nature Communications. 2011. 6 pages. DOI: 10.1038/ncomms1476.
Arjovsky et al., Unitary Evolution Recurrent Neural Networks. arXiv:1511.06464. 2016. 9 pages.
Aspuru-Guzik et al., Photonic quantum simulators. Nature Physics. 2012;8:285-291. Doi: 10.1038/NPHYS2253.
Aspuru-Guzik et al., Simulated Quantum Computation of Molecular Energies. Science. 2005;309:1704-7.
Atabaki et al., Integrating photonics with silicon nanoelectronics for the next generation of systems on a chip. Nature. 2018;556(7701):349-354. 10 pages. DOI: 10.1038/s41586-018-0028-z.
Baehr-Jones et al., A 25 GB/s Silicon Photonics Platform. arXiv:1203.0767. 2012. 11 pages.
Bao et al., Atomic-Layer Graphene as a Saturable Absorber for Ultrafast Pulsed Lasers. 24 pages. 2009.
Bao et al., Monolayer graphene as a saturable absorber in a mode-locked laser. Nano Research. 2011;4:297-307. DOI: 10.1007/s12274-010-0082-9.
Barahona, On the computational complexity of Ising spin glass models. Journal of Physics A: Mathematical and General. 1982;15:3241-3253.
Bertsimas et al., Robust optimization with simulated annealing. Journal of Global Optimization. 2010;48:323-334. DOI 10.1007/s10898-009-9496-x.
Bewick, Fast multiplication: algorithms and implementation. Ph.D. thesis, Stanford University (1994). 170 pages.
Bonneau et al., Quantum interference and manipulation of entanglement in silicon wire waveguide quantum circuits. New Journal of Physics. 2012;14:045003. 13 pages. DOI: 10.1088/1367-2630/14/4/045003.
Brilliantov, Effective magnetic Hamiltonian and Ginzburg criterion for fluids. Physical Review E. 1998;58:2628-2631.
Bromberg et al., Bloch oscillations of path-entangled photons. Physical Review Letters. 2010;105:263604-1-2633604-4. 4 pages. DOI: 10.1103/PhysRevLett.105.263604.
Bromberg et al., Quantum and Classical Correlations in Waveguide Lattices. Physical Review Letters. 2009;102:253904-1-253904-4. 4 pages. DOI: 10.1103/PhysRevLett.102.253904.
Broome et al., Photonic Boson Sampling in a Tunable Circuit. Science. 2012;339:794-8.
Bruck et al., On the power of neural networks for solving hard problems. American Institute of Physics. 1988. pp 137-143. 7 pages.
Canziani et al., Evaluation of neural network architectures for embedded systems. Circuits and Systems (ISCAS). 2017 IEEE International Symposium. 4 pages.
Cardenas et al., Low loss etchless silicon photonic waveguides. Optics Express. 2009;17(6):4752-4757.
Carolan et al., Universal linear optics. Science. 2015;349:711-716.
Caves, Quantum-mechanical noise in an interferometer. Physical Review D. 1981;23(8):1693-1708. 16 pages.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8×8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2×2 optical switch for photonic networks-on-chip. Optics Express. 2014;22(10);12614-12627. DOI: 10.1364/OE.22.012614.
Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Courbariaux et al., Training Deep Neural Networks with Low Precision Multiplications. arXiv:1412.7024v5. Sep. 23, 2015. 10 pages.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.

(56) References Cited

OTHER PUBLICATIONS

Dai et al., Novel concept for ultracompact polarization splitter-rotator based on silicon nanowires. Optics Express. 2011;19(11):10940-9.

De Sa et al., High-Accuracy Low-Precision Training. arXiv:1803.03383v1. Mar. 9, 2018. 22 pages.

Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.

Drumond et al., Training DNNs with hybrid block floating point. arXiv preprint arXiv:1804.01526v4. Dec. 2, 2018. 11 pages.

Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.

Esser et al., Convolutional networks for fast, energy-efficient neuromorphic computing. Proceedings of the National Academy of Sciences. 2016; 113(41):11441-11446.

Farhat et al., Optical implementation of the Hopfield model. Applied Optics. 1985;24(10):1469-1475.

Feinberg et al., Making memristive neural network accelerators reliable. IEEE International Symposium on High Performance Computer Architecture (HPCA). 2018. pp52-65. DOI 10.1109/HPCA.2018.00015.

Fushman et al., Controlled Phase Shifts with a Single Quantum Dot. Science. 2008;320:769- 772. DOI: 10.1126/science.1154643.

George et al., A programmable and configurable mixed-mode FPAA SoC. IEEE Transactions on Very Large Scale Integration (VLSI) Systems. 2016;24:2253-2261.

Gilmer et al., Neural message passing for quantum chemistry. arXiv preprint arXiv:1704.01212. Jun. 2017. 14 pages.

Golub et al., Calculating the singular values and pseudo-inverse of a matrix. Journal of the Society for Industrial and Applied Mathematics Series B Numerical Analysis. 1965;2(2):205-224.

Graves et al., Hybrid computing using a neural network with dynamic external memory. Nature. 2016;538. 21 pages. DOI:10.1038/nature20101.

Grote et al., First long-term application of squeezed states of light in a gravitational-wave observatory. Physical Review Letter. 2013;110:181101. 5 pages. DOI: 10.1103/PhysRevLett.110.181101.

Gruber et al., Planar-integrated optical vector-matrix multiplier. Applied Optics. 2000;39(29):5367-5373.

Gullans et al., Single-Photon Nonlinear Optics with Graphene Plasmons. Physical Review Letter. 2013;111:247401-1-247401-5. DOI: 10.1103/PhysRevLett.111.247401.

Gunn, CMOS photonics for high-speed interconnects. IEEE Micro. 2006;26:58-66.

Haffner et al., Low-loss plasmon-assisted electro-optic modulator. Nature. 2018;556:483-486. 17 pages. DOI: 10.1038/s41586-018-0031-4.

Halasz et al., Phase diagram of QCD. Physical Review D. 1998;58:096007. 11 pages.

Hamerly et al., Scaling advantages of all-to-all connectivity in physical annealers: the Coherent Ising Machine vs. D-Wave 2000Q. arXiv preprints, May 2018. 17 pages.

Harris et al. Efficient, Compact and Low Loss Thermo-Optic Phase Shifter in Silicon. Optics Express. 2014;22(9);10487-93. DOI:10.1364/OE.22.010487.

Harris et al., Bosonic transport simulations in a large-scale programmable nanophotonic processor. arXiv:1507.03406. 2015. 8 pages.

Harris et al., Integrated source of spectrally filtered correlated photons for large-scale quantum photonic systems. Physical Review X. 2014;4:041047. 10 pages. DOI: 10.1103/PhysRevX.4.041047.

Harris et al., Linear programmable nanophotonic processors. Optica. 2018;12(5):1623-1631.

Harris et al., Quantum transport simulations in a programmable nanophotonic processor. Nature Photonics. 2017;11:447-452. DOI: 10.1038/NPHOTON.2017.95.

Hinton et al., Reducing the dimensionality of data with neural networks. Science. 2006;313:504-507.

Hochberg et al., Silicon Photonics: The Next Fabless Semiconductor Industry. IEEE Solid-State Circuits Magazine. 2013. pp 48-58. DOI: 10.1109/MSSC.2012.2232791.

Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.

Hong et al., Measurement of subpicosecond time intervals between two photons by interference. Physical Review Letters. 1987;59(18):2044-2046.

Hopfield et al., Neural computation of decisions in optimization problems. Biological Cybernetics. 1985;52;141-152.

Hopfield, Neural networks and physical systems with emergent collective computational abilities. PNAS. 1982;79:2554-2558. DOI: 10.1073/pnas.79.8.2554.

Horowitz, Computing's energy problem (and what we can do about it). Solid-State Circuits Conference Digest of Technical Papers (ISSCC), 2014 IEEE International. 5 pages.

Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.github.io/ 2 pages. [last accessed Sep. 24, 2019].

Kartalopoulos, Part III Coding Optical Information. Introduction to DWDM Technology. IEEE Press. 2000. pp. 165-166.

Keckler et al., GPUs and the future of parallel computing. IEEE Micro. 2011;31:7-17. DOI: 10.1109/MM.2011.89.

Kieling et al., On photonic Controlled Phase Gates. New Journal of Physics. 2010; 12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

(56) References Cited

OTHER PUBLICATIONS

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Koster et al., Flexpoint: An Adaptive Numerical Format for Efficient Training of Deep Neural Networks. arXiv:1711.02213v2. Dec. 5, 2017. 14 pages.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8×8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.

Lahini et al., Quantum Correlations in Two-Particle Anderson Localization. Physical Review Letters. 2010;105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp. 183-191.

Lanyon et al., Towards quantum chemistry on a quantum computer. Nature Chemistry. 2010;2:106-10. DOI: 10.1038/NCHEM.483.

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages. doi: 10.1038/s41467-018-04484-2.

Lin et al., All-optical machine learning using diffractive deep neural networks. Science. 2018;361:1004-1008. 6 pages. doi: 10.1126/science.aat8084.

Little, The existence of persistent states in the brain. Mathematical Biosciences. 1974;19:101-120.

Liu et al., Towards 1-Tb/s Per-Channel Optical Transmission Based on Multi-Carrier Modulation. 19th Annual Wireless and Optical Communications Conference. May 2010. 4 pages. DOI: 10.1109/WOCC.2010.5510630.

Lu et al., 16 x 16 non-blocking silicon optical switch based on electro-optic Mach-Zehnder interferometers. Optics Express. 2016:24(9):9295-9307. doi: 10.1364/OE.24.009295.

Ma et al., Optical switching technology comparison: Optical mems vs. Other technologies. IEEE Optical Communications. 2003;41(11):S16-S23.

MacReady et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. doi: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

McMahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

Miller, Attojoule optoelectronics for low-energy information processing and communications. Journal of Lightwave Technology. 2017;35(3):346-96. DOI: 10.1109/JLT.2017.2647779.

Miller, Energy consumption in optical modulators for interconnects. Optics Express. 2012;20(S2):A293-A308.

Miller, Perfect optics with imperfect components. Optica. 2015;2(8):747-750.

Miller, Reconfigurable add-drop multiplexer for spatial modes. Optics Express. 2013;21(17):20220-9. DOI:10.1364/OE.21.020220.

Miller, Self-aligning universal beam coupler, Optics Express. 2013;21(5):6360-70.

Miller, Self-configuring universal linear optical component [Invited]. Photonics Research. 2013;1(1):1-15. URL:http://dx.doi.org/10.1364/PRJ.1.000001.

Misra et al., Artificial neural networks in hardware: A survey of two decades of progress. Neurocomputing. 2010;74:239-255.

Mohseni et al., Environment-assisted quantum walks in photosynthetic complexes. The Journal of Chemical Physics. 2008;129:174106. 10 pages. DOI: 10.1063/1.3002335.

Moore, Cramming more components onto integrated circuits. Proceeding of the IEEE. 1998;86(1):82-5.

Mower et al., Efficient generation of single and entangled photons on a silicon photonic integrated chip. Physical Review A. 2011;84:052326. 7 pages. DOI: 10.1103/PhysRevA.84.052326.

Mower et al., High-fidelity quantum state evolution in imperfect photonic integrated circuits. Physical Review A. 2015;92(3):032322. 7 pages. doi: 10.1103/PhysRevA.92.032322.

Nagamatsu et al., A 15 NS 32×32-bit CMOS multiplier with an improved parallel structure. IEEE Custom Integrated Circuits Conference. 1989. 4 pages.

Najafi et al., On-Chip Detection of Entangled Photons by Scalable Integration of Single-Photon Detectors. arXiv:1405.4244. May 16, 2014. 27 pages.

Najafi et al., On-Chip detection of non-classical light by scalable integration of single-photon detectors. Nature Communications. 2015;6:5873. 8 pages. DOI: 10.1038/ncomms6873.

Naruse, Nanophotonic Information Physics. Nanointelligence and Nanophotonic Computing. Springer. 2014. 261 pages. DOI 10.1007/978-3-642-40224-1.

Nozaki et al., Sub-femtojoule all-optical switching using a photonic-crystal nanocavity. Nature Photonics. 2010;4:477-483. doi: 10.1038/NPHOTON.2010.89.

O'Brien et al., Demonstration of an all-optical quantum controlled-NOT gate. Nature. 2003;426:264-7.

Onsager, Crystal Statistics. I. A Two-Dimensional Model with an Order-Disorder Transition. Physical Review. 1944;65(3,4):117-149.

Orcutt et al., Nanophotonic integration in state-of-the-art CMOS foundries. Optics Express. 2011;19(3):2335-46.

Pelissetto et al., Critical phenomena and renormalization-group theory. Physics Reports. Apr. 2002. 150 pages.

Peng, Implementation of AlexNet with Tensorflow. https://github.com/ykpengba/AlexNet-A-Practical-Implementation. 2018. 2 pages. [last accessed Sep. 24, 2019].

(56) References Cited

OTHER PUBLICATIONS

Peretto, Collective properties of neural networks: A statistical physics approach. Biological Cybernetics. 1984;50:51-62.
Pernice et al., High-speed and high-efficiency travelling wave single-photon detectors embedded in nanophotonic circuits. Nature Communications 2012;3:1325. 10 pages. DOI: 10.1038/ncomms2307.
Peruzzo et al., Quantum walk of correlated photons. Science. 2010;329;1500-3. DOI: 10.1126/science.1193515.
Politi et al., Integrated Quantum Photonics, IEEE Journal of Selected Topics in Quantum Electronics, 2009;5(6):1-12. DOI: 10.1109/JSTQE.2009.2026060.
Politi et al., Silica-on-Silicon Waveguide Quantum Circuits. Science. 2008;320:646-9. DOI: 10.1126/science.1155441.
Poon et al., Neuromorphic silicon neurons and large-scale neural networks: challenges and opportunities. Frontiers in Neuroscience. 2011;5:1-3. doi: 10.3389/fnins.2011.00108.
Prucnal et al., Recent progress in semiconductor excitable lasers for photonic spike processing. Advances in Optics and Photonics. 2016;8(2):228-299.
Psaltis et al., Holography in artificial neural networks. Nature. 1990;343:325-330.
Qiao et al., 16×16 non-blocking silicon electro-optic switch based on mach zehnder interferometers. Optical Fiber Communication Conference. Optical Society of America. 2016. 3 pages.
Ralph et al., Linear optical controlled-NOT gate in the coincidence basis. Physical Review A. 2002;65:062324-1-062324-5. DOI: 10.1103/PhysRevA.65.062324.
Ramanitra et al., Scalable and multi-service passive optical access infrastructure using variable optical splitters. Optical Fiber Communication Conference. Optical Society of America. 2005. 3 pages.
Raussendorf et al., A one-way quantum computer. Physical Review Letter. 2001;86(22):5188-91. DOI: 10.1103/PhysRevLett.86.5188.
Rechtsman et al., Photonic floquet topological insulators. Nature. 2013;496:196-200. doi: 10.1038/nature12066.
Reck et al., Experimental realization of any discrete unitary operator. Physical review letters. 1994;73(1):58-61. 6 pages.
Reed et al., Silicon optical modulators. Nature Photonics. 2010;4:518-26. DOI: 10.1038/NPHOTON.2010.179.
Rekhi et al., Analog/Mixed-Signal Hardware Error Modeling for Deep Learning Inference. 56th ACM/IEEE Design Automation Conference (DAC). 2019. 6 pages. doi: 10.1145/3316781.3317770.
Rendl et al., Solving Max-Cut to optimality by intersecting semidefinite and polyhedral relaxations. Mathematical Programming. 2010;121:307-335. doi: 10.1007/s10107-008-0235-8.
Rios et al., Integrated all-photonic non-volatile multilevel memory. Nature Photonics. 2015;9:725-732. doi: 10.1038/NPHOTON.2015.182.
Rogalski, Progress in focal plane array technologies. Progress in Quantum Electronics. 2012;36:342-473.
Rohit et al., 8×8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. doi:10.1016/j.optcom.2009.08.025.
Savich et al., A Low-Power Scalable Stream Compute Accelerator for General Matrix Multiply (GEMM). VLSI Design. 2014. 12 pages. doi: 10.1155/2014/712085.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997;14(11):2865-8.
Schmidhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011;106:180403. 4 pages. DOI: 10.1103/PhysRevLett.106.180403.
Schwartz et al., Transport and Anderson localization in disordered two-dimensional photonic lattices. Nature. 2007;446:52-5. doi:10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. Doi: 10.1038/NPHOTON.2017.93.
Shoji et al., Low-crosstalk 2×2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. doi:10.1038/nature16961.
Silver et al., Mastering the game of Go without human knowledge. Nature. 2017;550:354-9. 18 pages. doi:10.1038/nature24270.
Silverstone et al., On-chip quantum interference between silicon photon-pair sources. Nature Photonics. 2014;8:104-8. Doi: 10.1038/NPHOTON.2013.339.
Smith et al., Phase-controlled integrated photonic quantum circuits. Optics Express. 2009;17(16):13516-25.
Soljacic et al., Optimal bistable switching in nonlinear photonic crystals. Physical Review E. 2002;66:055601. 4 pages.
Solli et al., Analog optical computing. Nature Photonics. 2015;9:704-6.
Spring et al., Boson sampling on a photonic chip. Science. 2013;339:798-801. DOI: 10.1126/science.1231692.
Srinivasan et al., 56 GB/s germanium waveguide electro-absorption modulator. Journal of Lightwave Technology. 2016;34(2):419-24. DOI: 10.1109/JLT.2015.2478601.
Steinkraus et al., Using GPUs for machine learning algorithms. Proceedings of the 2005 Eight International Conference on Document Analysis and Recognition. 2005. 6 pages.
Su et al., Hybrid spatiotemporal architectures for universal linear optics. arXiv:1812.07939v2. Jun. 3, 2019. 8 pages.
Suda et al., Quantum interference of photons in simple networks. Quantum Information Process. 2013;12:1915-45. DOI 10.1007/s11128-012-0479-3.
Sun et al., Large-scale nanophotonic phased array. Nature. 2013;493:195-9. doi:10.1038/nature11727.
Sun et al., Single-chip microprocessor that communicates directly using light. Nature. 2015;528:534-8. doi:10.1038/nature16454.
Suzuki et al., Ultra-compact 8×8 strictly-non-blocking Si-wire PILOSS switch. Optics Express. 2014;22(4):3887-94. DOI:10.1364/OE.22.003887.
Sze et al., Efficient processing of deep neural networks: A tutorial and survey. Proceedings of the IEEE. 2017;105(12):2295-2329. DOI: 10.1109/JPROC.2017.276174.
Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.
Tait et al., Broadcast and weight: An integrated network for scalable photonic spike processing. Journal of Lightwave Technology. 2014;32(21):3427-39. DOI: 10.1109/JLT.2014.2345652.

(56) References Cited

OTHER PUBLICATIONS

Tait et al., Chapter 8 Photonic Neuromorphic Signal Processing and Computing. Springer, Berlin, Heidelberg. 2014. pp. 183-222.

Tait et al., Neuromorphic photonic networks using silicon photonic weight banks. Scientific Reports. 2017;7:7430. 10 pages.

Tanabe et al., Fast bistable all-optical switch and memory on a silicon photonic crystal on-chip. Optics Letters. 2005;30(19):2575-7.

Tanizawa et al., Ultra-compact 32×32 strictly-non-blocking Si-wire optical switch with fan-out LGA interposer. Optics Express. 2015;23(13):17599-606. DOI:10.1364/OE.23.017599.

Thompson et al., Integrated waveguide circuits for optical quantum computing. IET Circuits, Devices, & Systems. 2011;5(2):94-102. doi: 10.1049/iet-cds.2010.0108.

Timurdogan et al., An ultralow power athermal silicon modulator. Nature Communications. 2014;5:4008. 11 pages. DOI: 10.1038/ncomms5008.

Vandoorne et al., Experimental demonstration of reservoir computing on a silicon photonics chip. Nature Communications. 2014;5:3541. 6 pages. DOI: 10.1038/ncomms4541.

Vazquez et al., Optical NP problem solver on laser-written waveguide plat-form. Optics Express. 2018;26(2):702-10.

Vivien et al., Zero-bias 40gbit/s germanium waveguide photodetector on silicon. Optics Express. 2012;20(2):1096-1101.

Wang et al., Coherent Ising machine based on degenerate optical parametric oscillators. Physical Review A. 2013;88:063853. 9 pages. DOI: 10.1103/PhysRevA.88.063853.

Wang et al., Deep learning for identifying metastatic breast cancer. arXiv preprint arXiv:1606.05718. Jun. 18, 2016. 6 pages.

Werbos, Beyond regression: New tools for prediction and analysis in the behavioral sciences. Ph.D. dissertation, Harvard University. Aug. 1974. 454 pages.

Whitfield et al., Simulation of electronic structure Hamiltonians using quantum computers. Molecular Physics. 2010;109(5,10):735-50. DOI: 10.1080/00268976.2011.552441.

Wu et al., An optical fiber network oracle for NP-complete problems. Light: Science & Applications. 2014;3: e147. 5 pages. doi: 10.1038/lsa.2014.28.

Xia et al., Mode conversion losses in silicon-on-insulator photonic wire based racetrack resonators. Optics Express. 2006;14(9):3872-86.

Xu et al., Experimental observations of bistability and instability in a two-dimensional nonlinear optical superlattice. Physical Review Letters. 1993;71(24):3959-62.

Yang et al., Non-Blocking 4×4 Electro-Optic Silicon Switch for On-Chip Photonic Networks. Optics Express 2011;19(1):47-54.

Yao et al., Serial-parallel multipliers. Proceedings of 27th Asilomar Conference on Signals, Systems and Computers. 1993. pp. 359-363.

Young et al., Recent trends in deep learning based natural language processing. IEEE Computational Intelligence Magazine. arXiv:1708.02709v8. Nov. 2018. 32 pages.

Zhou et al., Calculating Unknown Eigenvalues with a Quantum Algorithm. Nature Photonics. 2013;7:223-8. DOI: 10.1038/NPHOTON.2012.360.

International Search Report and Written Opinion mailed Mar. 25, 2022, in connection with International Application No. PCT/US2021/061013.

Extended European Search Report mailed Oct. 31, 2022, in connection with European Application No. 20763126.8.

Huang et al., Evaluation of an Analog Accelerator for Linear Algebra. 43rd ACM/IEEE Annual International Symposium on Computer Architecture. 2016. 13 pages. Doi: 10.1109/ISCA.2016.56.

International Preliminary Report on Patentability for International Application No. PCT/US2021/061013, dated Jun. 15, 2023.

Singapore Search Report and Written Opinion dated Sep. 18, 2023, in connection with Singapore Application No. 11202108799Q.

Taiwan Office Action dated Jul. 14, 2023, in connection with Taiwan Application No. 109106267.

\* cited by examiner $$
\begin{array}{c|cccc|}
\hline
A & a_{11} & a_{12} & a_{13} & a_{14} \\
 & a_{21} & a_{22} & a_{23} & a_{24} \\
 & a_{31} & a_{32} & a_{33} & a_{34} \\
 & a_{41} & a_{42} & a_{43} & a_{44} \\
\hline
\end{array}
\times
\begin{array}{c|ccc|}
\hline
B & b_{11} & b_{12} & b_{13} \\
 & b_{21} & b_{22} & b_{23} \\
 & b_{31} & b_{32} & b_{33} \\
 & b_{41} & b_{42} & b_{43} \\
\hline
\end{array}
=
\begin{array}{c|ccc|}
\hline
C & c_{11} & c_{12} & c_{13} \\
 & c_{21} & c_{22} & c_{23} \\
 & c_{31} & c_{32} & c_{33} \\
 & c_{41} & c_{42} & c_{43} \\
\hline
\end{array}
$$

FIG. 3A

MACHINE LEARNING MODEL TRAINING USING AN ANALOG PROCESSOR

RELATED APPLICATIONS

This application claims priority under 35 U.S.C. 119(e) to U.S. Provisional Pat. App. Ser. No. 63/119,472 entitled "ANALOG LINEAR PHOTONIC PROCESSOR THAT INTERFACES WITH FLOATING-POINT TENSORS," filed on Nov. 30, 2020, and U.S. Provisional Pat. App. Ser. No. 63/160,592 entitled "ROBUST MACHINE LEARNING TRAINING WITH ANALOG LINEAR PROCESSOR," filed on Mar. 12, 2021, each of which is incorporated by reference in its entirety.

FIELD

This application relates to techniques of using an analog processor for training a machine learning model, and for using an analog processor for performing inference with a machine learning model. In particular, the techniques utilize an analog processor to perform matrix operations involved in the training and inference.

BACKGROUND

Matrix operations may be used in training a machine learning model to learn parameters of the machine learning model. For example, a system may perform stochastic gradient descent to learn weights of a neural network. Performing stochastic gradient descent may involve a forward pass in which the system determines outputs of the neural network for a set of inputs. Each input may be a matrix of input values, and the weights of each layer of the neural network may be stored in a respective matrix. The system may perform a forward pass to determine an output of the neural network for an input by performing a series of matrix multiplications to obtain an output. The system may perform matrix operations to update weights of the neural network using outputs of the neural network for the set of inputs.

SUMMARY

Described herein are techniques of training a machine learning model and performing inference using an analog processor. Some embodiments mitigate the loss in performance of a machine learning model resulting from a lower precision of an analog processor by using an adaptive block floating-point representation of numbers for the analog processor. Some embodiments mitigate the loss in performance of a machine learning model due to noise that is present when using an analog processor. The techniques involve training the machine learning model such that it is robust to noise.

According to some embodiments, a system is provided. The system comprises: circuitry comprising an analog processor; wherein the circuitry is configured to train a machine learning model, the training comprising performing one or more matrix operations to learn parameters of the machine learning model using the analog processor. According to some embodiments, the circuitry further comprises a digital controller. According to some embodiments, the system comprises a hybrid analog-digital processor that includes the circuitry. According to some embodiments, the machine learning model is a neural network.

According to some embodiments, performing a matrix operation of the one or more matrix operations to learn the parameters of the machine learning model using the analog processor comprises: determining a scaling factor for a first portion of a first matrix involved in the matrix operation; scaling the first portion of the first matrix using the scaling factor for the first portion of the first matrix to obtain a scaled first portion of the first matrix; programming the analog processor using the scaled first portion of the first matrix; performing, by the analog processor programmed using the scaled first portion of the first matrix, the matrix operation to generate a first output; and determining a result of the matrix operation using the first output generated by the analog processor.

According to some embodiments, performing the matrix operation further comprises: determining a scaling factor for a first portion of a second matrix involved in the matrix operation; scaling the first portion of the second matrix using the scaling factor for the first portion of the second matrix to obtain a scaled first portion of the second matrix programming the analog processor using the scaled first portion of the second matrix; and performing, by the analog processor programmed using the scaled first portion of the second matrix, the matrix operation to generate the first output.

According to some embodiments, performing the one or more matrix operations to learn the parameters of the machine learning model using the analog processor comprises: determining a scaling factor for a second portion of the first matrix; scaling the second portion of the first matrix using the scaling factor for the second portion of the first matrix to obtain a scaled second portion of the first matrix; programming the analog processor using the scaled second portion of the first matrix; performing, by the analog processor programmed using the scaled second portion of the first matrix, the matrix operation to generate a second output; and determining the result of the matrix operation using the second output generated by the analog processor.

According to some embodiments, the first scaling factor is different from the second scaling factor. According to some embodiments, the first portion of the first matrix is a first vector of the first matrix.

According to some embodiments, determining the result of the matrix operation using the first output generated by the analog processor comprises: determining an output scaling factor for the first output generated by the analog processor using the first scaling factor; scaling the first output using the output scaling factor to obtain a scaled first output; and determining the result of the matrix operation using the scaled first output.

According to some embodiments: determining the first scaling factor for the first portion of the first matrix comprises determining a maximum absolute value of the first portion of the first matrix; and scaling the first portion of the first matrix using the first scaling factor comprises scaling values of the first portion of the first matrix using the maximum absolute value of the first portion of the first matrix.

According to some embodiments, the analog processor is configured to operate using a fixed-point representation of values; and programming the analog processor using the scaling of the first portion of the first matrix comprises converting values of the scaled first portion of the first matrix into the fixed-point representation.

According to some embodiments, the circuitry further comprises a digital controller configured to operate using a floating-point representation of values; and a dynamic range of the floating-point representation is greater than a dynamic range of the fixed point representation.

According to some embodiments, performing the one or more matrix operations to learn parameters of the machine learning model using the analog processor comprises amplifying or attenuating at least one analog signal used to perform a matrix operation of the one or more matrix operations.

According to some embodiments, amplifying or attenuating the at least one analog signal used to perform the matrix operation comprises: programming the analog processor using multiple copies of a matrix involved in the matrix operation. According to some embodiments, amplifying or attenuating the at least one analog signal used to perform the matrix operation comprises: distributing a zero pad among different portions of a matrix involved in the matrix operation; and programming of the analog processor using the matrix with the zero pad distributed among different portions of the matrix.

According to some embodiments, performing the matrix operation comprises performing the matrix operation between a matrix of parameters of the machine learning model and/or a matrix of inputs to the machine learning model. According to some embodiments, performing the one or more matrix operations to learn the parameters of the machine learning model using the analog processor comprises performing the one or more matrix operations to determine outputs of the machine learning model for a set of inputs.

According to some embodiments, performing the one or more matrix operations to learn the parameters of the machine learning model using the analog processor comprises: performing the one or more matrix operations using the analog processor to determine a gradient of a loss function; and updating parameters of the machine learning model using the gradient of the loss function.

According to some embodiments, the training comprises performing a plurality of iterations, wherein performing each of at least some of the plurality of iterations comprises: determining updated parameters of the machine learning model; and setting parameters of the machine learning model to an average of the updated parameters and parameters set at one or more previous iterations of the plurality of iterations.

According to some embodiments, the matrix operation is a matrix multiplication. According to some embodiments, the matrix operation may involve a matrix obtained from a tensor. According to some embodiments, the matrix may be obtained by reshaping the tensor and copying a reshaped tensor into the matrix. According to some embodiments, the matrix may be a portion of the tensor.

According to some embodiments, the analog processor is a photonic processor, wherein performing the one or more matrix operations to learn the parameters of the machine learning model using the analog processor comprises processing light using the photonic processor.

According to some embodiments, a method is provided. The method comprises: using a system comprising an analog processor to perform: training a machine learning model, the training comprising performing one or more matrix operations to learn parameters of the machine learning model using the analog processor.

According to some embodiments, performing a matrix operation of the one or more matrix operations to learn the parameters of the machine learning model using the analog processor comprises: determining a scaling factor for a first portion of a first matrix involved in the matrix operation; scaling the first portion of the first matrix using the scaling factor for the first portion of the first matrix to obtain a scaled first portion of the first matrix; programming the analog processor using the scaled first portion of the first matrix; performing, by the analog processor programmed using the scaled first portion of the first matrix, the matrix operation to generate a first output; and determining a result of the matrix operation using the first output generated by the analog processor.

According to some embodiments, performing the matrix operation further comprises: determining a scaling factor for a first portion of a second matrix involved in the matrix operation; scaling the first portion of the second matrix using the scaling factor for the first portion of the second matrix to obtain a scaled first portion of the second matrix; programming the analog processor using the scaled first portion of the second matrix; and performing, by the analog processor programmed using the scaled first portion of the second matrix, the matrix operation to generate the first output.

According to some embodiments, a non-transitory computer-readable storage medium storing instructions is provided. The instructions, when executed by a system, cause the system to perform: training a machine learning model, the training comprising performing one or more matrix operations to learn parameters of the machine learning model using an analog processor of the system.

According to some embodiments, performing a matrix operation of the one or more matrix operations to learn the parameters of the machine learning model using the analog processor comprises: determining a scaling factor for a first portion of a first matrix involved in the matrix operation; scaling the first portion of the first matrix using the scaling factor for the first portion of the first matrix to obtain a scaled first portion of the first matrix; programming the analog processor using the scaled first portion of the first matrix; performing, by the analog processor programmed using the scaled first portion of the first matrix, the matrix operation to generate a first output; and determining a result of the matrix operation using the first output generated by the analog processor.

BRIEF DESCRIPTION OF THE DRAWINGS

Various aspects and embodiments will be described herein with reference to the following figures. It should be appreciated that the figures are not necessarily drawn to scale. Items appearing in multiple figures are indicated by the same or a similar reference number in all the figures in which they appear.

FIG. 3A illustrates an example matrix multiplication operation that may be performed by the hybrid processor 100, according to some embodiments of the technology described herein.

DETAILED DESCRIPTION

Figure 1A:
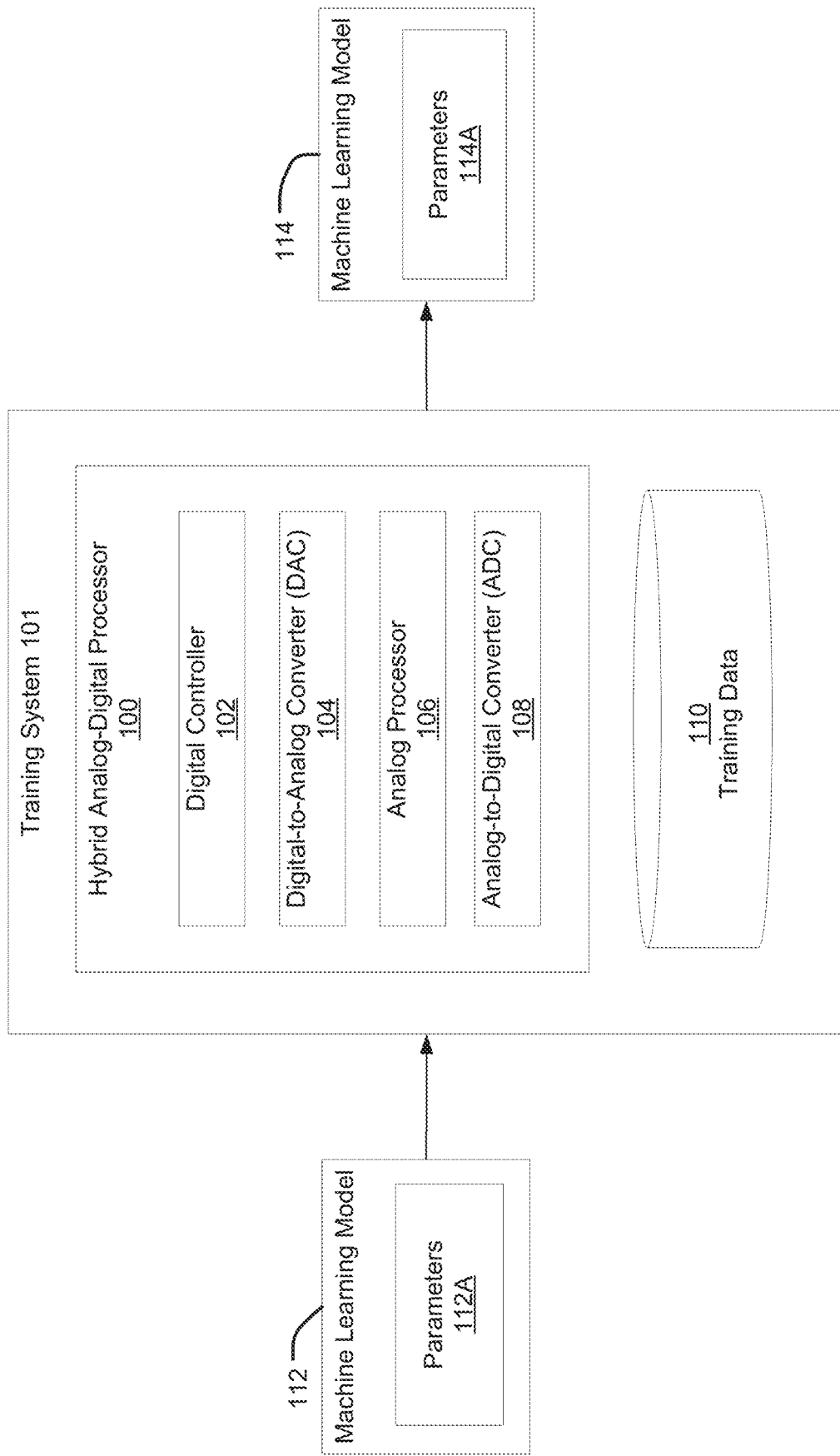
FIG. 1A shows a block diagram of a training system, according to some embodiments of the technology described herein.

Described herein are techniques of training a machine learning model using an analog processor. In particular, the techniques involve using an analog processor to perform matrix operations involved in training a machine learning model. By using an analog processor to perform the matrix operations, the techniques may train a machine learning model more efficiently than training the machine learning model in only the digital domain.

Analog processors can typically perform certain matrix operations such as matrix multiplications faster and with more energy efficiency than processors that perform the matrix operations only in the digital domain. Accordingly, a system may achieve better speed and energy efficiency by performing the matrix operations in the analog domain. By encoding information in the analog domain, a system may use less energy per compute operation than a digital-only counterpart. Such matrix operations are a large portion of the computations involved in training a machine learning model and performing inference using the machine learning model. For example, such matrix operations may be used to train a neural network and/or perform inference with the trained neural network. Accordingly, the inventors have recognized that training a machine learning model and performing inference with a machine learning model may be performed more efficiently using an analog processor. However, one challenge with using an analog processor to perform matrix operations for training a machine learning model and/or performing inference with a machine learning model is that the analog processor may be limited to a lower bit precision than a digital processor. For example, a digital processor may use a floating-point representation with 32 bits (e.g., float32 representation) to represent a number whereas an analog processor may use a fixed-point representation of 8 or fewer bits. Thus, analog processors are typically not suitable for applications where training a machine learning model requires high-precision computing in which more than 8 bits are used to represent numbers. Furthermore, a system that uses an analog processor may be more susceptible to noise in computations due to: (1) a digital-to-analog converter (DAC) that may need to be used to convert digital inputs to analog signals for use by the analog processor; (2) analog components performing operations within the analog processor; and/or (3) an analog-to-digital converter (ADC) that may need to be used to convert analog signals output by the analog processor into a digital domain.

Accordingly, the inventors have developed techniques of using an analog processor to train a machine learning model and to perform inference with a machine learning model that mitigate the loss in performance due to the lower precision of the analog processor. The techniques allow an analog processor to be used for training a machine learning model and performing inference with a machine learning model in applications requiring high precision computing. In particular, the techniques allow use of an analog processor to perform matrix operations (e.g., matrix multiplication) involved in training and inference. This allows a system to realize speed and energy efficiency improvements provided by an analog processor when training a machine learning model and/or performing inference. The techniques utilize a novel adaptive block floating-point (ABFP) number representation for matrices when operating in the analog domain. In an ABFP representation, a matrix is represented as: (1) scaled portions of the matrix obtained using corresponding scaling factors; and (2) the scaling factors. As an illustrative example, a matrix may be divided into multiple vectors (e.g., row vectors or column vectors). In this example, each of the vectors may have an associated scaling factor that is shared by all the values in the vector. The ABFP representation of the matrix may comprise vectors scaled using their scaling factors, and the scaling factors.

Use of the ABFP representation in a matrix operation involves scaling a matrix or portion thereof such that its values are normalized to a range (e.g., [−1, 1]), and then performing matrix operations in the analog domain using the scaled matrix or portion thereof. An output of the matrix operation performed in the analog domain may then be scaled using scaling factors from ABFP representations of one or more matrices involved in the matrix operation to obtain the output of the matrix operation. By scaling matrix portions using the ABFP representation for matrices in a matrix operation, techniques described herein may reduce loss in precision due to differences in precisions of values in a matrix and also reduce quantization error. Accordingly, some embodiments allow use of an analog processor in training and/or inference of a machine learning model in applications requiring high precision computing.

The inventors have further developed techniques of training a machine learning model that mitigate effects of noise on performance of the machine learning model. The techniques incorporate noise into outputs during training such that parameters learned during training are more robust to noise due to use of an analog processor. Some embodiments mitigate the effect of noise using quantization-aware training (QAT) in which an analog processor may be used to perform forward pass operations (e.g., matrix operations). Thus, outputs of the forward pass operations may incorporate noise (e.g., from the analog processor and/or an ADC). The system may then update parameters of a machine learning model based on the outputs. In this manner, QAT may provide parameters learned during training that are robust to noise in the data. Some embodiments mitigate the effect of noise by injecting noise representative of noise introduced as a result of using an analog processor into outputs of a machine learning model. For example, some embodiments inject noise representative of noise introduced as a result of using an analog processor into outputs of layers of a neural network during training. Such embodiments utilize a differential noise model that is obtained using a difference between layer outputs determined using an analog processor and those determined using a processor that operates only in the digital domain.

In some embodiments, a matrix operation may be a matrix multiplication. The matrix multiplication may be a segment of another operation. In some cases, training of a machine learning model may involve tensor operations with tensors of order greater than 2. Some embodiments may perform such tensor operations by performing matrix operations using matrices obtained from a tensor. For example, a system may obtain matrix slices from a tensor, and perform the matrix operation one matrix slice at a time. Accordingly, matrix operations described herein may be used to perform tensor operations such as tensor multiplications.

Some embodiments described herein address all the above-described issues that the inventors have recognized with conventional systems. However, it should be appreciated that not every embodiment described herein addresses every one of these issues. It should also be appreciated that embodiments of the technology described herein may be used for purposes other than addressing the above-discussed issues. Example embodiments are described herein using a neural network as an example machine learning model. However, some embodiments may be used to train and perform inference with other machine learning models. For example, some embodiments may be used to train and perform inference with a support vector machine (SVM), a logistic regression model, a linear regression model, or other suitable machine learning model to a target device. Some embodiments may be used for any machine learning model in which training and/or inference involve performance of a matrix operation.

FIG. 1A shows a block diagram of a training system 101, according to some embodiments of the technology described herein. The training system 101 may be configured to train a machine learning model 112 to obtain a trained machine learning model 114.

The training system 101 may comprise a computer system. The training system 101 may include components in addition to those shown in FIG. 1A. For example, the training system 101 may include additional processor(s) and storage hardware in addition to the hybrid analog-digital processor 100 and the datastore 110. In some embodiments, the training system 101 may be a computing device. For example, the training system 101 may be a desktop, laptop, smartphone, tablet, or other computing device. In some embodiments, the training system 101 may include multiple computing devices. In some embodiments, the training system 101 may be implemented on a server.

As shown in FIG. 1A, the training system 101 includes a hybrid analog-digital processor 100 and a datastore 110. A hybrid analog-digital processor may also be referred to herein as a "hybrid processor". The hybrid processor 100 includes a digital controller 102, a digital-to-analog converter (DAC) 104, and an analog processor 106, analog-to-digital converter (ADC) 108. The components 102, 104, 106, 108 of the hybrid processor 100 and optionally other components, may be collectively referred to herein as "circuitry". In some embodiments, the components 102, 104, 106, 108 may be formed on a common chip. In some embodiments, the components 102, 104, 106, 108 may be on different chips bonded together. In some embodiments, the components 102, 104, 106, 108 may be connected together via electrical bonds (e.g., wire bonds or flip-chip bump bonds). In some embodiments, the components 102, 104, 106, 108 may be implemented with chips in the same technology node. In some embodiments, the components 102, 104, 106, 108 may be implemented with chips in different technology nodes.

In some embodiments, the training system 101 may include a host central processing unit (CPU). In some embodiments, the training system 101 may include a dynamic random-access memory (DRAM) unit. In some embodiments, the host CPU may be configured to communicate with the hybrid processor 100 using a communication protocol. For example, the host CPU may communicate with the hybrid processor 100 using peripheral component interconnect express (PCI-e), joint test action group (JTAG), universal serial bus (USB), and/or another suitable protocol. In some embodiments, the hybrid processor 100 may include a DRAM controller that allows the hybrid processor 100 direct memory access from the DRAM unit to memory of the hybrid processor 100. For example, the hybrid processor 100 may include a double data rate (DDR) unit or a high-bandwidth memory unit for access to the DRAM unit. In some embodiments, the host CPU may be configured to broker DRAM memory access between the hybrid processor 100 and the DRAM unit.

The digital controller 102 may be configured to control operation of the hybrid processor 100. The digital controller 102 may comprise a digital processor and memory. The memory may be configured to store software instructions that can be executed by the digital processor. The digital controller 102 may be configured to perform various operations by executing software instructions stored in the memory. In some embodiments, the digital controller 102 may be configured to perform operations involved in training the machine learning model 112 and/or performing inference using the trained machine learning model 114. Example operations of the digital controller 102 are described herein with reference to FIG. 1B.

The DAC 104 is a system that converts a digital signal into an analog signal. The DAC 104 may be used by the hybrid processor 100 to convert digital signals into analog signals for use by the analog processor 106. The DAC 104 may be any suitable type of DAC. In some embodiments, the DAC 104 may be a resistive ladder DAC, switched-capacitor DAC, switched resister DAC, binary-weighted DAC, a thermometer-coded DAC, a successive approximation DAC, an oversampling DAC, an interpolating DAC, and/or a hybrid DAC. In some embodiments, the DAC 104 may be configured to use the DAC 140 to program the analog processor 106. The digital controller 102 may provide a digital signals as input to the DAC 104 to obtain a corresponding analog signal, and set analog components of the analog processor 106 using the analog signal.

The analog processor 106 includes various analog components. The analog components may include an analog mixer that mixes an input analog signal with an analog signal encoded into the analog processor 106. The analog components may include amplitude modulator(s), current steering circuit(s), amplifier(s), attenuator(s), and/or other analog components. In some embodiments, the analog processor 106 may include metal-oxide-semiconductor (CMOS) components, radio frequency (RF) components, microwave components, and/or other types of analog components. In some embodiments, the analog processor 106 may comprise a photonic processor. Example photonic processors are described herein. In some embodiments, the analog processor 106 may include a combination of photonic and analog electronic components.

The analog processor 106 may be configured to perform one or more matrix operations. The matrix operation(s) may include a matrix multiplication. The analog components may include analog components designed to perform a matrix multiplication. In some embodiments, the analog processor 106 may be configured to perform matrix operations for training of the machine learning model 112 (e.g., a neural network). For example, the analog processor 106 may perform matrix operations for performing forward pass and backpropagation operations of a stochastic gradient training technique. In some embodiments, the analog processor 106 may be configured to perform matrix operations for performing inference using the trained machine learning model 114. For example, the analog processor 106 may perform matrix operations for performing inference.

The ADC 108 is a system that converts an analog signal into a digital signal. The ADC 108 may be used by the hybrid processor 100 to convert analog signals output by the analog processor 106 into digital signals. The ADC 108 may be any suitable type of ADC. In some embodiments, the ADC 108 may be a parallel comparator ADC, a flash ADC, a successive-approximation ADC, a Wilkinson ADC, an integrating ADC, a sigma-delta ADC, a pipelined ADC, a cyclic ADC, a time-interleaved ADC, or other suitable ADC.

The datastore 110 may be storage hardware for use by the hybrid processor 100 in storing information. In some embodiments, the datastore 110 may include a hard drive (e.g., a solid state hard drive and/or a hard disk drive). In some embodiments, at least a portion of the datastore 110 may be external to the hybrid processor 100. For example, the at least the portion of the datastore 110 may be storage hardware of a remote database server from which the hybrid processor 102 may obtain data. The hybrid processor 100 may be configured to access information from the remote storage hardware through a communication network (e.g., the Internet, a local area connection (LAN), or other suitable communication network). In some embodiments, the datastore 110 may include cloud-based storage resources.

As shown in FIG. 1A, the datastore 110 stores training data. The training data may include sample inputs and/or sample outputs for use in training a machine learning model (e.g., a neural network). In some embodiments, the sample outputs may be target labels corresponding to the sample inputs. The sample inputs and target labels may be used by the hybrid processor 100 in performing a supervised learning technique. In some embodiments, the training data may include sample inputs without sample outputs. In such embodiments, the sample inputs may be used by the hybrid processor 100 to perform non-supervised learning technique.

The training system 101 may be configured to train the machine learning model 112 using the hybrid processor 100. The training system 101 may be configured to train the machine learning model 112 using the training data stored in the datastore 110. The training system 101 may be configured to perform training to obtain a trained machine learning model 114 with learned parameters 114A. In some embodiments, the training system 101 may be configured to train the machine learning model 112 using a supervised learning technique. For example, the training system 101 may perform gradient descent (e.g., stochastic gradient descent, batch gradient descent, mini-batch gradient descent, etc.) to learn the parameters 114. In some embodiments, the training system 101 may be configured to train the machine learning model 114 using an unsupervised learning technique. For example, the training system 101 may use a clustering algorithm to train the machine learning model 112. In some embodiments, the training system 101 may be configured to train the machine learning model 112 using a semi-supervised learning technique. For example, the training system 101 may determine a set of classes using clustering, label sample inputs with the determined set of classes, and then use a supervised learning technique to train the machine learning model 112 using the labeled sample inputs.

In some embodiments, the machine learning model 112 may be a neural network. For example, the machine learning model 112 may be a convolutional neural network (CNN), a recurrent neural network (RNN), a transformer neural network, a recommendation system, a graph neural network, or any other suitable neural network. In some embodiments, the machine learning model 112 may be a support vector machine (SVM), a logistic regression model, a linear regression model, or other suitable machine learning model.

The machine learning model 112 includes parameters 112A that are to be learned during training to obtain the parameters 114A of the trained machine learning model 114. For example, the parameters 112A may be weights and/or coefficients of a neural network that are learned during training. In another example, the parameters 112A may be parameters indicating one or more hyperplanes of an SVM. In another example, the parameters 112A may be coefficients of a regression model. The parameters 112A may be iteratively updated during training (e.g., during performance of a gradient descent training algorithm). In some embodiments, the parameters 112A may be randomized values. In some embodiments, the parameters 112A may be learned from previously performing training. For example, the machine learning model 112 with parameters 112A may have been obtained by training another machine learning model. In such embodiments, the training system 101 may be configured to perform training to tune the machine learning model 112 to obtain the machine learning model 114. For example, the parameters 112A, 114A may include weights and/or biases of different layers of neural networks 112, 114.

The hybrid processor 100 may be configured to perform matrix operations for training the machine learning model 112 and/or for using the trained machine learning model 114 to perform inference. In some embodiments, the matrix operations may be operations that are performed as part of a training technique (e.g., a gradient descent training technique). The matrix operations may include matrix operations to determine outputs of the machine learning model 112 for inputs, and matrix operations to determine one or more gradients of a loss function with respect to parameters of the machine learning model 112 (e.g., neural network weights) based on the determined outputs.

The hybrid processor 100 may be configured to use the analog processor 106 to perform one or more matrix operations. Use of the analog processor 106 to perform the matrix operations may accelerate computation and require less power to perform. To perform a matrix operation using the analog processor 106, the digital controller 102 may program the analog processor 106 using matrices involved in a matrix operation. The digital controller 102 may program the analog processor 106 using the DAC 104. Programming the analog processor 106 may involve setting certain characteristics of the analog processor 106 according to the matrices involved in the matrix operation. In one example, the analog processor 106 may include multiple electronic amplifiers (e.g., voltage amplifiers, current amplifiers, power amplifiers, transimpedance amplifiers, transconductance amplifiers, operational amplifiers, transistor amplifiers, and/or other amplifiers). In this example, programming the analog processor 106 may involve setting gains of the electronic amplifiers based on the matrices. In another example, the analog processor 106 may include multiple electronic attenuators (e.g., voltage attenuators, current attenuators, power attenuators, and/or other attenuators). In this example, programming the analog processor 106 may involve settings the attenuations of the electronic attenuators based on the matrices. In another example, the analog processor 106 may include multiple electronic phase shifters. In this example, programming the analog processor 106 may involve setting the phase shifts of the electronic phase shifters based on the matrices. In another example, the analog processor 106 may include an array of memory devices (e.g., flash or ReRAM). In this example, programming the analog processor 106 may involve setting conductances and/or resistances of each of the memory cells. The analog processor 106 may perform the matrix operation to obtain an output. The digital controller 102 may obtain a digital version of the output through the ADC 108.

The hybrid processor 100 may be configured to use the analog processor 106 to perform matrix operations by using an ABFP representation for matrices involved in an operation. The hybrid processor 100 may be configured to determine, for each matrix involved in an operation, scaling factor(s) for one or more portions of the matrix ("matrix portion(s)"). In some embodiments, a portion of a matrix may be the entire matrix. In some embodiments, a portion of a matrix may be a submatrix within the matrix. The hybrid processor 100 may be configured to scale a matrix portion using its scaling factor to obtain a scaled matrix or matrix portion. For example, values of the scaled matrix portion may be normalized within a range (e.g., [−1, 1]). The hybrid processor 100 may program the analog processor using the scaled matrix portion. In some embodiments, the hybrid processor 100 may be configured to program the analog processor 106 using the scaled matrix portion by programming the scaled matrix portion into a fixed-point representation used by the analog processor 106. In some embodiments, the fixed-point representation may be asymmetric around zero, with a 1-to-1 correspondence to integer values from $$-2^{\frac{B}{2}} \text{ to } 2^{\frac{B}{2}} - 1,$$

where B is the bit precision. In some embodiments, the representations may be symmetric around zero, with a 1-to-1 correspondence to integer bit values from $$-2^{\frac{B}{2}} - 1 \text{ to } 2^{\frac{B}{2}} - 1.$$

The analog processor 106 may be configured to perform the matrix operation using the scaled matrix portion to generate an output. The hybrid processor 100 may be configured to determine an output scaling factor for the output generated by the analog processor 106. In some embodiments, the hybrid processor 100 may be configured to determine the output scaling factor based on the scaling factor determined for the corresponding input. For example, the hybrid processor 100 may determine the output scaling factor to be an inverse of the input scaling factor. The hybrid processor 100 may be configured to scale the output using the output scaling factor to obtain a scaled output. The hybrid processor 100 may be configured to determine a result of the matrix operation using the scaled output.

Figure 1B:
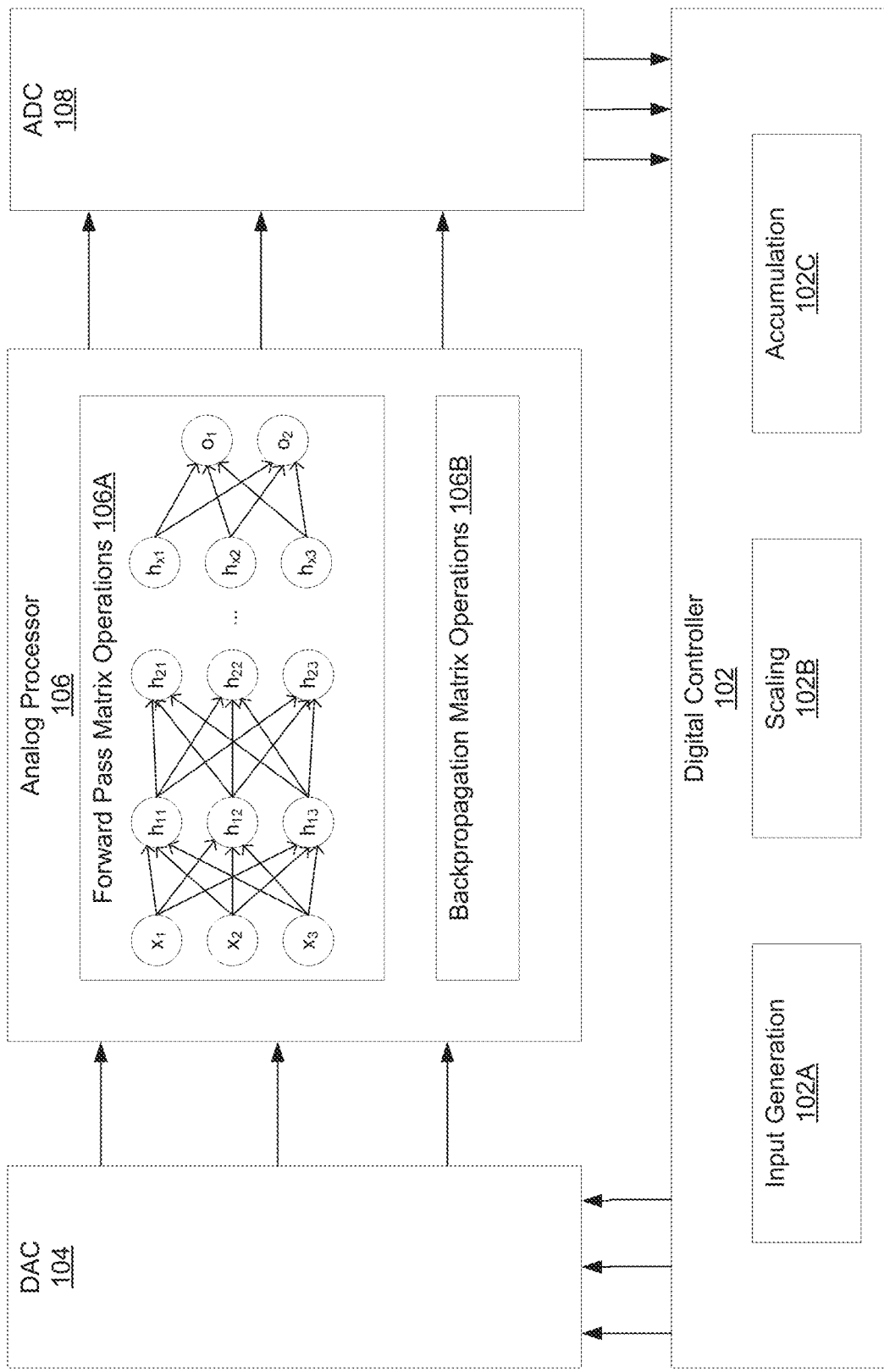
FIG. 1B shows a diagram illustrating interaction among components of the hybrid analog-digital processor (also referred to as "hybrid processor") of FIG. 1A, according to some embodiments of the technology described herein.

FIG. 1B shows a diagram illustrating interaction among components of the hybrid analog-digital processor 100 of FIG. 1A, according to some embodiments of the technology described herein. FIG. 1B illustrates functional components of each of the components 102, 104, 106, 108 of the hybrid processor 100.

As shown in FIG. 1B, the digital controller 102 includes an input generation component 102A, a scaling component 102B, and an accumulation component 102C.

The input generation component 102A may be configured to generate inputs to a matrix operation to be performed by the hybrid processor 100. In some embodiments, the input generation component 102A may be configured to generate inputs to a matrix operation by determining one or more matrices involved in the matrix operation. For example, the input generation component 102A may determine two matrices to be multiplied in a matrix multiplication operation. In some embodiments, the input generation component 102A may be configured to divide matrices involved in a matrix operation into multiple portions such that the result of the matrix operation may be obtained by performing multiple operations using the multiple portions. In such embodiments, the input generation component 102A may be configured to generate input to a matrix operation by extracting a portion of a matrix for an operation. For example, the input generation component 102A may extract a vector (e.g., a row, column, or portion thereof) from a matrix. In another example, the input generation component 102A may extract a portion of an input vector for a matrix operation. To illustrate, the input generation component 102A may obtain a matrix of input values (also referred to as "input vector")

for a layer of a neural network, and a matrix of weights (also referred to as "weight matrix") for the layer of the neural network. A matrix multiplication may need to be performed between the input matrix and the weight matrix. In this example, the input generation component 102A may: (1) divide the weight matrix into multiple smaller weight matrices; and (2) divide the input vector into multiple vectors corresponding to the multiple weight matrices. The matrix operation between the input vector and the weight matrix may then be performed by: (1) performing the matrix operation between each of the multiple weight matrices and the corresponding vectors; and (2) accumulating the outputs.

In some embodiments, the input generation component 102A may be configured to obtain one or more matrices from a tensor for use in performing matrix operations. For example, the input generation component 102A may divide a tensor of input values and/or a tensor of weight values. The input generation component 102A may be configured to perform reshaping or data copying to obtain the matrices. For example, for a convolution operation between a weight kernel tensor and an input tensor, the input generation component 102A may generate a matrix using the weight kernel tensor, in which column values of the matrix correspond to a kernel of a particular output channel. The input generation component 102A may generate a matrix using the input tensor, in which each row of the matrix includes values from the input tensor that will be multiplied and summed with the kernel of a particular output channel stored in columns of the matrix generated using the weight kernel tensor. A matrix operation may then be performed between the matrices obtained from weight kernel tensor and the input tensor.

The scaling component 102B of the digital controller 102 may be configured to scale matrices (e.g., vectors) involved in a matrix operation. The matrices may be provided by the input generation component 102A. For example, the scaling component 102B may scale a matrix or portion thereof provided by the input generation component 102A. In some embodiments, the scaling component 102B may be configured to scale each portion of a matrix. For example, the scaling component 102B may separately scale vectors (e.g., row vectors or column vectors) of the matrix. The scaling component 102B may be configured to scale a portion of a matrix by: (1) determining a scaling factor for the portion of the matrix; and (2) scaling the portion of the matrix using the scaling factor to obtain a scaled portion of the matrix. In some embodiments, the scaling component 102B may be configured to scale a portion of a matrix by dividing values in the portion of the matrix by the scaling factor. In some embodiments, the scaling component 102B may be configured to scale a portion of a matrix by multiplying values in the portion of the matrix by the scaling factor.

The scaling component 102B may be configured to determine a scaling factor for a portion of a matrix using various techniques. In some embodiments, the scaling component 102B may be configured to determine a scaling factor for a portion of a matrix to be a maximum absolute value of the portion of the matrix. The scaling component 102B may then divide each value in the portion of the matrix by the maximum absolute value to obtain scaled values in the range [−1, 1]. In some embodiments, the scaling component 102B may be configured to determine a scaling factor for a portion of a matrix to be a norm of the portion of the matrix. For example, the scaling component 102B may determine a 2-norm of a vector. In some embodiments, the scaling component 102B may be configured to determine a scaling factor as a whole power of 2. For example, the scaling component 102B may determine a logarithmic value of a maximum absolute value of the portion of the matrix to be the scaling factor. In such embodiments, the scaling component 102B may further be configured to round, ceil, or floor a logarithmic value to obtain the scaling factor. In some embodiments, the scaling component 102B may be configured to determine the scaling factor statistically. In such embodiments, the scaling component 102B may pass sample inputs through a machine learning model, collect statistics on the outputs, and determine the scaling factor based on the statistics. For example, the scaling component 102B may determine a maximum output of the machine learning model based on the outputs, and use the maximum output as the scaling factor. In some embodiments, the scaling component 102B may be configured to determine a scaling factor by performing a machine learning training technique (e.g., backpropagation or stochastic gradient descent). The scaling component 102B may be configured to store scaling factors determined for portions of matrices. For example, the scaling component 102B may store scaling factors determined for respective rows of weight matrices of a neural network.

The scaling component 102B may be configured to limit scaled values of a scaled portion of a matrix to be within a desired range. For example, the scaling component 102B may limit scaled values of a scaled portion of a matrix to between [−1, 1]. In some embodiments, the scaling component 102B may be configured to limit scaled values to a desired range by clamping or clipping. For example, the scaling component 102B may apply the following clamping function to the scaled values: clamp(x)=min(max(x, −1), 1) to set the scaled values between [−1, 1]. In some embodiments, the scaling component 102B may be configured to determine scaling factor for a portion of a matrix that is less than the maximum absolute value of the portion of the matrix. In some such embodiments, the scaling component 102B may be configured to saturate scaled values. For example, the scaling component 102B may saturate a scaled value at a maximum of 1 and a minimum of −1.

The scaling component 102B may be configured to determine a scaling factor at different times. In some embodiments, the scaling component 102B may be configured to determine a scaling factor dynamically at runtime when a matrix is being loaded onto the analog processor. For example, the scaling component 102B may determine a scaling factor for an input vector for a neural network at runtime when the input vector is received. In some embodiments, the scaling component 102B may be configured to determine a scaling factor prior to runtime. The scaling component 102B may determine the scaling factor and store it in the datastore 110. For example, weight matrices of a neural network may be static for a period of time after training (e.g., until they are to be retrained or otherwise updated). The scaling component 102B may determine scaling factor(s) to be used for matrix operations involving the matrices, and store the determined scaling factor(s) for use when performing matrix operations involving the weight matrices. In some embodiments, the scaling component 102B may be configured to store scaled matrix portions. For example, the scaling component 102B may store scaled portions of weight matrices of a neural network such that they do not need to be scaled during runtime.

The scaling component 102B may be configured to amplify or attenuate one or more analog signals for a matrix operation. Amplification may also be referred to herein as "overamplification". Typically, the number of bits required to represent an output of a matrix operation increases as the size of one or more matrices involved in the matrix operation increases. For example, the number of bits required to represent an output of a matrix multiplication operation increases as the size of the matrices being multiplied increases. The precision of the hybrid processor 100 may be limited to a certain number of bits. For example, the ADC 108 of the hybrid processor may have a bit precision limited to a certain number of bits (e.g., 4, 6, 8, 10, 12, 14). As the number of bits required to represent an output of a matrix operation increases more information is lost from the output of the matrix operation because a fewer number of significant bits can be captured by the number of bits. The scaling component 102B may be configured to increase a gain of an analog signal such that a larger number of lower significant bits may be captured in an output, at the expense of losing information in more significant bits. This effectively increases the precision of an output of the matrix operation because the lower significant bits may carry more information for training the machine learning model 112 than the higher significant bits. Techniques of amplifying or attenuating analog signals for a matrix operation are described herein.

Figure 2:
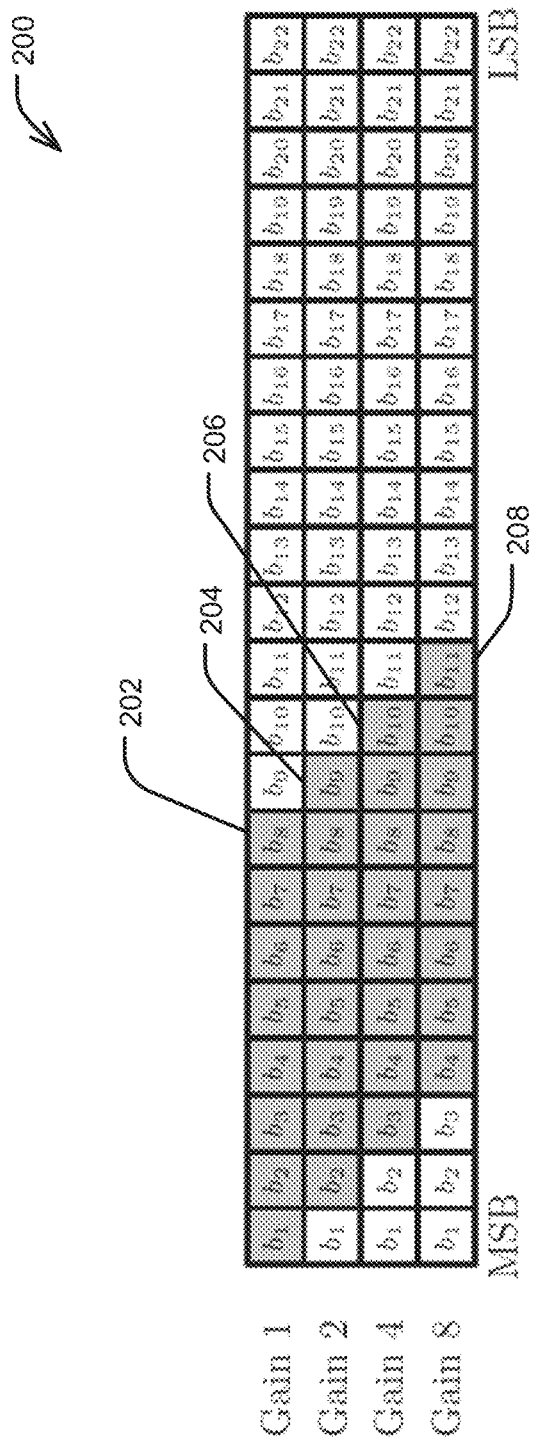
FIG. 2 shows a diagram illustrating effects of overamplification, according to some embodiments of the technology described herein.

FIG. 2 shows a diagram 200 illustrating effects of over-amplification, according to some embodiments of the technology described herein. The diagram 200 illustrates the bits of values that would be captured for different levels of overamplification. In the example of FIG. 2, there is a constant precision of 8 bits available to represent a 22 bit output. When no amplification is performed ("Gain 1"), the output captures the 8 most significant bits $b_1$-$b_8$ of the output as indicated by the set of highlighted blocks 202. When the analog signal is amplified by a factor of 2 ("Gain 2"), the output captures the bits $b_2$-$b_9$ of the output as indicated by the set of highlighted blocks 204. When the analog signal is amplified by a factor of 4 ("Gain 4"), the output captures the bits $b_3$-$b_{10}$ of the output as indicated by the set of highlighted blocks 206. When the analog signal is amplified by a factor of 8 ("Gain 8"), the output captures the bits $b_4$-$b_{11}$ of the output as indicated by the set of highlighted blocks 208. As can be understood from FIG. 2, increasing the gain allows the output to capture additional lower significant bits at the expense of higher significant bits.

The accumulation component 102C may be configured to determine an output of a matrix operation between two matrices by accumulating outputs of multiple matrix operations performed using the analog processor 106. In some embodiments, the accumulation component 102C may be configured to accumulate outputs by compiling multiple vectors in an output matrix. For example, the accumulation component 102C may store output vectors obtained from the analog processor (e.g., through the ADC 108) in columns or rows of an output matrix. To illustrate, the hybrid processor 100 may use the analog processor to perform a matrix multiplication between a weight matrix and an input matrix to obtain an output matrix. In this example, the accumulation component 102C may store the output vectors in an output matrix. In some embodiments, the accumulation component 102C may be configured to accumulate outputs by summing the output matrix with an accumulation matrix. The final output of a matrix operation may be obtained after all the output matrices have been accumulated by the accumulation component 102C.

In some embodiments, the hybrid processor 100 may be configured to determine an output of a matrix operation using tiling. Tiling may divide a matrix operation into multiple operations between smaller matrices. Tiling may allow reduction in size of the hybrid processor 100 by reducing the size of the analog processor 106. As an illustrative example, the hybrid processor 100 may use tiling to divide a matrix multiplication between two matrices into multiple multiplications between portions of each matrix. The hybrid processor 100 may be configured to perform the multiple operations in multiple passes. In such embodiments, the accumulation component 102C may be configured to combine results obtained from operations performed using tiling into an output matrix.

FIG. 3A illustrates an example matrix multiplication operation that may be performed by the hybrid processor 100, according to some embodiments of the technology described herein. For example, the matrix multiplication may be performed as part of training a neural network to determine an output of the neural network for an input. In the example of FIG. 3A, the matrix A may store the weights of a layer, and the matrix B may be an input matrix provided to the layer. The system may perform matrix multiplication between matrix A and matrix B to obtain output matrix C. The output matrix C may be an output of a layer of the neural network. In another example, the system may perform a convolution operation between a kernel matrix and an input matrix to obtain an output matrix.

Figure 3B:
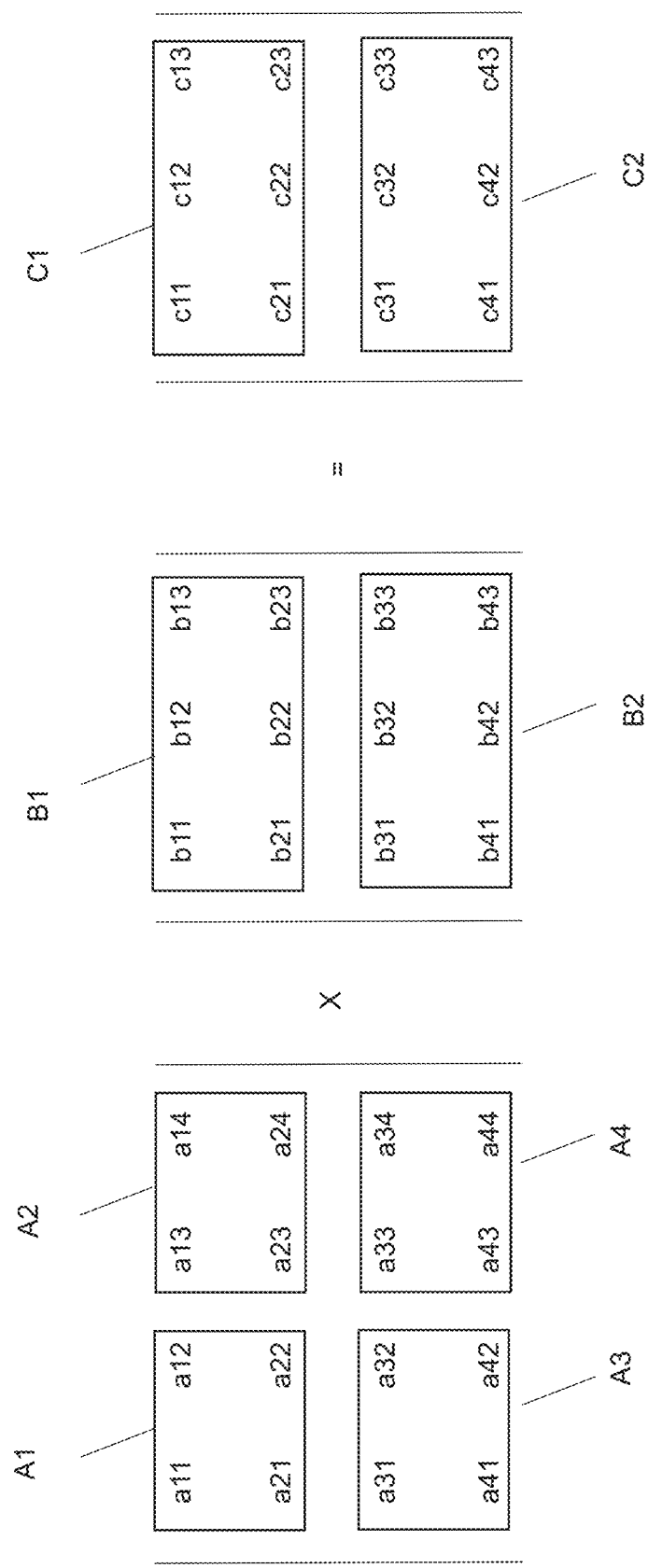
FIG. 3B illustrates an example tiling that may be used by the hybrid processor 100 to perform the matrix multiplication operation of FIG. 3A, according to some embodiments of the technology described herein.

FIG. 3B illustrates an example tiling that may be used by the hybrid processor 100 to perform the matrix multiplication operation of FIG. 3A, according to some embodiments of the technology described herein. In FIG. 3B, the hybrid processor 100 divides the matrix A into four tiles—A1, A2, A3, and A4. In this example, each tile of A has two rows and two columns (though other numbers of rows and columns are also possible). The hybrid processor 100 divides the matrix B into tile rows B1 and B2, and matrix C is segmented into rows C1 and C2. The row C1 and C2 are given by the following expressions:

$$C1 = A1*B1 + A2*B2 \quad (1)$$

$$C2 = A3*B1 + A4*B2 \quad (2)$$

In equation 1 above, the hybrid processor 100 may perform the multiplication of A1*B1 separately from the multiplication of A2*B2. The accumulation component 102C may subsequently accumulate the results to obtain C1. Similarly, in equation 2, the hybrid processor 100 may perform the multiplication of A3*B1 separately from the multiplication of A4*B2. The accumulation component 102C may subsequently accumulate the results to obtain C2.

The DAC 104 may be configured to convert digital signals provided by the digital controller 102 into analog signals for use by the analog processor 106. In some embodiments, the digital controller 102 may be configured to use the DAC 104 to program a matrix into the analog processor 106. The digital controller 102 may be configured to input the matrix into the DAC 104 to obtain one or more analog signals for the matrix. The analog processor 106 may be configured to perform a matrix operation using the analog signal(s) for the matrix. In some embodiments, the DAC 104 may be configured to program a matrix using a fixed point representation of numbers used by the analog processor 106.

The analog processor 106 may be configured to perform matrix operations on matrices programmed into the analog processor 106 (e.g., through the DAC 104) by the digital controller 102. As shown in FIG. 1B, in some embodiments, the matrix operations may include matrix operations for training the machine learning model 112 using gradient descent. For example, the matrix operations include forward pass matrix operations 106A to determine layer outputs of the neural network for a set of inputs (e.g., for an iteration of a gradient descent learning technique). The matrix operations further include backpropagation matrix operations 106B to determine one or more gradients. The gradient(s) may be used to update parameters (e.g., weights) of the neural network (e.g., in an iteration of a gradient descent learning technique). Examples of forward pass matrix operations 106A and backpropagation matrix operations 106B are described herein.

In some embodiments, the analog processor 106 may be configured to perform a matrix operation in multiple passes using matrix portions (e.g., portions of an input matrix and/or a weight matrix) determined by the digital controller 102. The analog processor 106 may be programmed using scaled matrix portions, and perform the matrix operations. For example, the analog processor 106 may be programmed with a scaled portion(s) of an input matrix (e.g., a scaled vector from the input matrix), and scaled portion(s) of a weight matrix (e.g., multiple scaled rows of the weight matrix). The programmed analog processor 106 may perform the matrix operation between the scaled portions of the input matrix and the weight matrix to generate an output. The output may be provided to the ADC 108 to be converted back into a digital floating-point representation (e.g., to be accumulated by accumulation component 102C to generate an output).

In some embodiments, a matrix operation may be repeated multiple times, and the results may be averaged to reduce the amount of noise present within the analog processor. In some embodiments, the matrix operations may be performed between certain bit precisions of the input matrix and the weight matrix. For example, an input matrix can be divided into two input matrices, one for the most significant bits in the fixed-point representation and another for the least significant bits in the fixed-point representation. A weight matrix may also be divided into two weight matrices, the first with the most significant bit portion and the second with the least significant bit portion. Multiplication between the original weight and input matrix may then be performed by performing a multiplications between: (1) the most-significant weight matrix and the most-significant input matrix; (2) the most-significant weight matrix and the least-significant input matrix; (3) the least-significant weight matrix and the most-significant input matrix; and (4) the least-significant weight matrix and the least-significant input matrix. The resulting output matrix can be reconstructed by taking into account the output bit significance.

The ADC 108 may be configured to receive an analog output of the analog processor 106, and convert the analog output into a digital signal. In some embodiments, the ADC 108 may include logical units and circuits that are configured to convert a values from a fixed-point representation to a digital floating-point representation used by the digital controller 102. For example, the logical units and circuits of the ADC 108 may convert a matrix from a fixed point representation of the analog processor 106 to a 16 bit floating-point representation ("float16" or "FP16"), a 32 bit floating-point representation ("float32" or "FP32"), a 64 bit floating-point representation ("float32" or "FP32"), a 16 bit brain floating-point format ("bfloat16"), a 32 bit brain floating-point format ("bfloat32"), or another suitable floating-point format. In some embodiments, the logical units and circuits may be configured to convert values from a first fixed-point representation to a second fixed-point representation. The first and second fixed-point representations may have different bit widths. In some embodiments, the logical units and circuits may be configured to convert a value into unums (e.g., posits and/or valids).

Figure 1C:
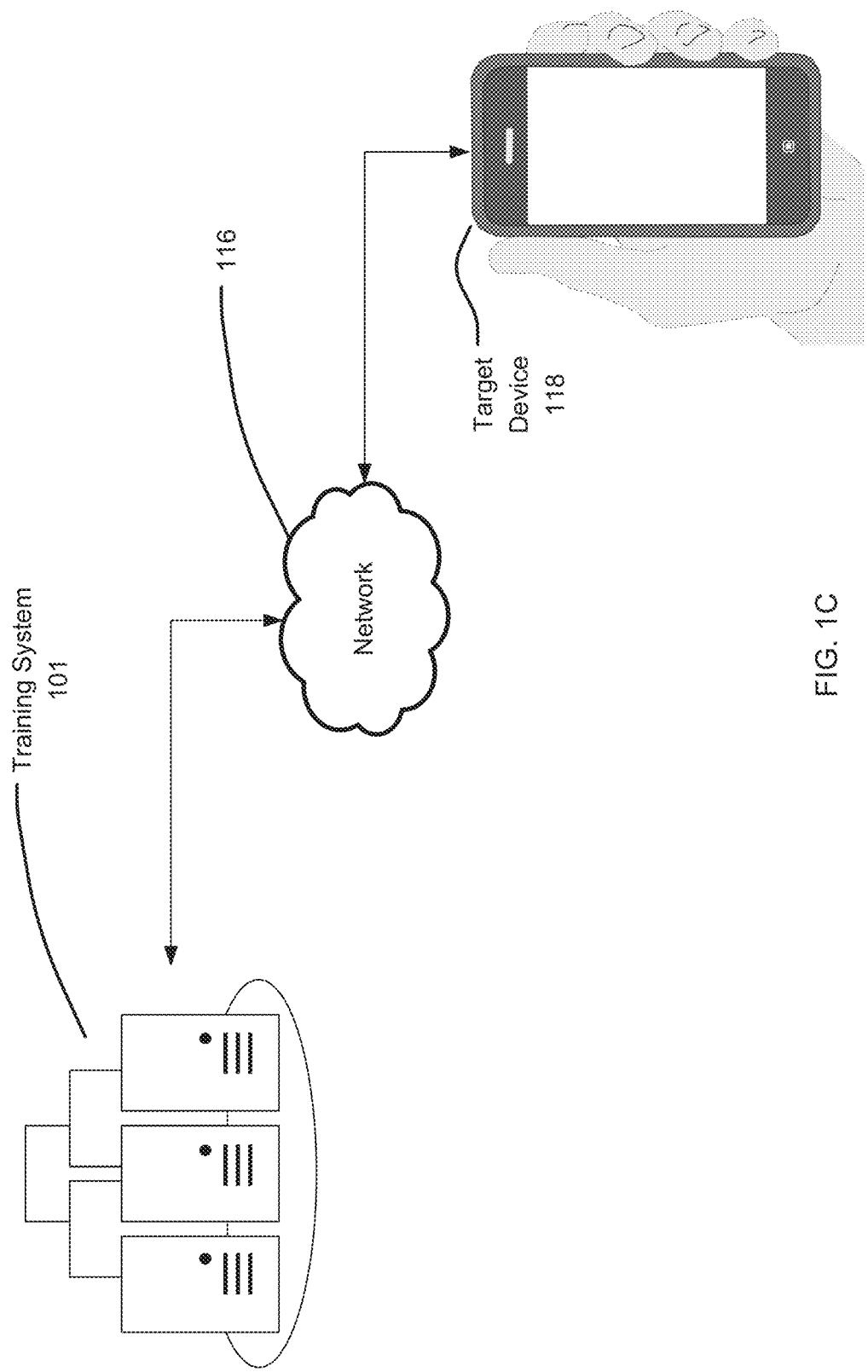
FIG. 1C shows a diagram illustrating an environment in which the training system may be used, according to some embodiments of the technology described herein.

FIG. 1C shows a diagram illustrating an environment in which the training system may be used, according to some embodiments of the technology described herein. The environment includes the training system 101, a communication network 112, and a device 118.

In the example of FIG. 1C, the training system 101 comprises a server. For example, the training system 101 may train the machine learning model 112 to obtain the trained machine learning model 114, and transmit the trained machine learning model 114 through the communication network 116 to the device 118. The trained machine learning model 114 may be trained using techniques described herein.

In the example of FIG. 1C, the device 118 is a mobile device. In some embodiments, the device 118 may be any suitable computing device. For example, the device 118 may be a laptop, computer, smartwatch, sensor, smart glasses, tablet, or other suitable computing device. The device 118 may be configured to obtain the machine learning model 114 from the training system 101. The device 118 may be configured to store the learned parameters 114A in memory of the device. The device 118 may be configured to use the learned parameters 114A to perform inference. To illustrate, the device 118 may receive a trained neural network with learned parameters (e.g., weights and biases). The device 118 may use the trained neural network to make an inference. For example, the device 118 may use the trained neural network to enhance images captured by a camera of the device 118, perform object detection in images of the device 118, predict a medical diagnosis using medical image data obtained by the device 118, predict a sensed value of a sensor of the device 118, or other inference using the neural network.

Although in the example embodiment of FIG. 1C the training system 101 is shown separate from the device 118, in some embodiments, the training system 101 may be a component of the device 118. In such embodiments, the training system 101 does not need to transmit a trained machine learning model through the communication network 116. The device 118 may be configured to use the machine learning model 114 trained by the training system 101.

In some embodiments, the device 118 may include the hybrid processor 100 described herein in reference to FIGS. 1A-1B. The device 118 may be configured to use the hybrid processor 100 to perform inference. The hybrid processor 100 may be configured to perform matrix operation(s) involved in performing inference using the analog processor 106. Example techniques of using the analog processor 106 to perform inference are described herein. The device 118 may be configured to use the hybrid processor 100 to determine an output of the neural network for an input by performing matrix operations to obtain an output of the neural network.

Figure 4:
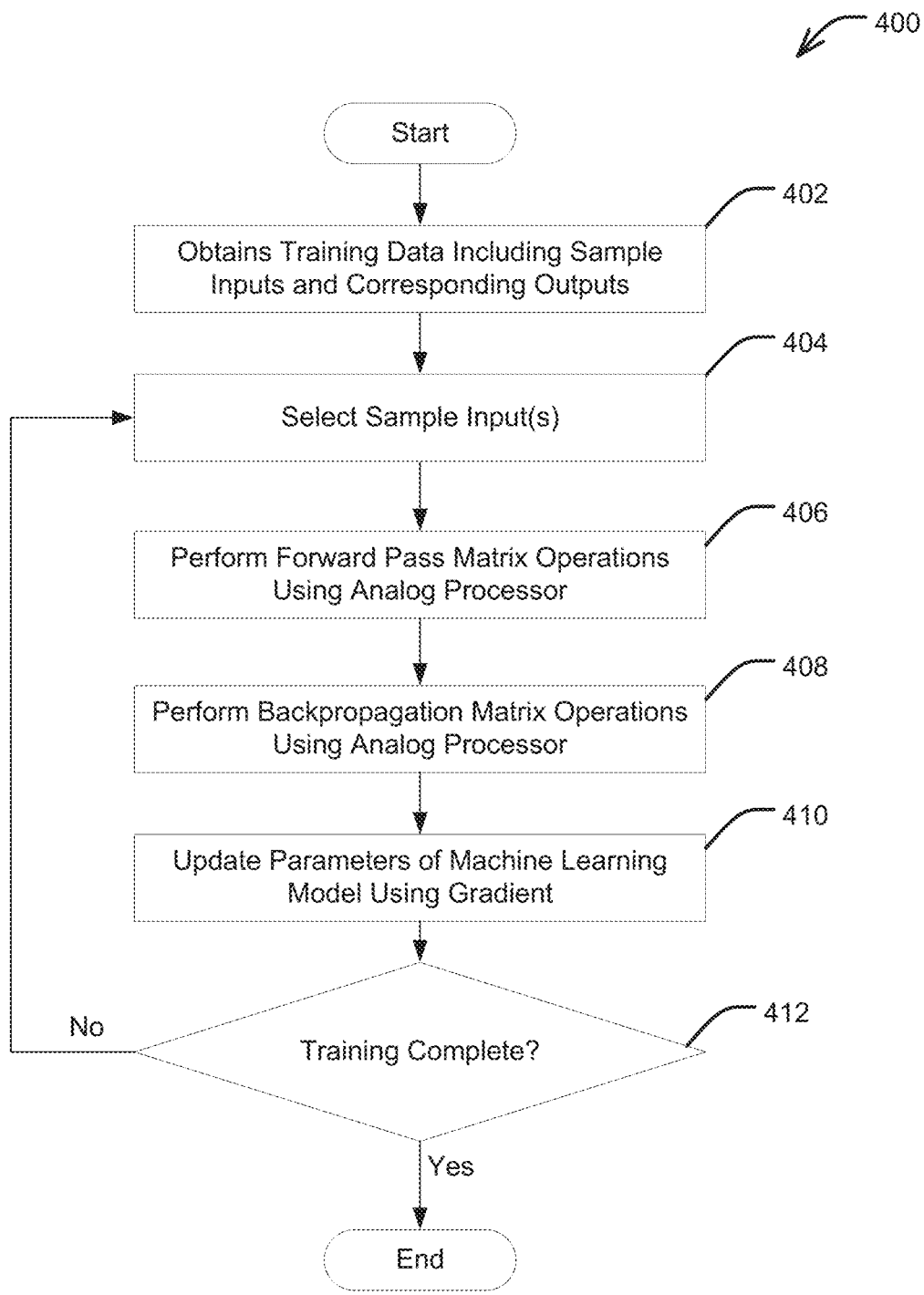
FIG. 4 shows a flowchart of an example process 400 of training a machine learning model using an analog processor, according to some embodiments of the technology described herein.

FIG. 4 shows a flowchart of an example process 400 of training a machine learning model using an analog processor, according to some embodiments of the technology described herein. The process 400 may be performed by the training system 101 described herein with reference to FIGS. 1A-1B. The training system 101 may be configured to perform the process 400 using the hybrid processor 100. For example, the process 400 may be performed to train a neural network. In some embodiments, the process 400 may be performed as part of a supervised learning technique (e.g., gradient descent).

Process 400 begins at block 402, where the system obtains training data including sample inputs for the machine learning model and corresponding outputs. In some embodiments, the corresponding outputs may be target outputs of the machine learning model for their respective inputs. The outputs may be used in process 400 to train parameters of the machine learning model. In some embodiments, the outputs may be pre-determined. For example, the machine learning model may be a neural network for image enhancement. In this example, the inputs may be input images that are to be enhanced by the neural network. The outputs may be target enhanced images corresponding to the input images. In another example, the machine learning model may be a neural network for determining a medical diagnosis of whether a subject has a medical condition. In this example, the inputs may be information about medical subjects, and the outputs may be diagnosis results of the medical conditions made by clinicians for the subjects. In some embodiments, the system may be configured to determine the outputs corresponding to the sample inputs. For example, the system may use a clustering technique to cluster the sample inputs into multiple different clusters, and then label each of the sample inputs based on which of the clusters the sample input belongs to. In this example, the label of each sample input may be the output corresponding to the sample input.

The sample inputs may be matrices storing feature values. For example, the matrices may be images storing pixel values. In some embodiments, the matrices may be vectors storing feature values. For example, each vector may store multiple feature values (e.g., subject information, pixel values, or other feature values). In some embodiments, the outputs may be matrices. For example, the outputs may be output images. In another example, the outputs may be output vectors. In some embodiments, the outputs may be single values. For example, each output may be a classification or an output value on a continuous scale (e.g., a probability value, or sensor output value).

Next, process 400 proceeds to block 404, where the system selects one or more sample inputs of the obtained sample inputs. In some embodiments, the system may be configured to randomly select the sample input(s). In some embodiments, the system may be configured to select a single sample. For example, the system may be using a stochastic gradient descent technique in which the system updates parameters of the model for each sample input. In some embodiments, the system may be configured to select multiple sample inputs. For example, the system may be using a batch or mini-batch gradient descent technique in which the system updates parameters of the model using multiple sample inputs in each iteration.

Next, process 400 proceeds to block 406, where the system performs forward pass matrix operations using the input(s) using an analog processor (e.g., analog processor 106 described herein with reference to FIGS. 1A-1C). In the example of a neural network, the neural network may include multiple layers. For a layer l of the neural network, a forward pass matrix operations may include matrix operations to determine an output $y^l$ of the layer ("layer output") for an input $x^l$ to the layer ("layer input") may be given by equation 3 below.

$$y^l = w^l \times x^l + b^l \qquad (3)$$

In equation 1 above, $w^l$ is a weight matrix that is multiplied by input matrix $x^l$. A bias tensor $b^l$ is added to the result of the matrix multiplication. The output $y^l$ is then fed to a nonlinear function to produce an input to a subsequent layer, or an output of the neural network. The system may be configured to perform the matrix operation of equation 3 multiple times for multiple layers of the neural network to obtain an output of the neural network. The system may be configured to perform a forward pass for each of the sample input(s) selected at block 404. The system may be configured to perform the forward pass matrix operations using an analog processor (e.g., analog processor 106). Techniques of performing a matrix operation are described herein with reference to FIG. 5 and FIG. 6.

The matrix operations of block 406 may be performed by an analog processor (e.g., to perform the operations more efficiently). For example, the matrix operation given by equation 1 may be performed in the analog domain using the analog processor. Example techniques of how the system may perform the forward pass matrix operations using an analog processor are described herein with reference to FIGS. 5-8. For example, the system may be configured to use ABFP for the matrices involved in the operation to perform the matrix operations using the analog processor. Equation 4 below illustrates how the matrix operation of equations 1 may be performed using an analog processor.

$$y^l \approx Q_{out}(Q_{weight}(w^l) * Q_{input}(x^l) * (\text{scaling factor}(s))) + b^l \qquad (4)$$

In equations 4 above $Q_{out}$ indicates an output of a matrix operation in the analog domain, $Q_{weight}$ indicates a weight matrix in the analog domain, and $Q_{in}$ indicates an input matrix in the analog domain. The scaling factor(s) in each equation may be obtained using scaling factor(s) of ABFP representations of the matrices involved in the matrix operation.

Next, process 400 proceeds to block 408, where the system performs backpropagation matrix operations (e.g., matrix multiplications) using an analog processor to obtain a gradient. Continuing with the example above, a neural network may include multiple layers. The backpropagation matrix operations may include operations to determine one or more gradients using outputs use outputs of the neural network obtained by performing the forward pass matrix operations at block 406. The hybrid processor 100 may use the gradient of a loss function with respect to an output of the layer to compute the gradient of the loss function with respect to weights, input, and/or bias. The gradient of the loss function with respect to weight $$\frac{\partial L}{\partial w^l}$$

may be determined by performing the matrix operation of equation 5 below, and the gradient of the loss function with respect to input $$\frac{\partial L}{\partial x^l}$$

may be determined by performing the matrix operation of equation 6 below.

$$\frac{\partial L}{\partial w^l} = \frac{\partial L}{\partial y^l} * (x^l)^T \qquad (5)$$

$$\frac{\partial L}{\partial x^l} = (w^l)^T * \frac{\partial L}{\partial y^l} \qquad (6)$$

In equations 5 and 6 above, $$\frac{\partial L}{\partial y^l}$$

is the gradient of the loss function with respect to a layer output, which may be determined using an output determined for the layer. In some embodiments, the system may be configured to determine a gradient for a sample input selected at block 404. In some embodiments, the system may be configured to determine an average gradient of multiple sample inputs selected at block 404. Techniques of performing a matrix operation are described herein with reference to FIG. 5 and FIG. 6.

The matrix operations of block 406 may be performed by an analog processor (e.g., to perform the operations more efficiently). For example, the matrix operations given by equations 3 and 4 may be performed in the analog domain using the analog processor. Example techniques of how the system may perform the forward pass matrix operations using an analog processor are described herein with reference to FIGS. 5-8. For example, the system may be configured to use ABFP for the matrices involved in the operation to perform the matrix operations using the analog processor. Equations 7 and 8 below illustrate how the respective matrix operations of equations 3 and 4 may be performed using an analog processor.

$$\frac{\partial L}{\partial w^{(l)}} \approx Q_{out}\left(Q_{weight}\left(\frac{\partial L}{\partial y^{(l)}}\right) * Q_{in}\left((x^{(l)})^T\right)\right) * \text{(scaling factor(s))} \quad (7)$$

$$\partial L/\partial x^{(l)} \approx Q_{out}\left(Q_{weight}\left((w^{(l)})^T\right) * Q_{in}\left(\frac{\partial L}{\partial y^{(l)}}\right)\right) * \text{(scaling factor(s))} \quad (8)$$

In equations 7 and 8 above $Q_{out}$ indicates an output of a matrix operation in the analog domain, $Q_{weight}$ indicates a weight matrix in the analog domain, and $Q_{in}$ indicates an input matrix in the analog domain. The scaling factor(s) in each equation may be obtained using scaling factor(s) of ABFP representations of the matrices involved in the matrix operation.

Next, process 400 proceeds to block 410, where the system updates parameters of the machine learning model using the determined gradient. In some embodiments, the system may be configured to update the parameters of the machine learning model by adding or subtracting a proportion of the gradient. For example, the system may update weights and/or biases of the neural network using the gradient. In some embodiments, the system may be configured to determine updated parameters of the machine learning model as an average of parameters determined in one or more previous iterations. An example process of determining updated parameters is described in process 1100 described herein with reference to FIG. 11.

Figure 5:
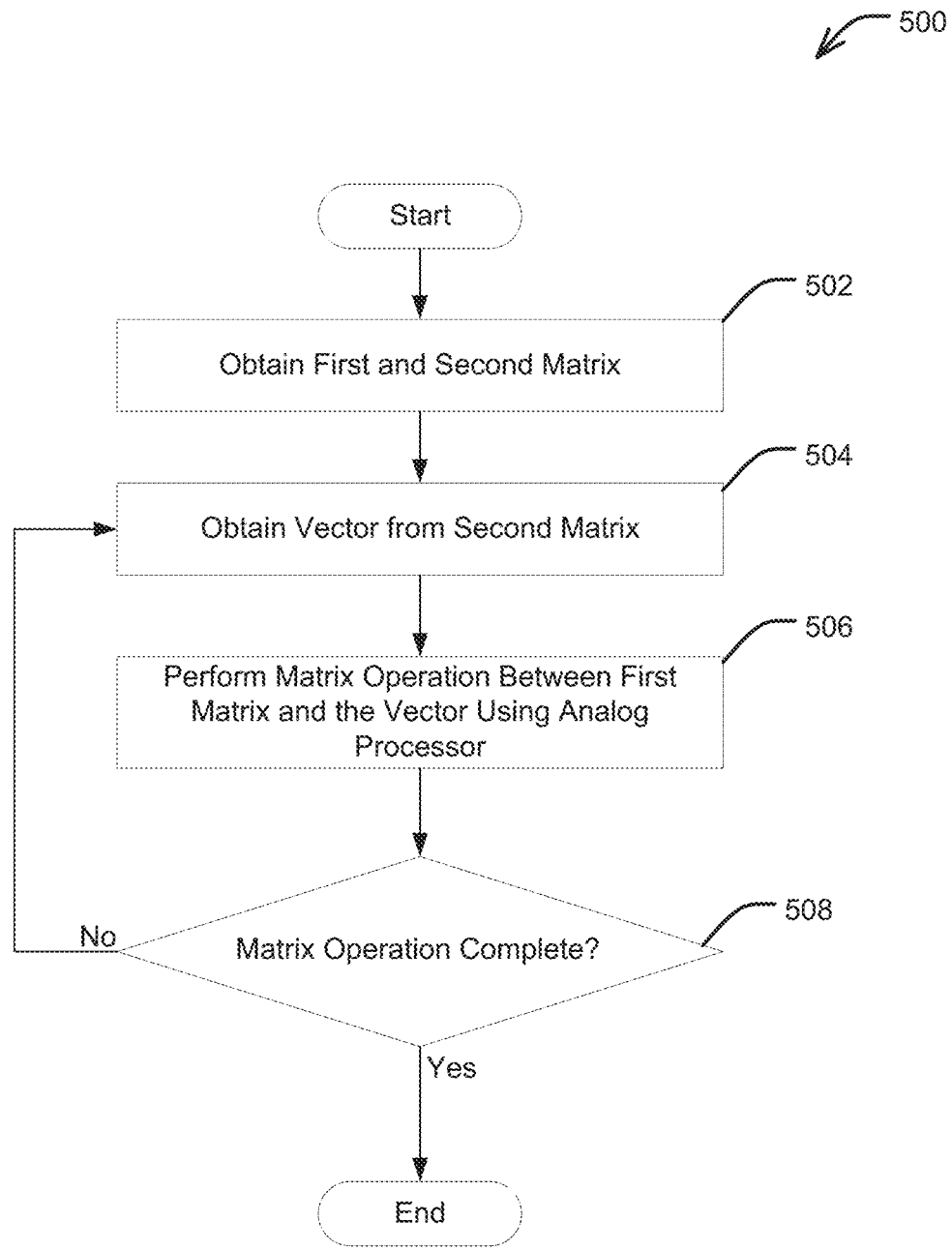
FIG. 5 shows a flowchart of an example process of performing a matrix operation between two matrices, according to some embodiments of the technology described herein

FIG. 5 shows a flowchart of an example process 500 of performing a matrix operation between two matrices, according to some embodiments of the technology described herein. In some embodiments, the matrix operation may be a matrix multiplication. Process 500 may be performed by training system 101 described herein with reference to FIGS. 1A-1C. Process 500 may be performed as part of the acts performed at block 406 and/or block 408 of process 400 described herein with reference to FIG. 4. In some embodiments, process 500 may be performed to perform inference (e.g., using hybrid processor 100). For example, the process 500 may be performed to determine an output of a trained neural network for an input to the neural network.

Process 500 begins at block 502, where the system obtains a first and second matrix. As an illustrative example, the matrices may consist of a weight matrix for a neural network layer and an input vector for the neural network layer (e.g., to perform a forward pass matrix operation at block 406). In another example, the matrices may consist of a gradient matrix of a loss function with respect to an output of a layer, and an input vector for the layer (e.g., to perform a backpropagation matrix operation at block 408). In another example, the matrices may consist of a weight matrix for a layer of a neural network and a gradient matrix of a loss function with respect to output of the layer (e.g., to perform a backpropagation matrix operation at block 408). In some embodiments, the matrices may be portions of other matrices. For example, the system may be configured to obtain tiles of the matrices as described herein in reference to FIGS. 3A-3B. To illustrate, the first matrix may be a tile obtained from a weight matrix of a neural network layer, and the second matrix may be an input matrix corresponding to the tile.

Next, process 500 proceeds to block 504, where the system obtains a vector from the second matrix. In some embodiments, the system may be configured to obtain the vector by obtaining a column of the second matrix. For example, the system may obtain a vector corresponding to a tile of a weight matrix.

Next, process 500 proceeds to block 506, where the system performs the matrix operation between the first matrix and the vector using an analog processor. For example, the system may perform a matrix multiplication between the first matrix and the vector. In this example, the output of the matrix multiplication may be a row of an output matrix or a portion thereof. An example technique by which the system performs the matrix operation using the analog processor is described in process 600 described herein with reference to FIG. 6.

Next, process 500 proceeds to block 508, where the system determines whether the matrix operation between the first and second matrix has been completed. In some embodiments, the system may be configured to determine whether the first and second matrix has been completed by determining whether all vectors of the second matrix have been multiplied by the first matrix. For example, the system may determine whether the first matrix has been multiplied by all columns of the second matrix. If the system determines that the matrix operation is complete, then process 500 ends. If the system determines that the matrix operation is not complete, then process 500 proceeds to block 504, where the system obtains another vector from the second matrix.

Figure 6:
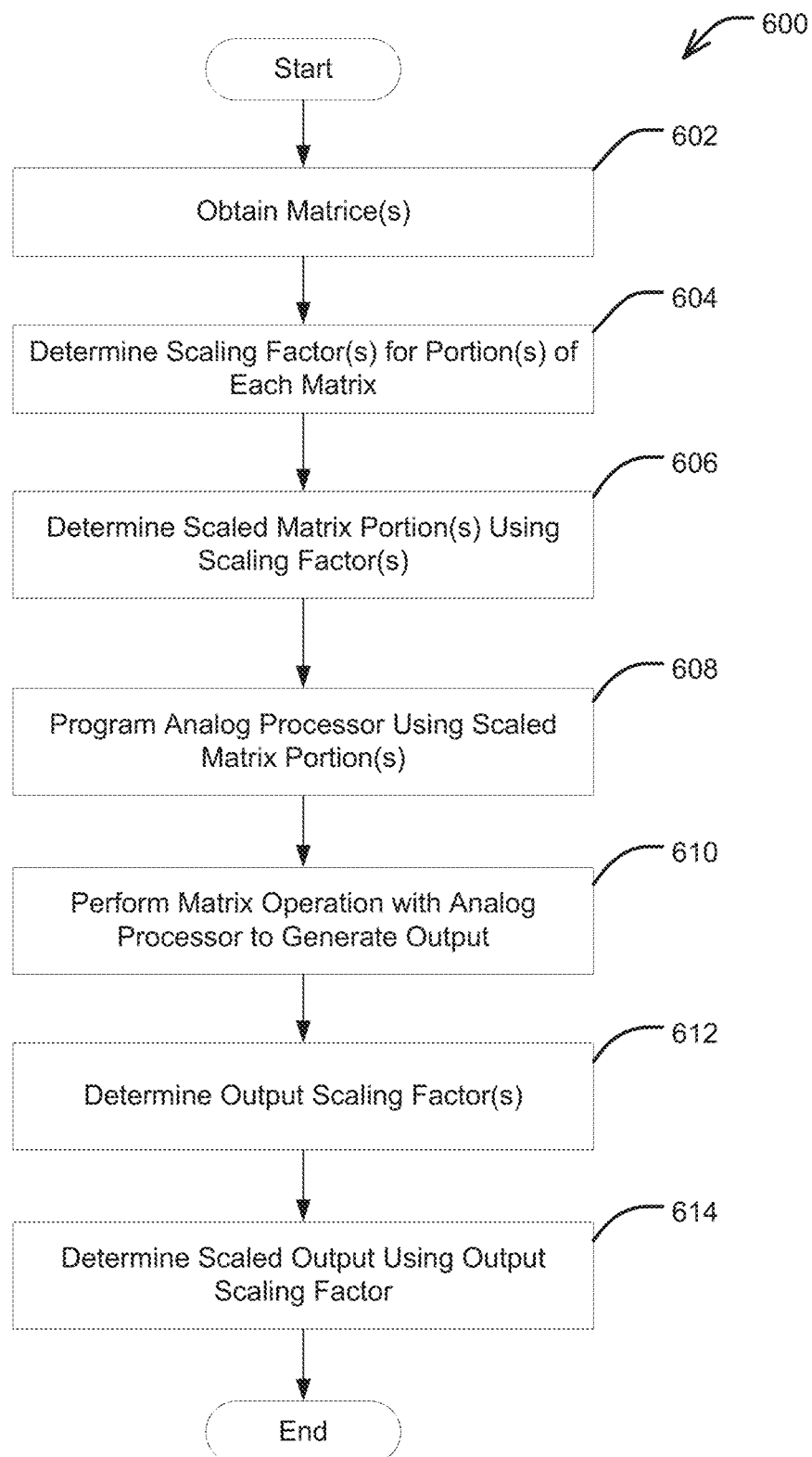
FIG. 6 shows a flowchart of an example process of performing a matrix operation using an analog processor, according to some embodiments of the technology described herein.

FIG. 6 shows a flowchart of an example process 600 of performing a matrix operation using an analog processor, according to some embodiments of the technology described herein. Process 600 may be performed by training system 101 described herein with reference to FIGS. 1A-1C. For example, process 600 may be performed by the hybrid processor 100 of the training system 101. Process 600 may be performed at block 506 of process 500 described herein with reference to FIG. 5. Process 600 may be performed at blocks 406 and 408 of process 400 described herein with reference to FIG. 4. In some embodiments, process 600 may be performed to perform inference (e.g., using hybrid processor 100). For example, the process 600 may be performed to determine an output of a trained neural network for an input to the neural network.

Process 600 begins at block 602, where the system obtains one or more matrices. For example, the matrices may consist of a matrix and a vector as described at block 506 of process 500. To illustrate, a first matrix be a weight matrix or portion thereof for a neural network layer, and a second matrix may be an input vector or portion thereof for the neural network later. In another example, the first matrix may be a weight matrix or portion thereof, and a second matrix may be a column vector or portion thereof from an input matrix.

Next, process 600 proceeds to block 604, where the system determines a scaling factor for one or more portions of each matrix involved in the matrix operation (e.g., each matrix and/or vector). In some embodiments, the system may be configured to determine a single scaling factor for the entire matrix. For example, the system may determine a single scaling factor for an entire weight matrix. In another example, the matrix may be a vector, and the system may determine a scaling factor for the vector. In some embodiments, the system may be configured to determine different scaling factors for different portions of the matrix. For example, the system may determine a scaling factor for each row or column of the matrix. Example techniques of determining a scaling factor for a portion of a matrix are described herein in reference to scaling component 102B of FIG. 1B.

Next, process 600 proceeds to block 606, where the system determines, for each matrix, scaled matrix portion(s) using the determine scaling factor(s). In some embodiments, the system may be configured to determine: (1) scaled portion(s) of a matrix (e.g., a weight matrix) using scaling factor(s) determined for the matrix; and (2) a scaled vector using a scaling factor determined for the vector. In one example, if the system determined a scaling factor for an entire matrix, the system may scale the entire matrix using the scaling factor. In another example, if the system determined a scaling factor for each row or column of a matrix, the system may scale each row or column using its respective scaling factor. Example techniques of scaling a portion of a matrix using its scaling factor are described herein in reference to scaling component 102B of FIG. 1B.

Next, process 600 proceeds to block 608, where the system programs an analog processor to using the scaled matrix portion(s). In some embodiments, for each matrix, the system may be configured to program scaled portion(s) of the matrix into the analog processor. The system may be configured to program the scaled portion(s) of the matrix into the analog processor using a DAC (e.g., DAC 104 described herein with reference to FIGS. 1A-1C). In some embodiments, the system may be configured to program the scaled portion(s) of the matrix into a fixed-point representation. For example, prior to being programmed into the analog processor, the numbers of a matrix may be stored using a floating-point representation used by digital controller 102. After being programmed into the analog processor, the numbers may be stored in a fixed-point representation used by the analog processor 106. In some embodiments, the dynamic range of the fixed-point representation may be less than that of the floating-point representation.

Next, process 600 proceeds to block 610, where the system performs the analog processor programmed using the scaled matrix portion(s). The analog processor may be configured to perform the matrix operation (e.g., matrix multiplication) using analog signals representing the scaled matrix portion(s) to generate an output. In some embodiments, the system may be configured to provide the output of the analog processor to an ADC (e.g., ADC 108) to be converted into a digital format (e.g., a floating-point representation).

Next, process 600 proceeds to block 612, where the system determines an output scaling factor. The system may be configured to determine the output scaling factor to perform an inverse of the scaling performed at block 606. In some embodiments, the system may be configured to determine an output scaling factor using input scaling factor(s). For example, the system may determine an output scaling factor as a product of input scaling factor(s). In some embodiments, the system may be configured to determine an output scaling factor for each portion of an output matrix (e.g., each row of an output matrix). For example, if at block 606 the system had scaled each row using a respective scaling factor, the system may determine an output scaling factor for each row using its respective scaling factor. In this example, the system may determine an output scaling factor for each row by multiplying the input scaling factor by a scaling factor of a vector that the row was multiplied with to obtain the output scaling factor for the row.

Next, process 600 proceeds to block 614, where the system determines a scaled output using the output scaling factor(s) determined at block 614. For example, the scaled output may be a scaled output vector obtained by multiplying each value in an output vector with a respective output scaling factor. In another example, the scaled output may be a scaled output matrix obtained by multiplying each row with a respective output scaling factor. In some embodiments, the system may be configured to accumulate the scaled output to generate an output of a matrix operation. For example, the system may add the scaled output to another matrix in which matrix operation outputs are being accumulated. In another example, the system may sum an output matrix with a bias term.

Figure 7:
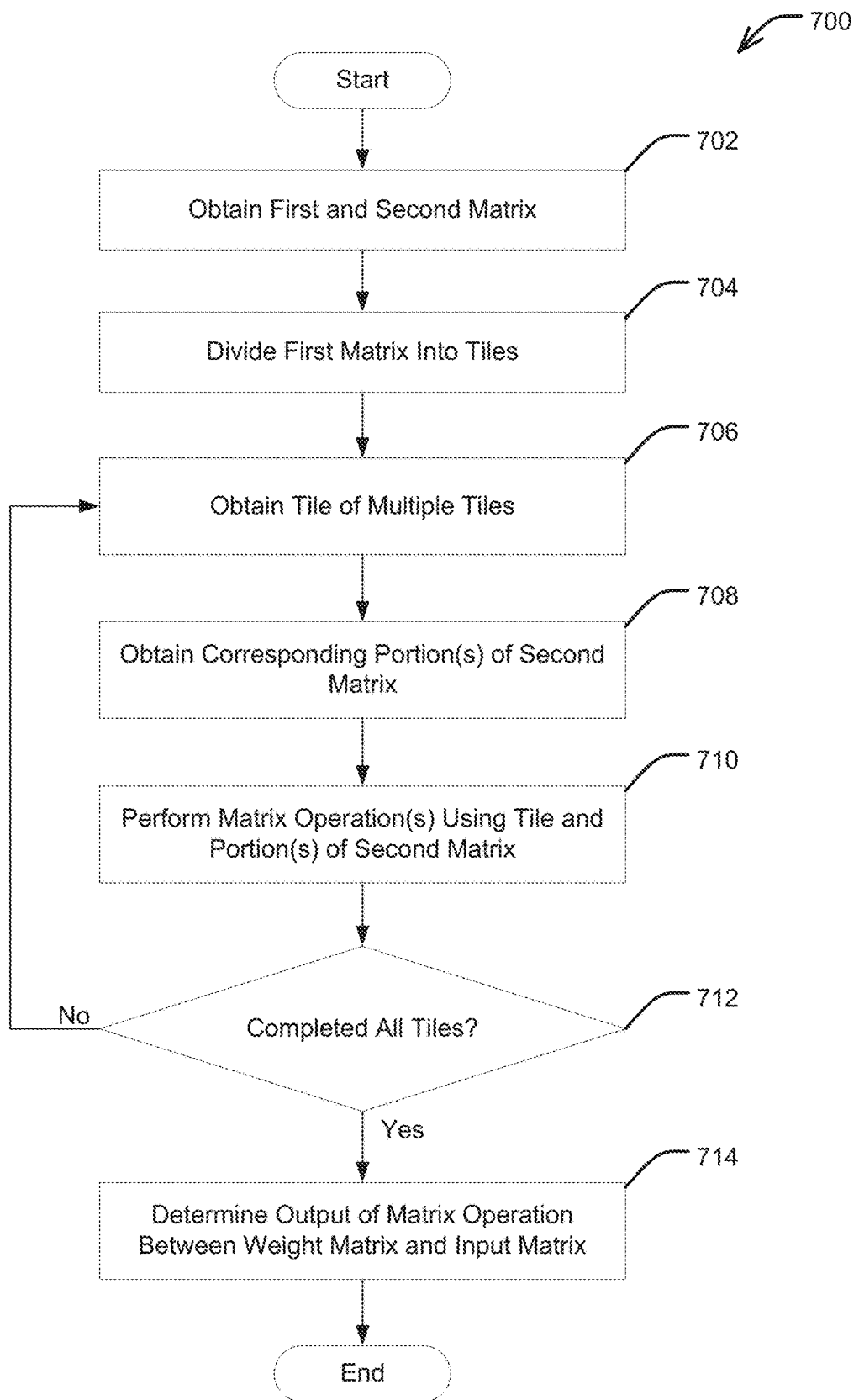
FIG. 7 shows a flowchart of an example process of using tiling to perform a matrix operation, according to some embodiments of the technology described herein.

FIG. 7 shows a flowchart of an example process 700 of using tiling to perform a matrix operation, according to some embodiments of the technology described herein. Process 700 may be performed by the training system 101 described herein with reference to FIGS. 1A-1C. In some embodiments, process 700 may be performed as part of process 600 described herein with reference to FIG. 6, process 500 described herein with reference to FIG. 5, and/or process 400 described herein with reference to FIG. 4.

Process 700 begins at block 702, where the system obtains a first and second matrix that are involved in a matrix operation. In some embodiments, the matrix operation may be a matrix multiplication. For example, the first matrix may be a weight matrix for a neural network layer and the second matrix may be an input matrix for the neural network layer. In another example, the first matrix may be a gradient of a loss function with respect to an output of a neural network layer, and the second matrix may be a weight matrix for the neural network layer. In yet another example, the first matrix may be a gradient of a loss function with respect to an output of a neural network layer, and the second matrix may be an input matrix for the neural network layer.

Next, process 700 proceeds to block 704, where the system divides the first matrix into multiple tiles. For example, the system may divide a weight matrix into multiple tiles. An example technique for dividing a matrix into tiles is described herein with reference to FIGS. 3A-3B.

Next, process 700 proceeds to block 706, where the system obtains a tile of the multiple tiles. After selecting a tile at block 706, process 700 proceeds to block 708, where the system obtains corresponding portions of the second matrix. In some embodiments, the corresponding portion(s)

of the second matrix may be one or more vectors of the second matrix. For example, the corresponding portion(s) may be one or more column vectors from the second matrix. The column vector(s) may be those that align with the tile matrix for a matrix multiplication.

Next, process 700 proceeds to block 708, where the system performs one or more matrix operations using the tile and the portion(s) of the second matrix. In some embodiments, the system may be configured to perform process 600 described herein with reference to FIG. 6 to perform the matrix operation. In embodiments in which the portion(s) of the second matrix are vector(s) (e.g., column vector(s)) from the second matrix, the system may perform the matrix multiplication in multiple passes. In each pass, the system may perform a matrix multiplication between the tile and a vector (e.g., by programming an analog processor with a scaled tile and scaled vector to obtain an output of the matrix operation.) In some embodiments, the system may be configured to perform the operation in a single pass. For example, the system may program the tile and the portion(s) of the second matrix into an analog processor and obtain an output of the matrix operation performed by the analog processor.

Next, process 700 proceeds to block 712, where the system determines whether all the tiles of the first matrix have been completed. The system may be configured to determine whether all the tiles have been completed by determining whether the matrix operations (e.g., multiplications) for each tile have been completed. If the system determines that the tiles have not been completed, then process 700 proceeds to block 706, where the system obtains another tile.

If the system determines that the tiles have been completed, then process 700 proceeds to block 714, where the system determines an output of the matrix operation between the weight matrix and an input matrix. In some embodiments, the system may be configured to accumulate results of matrix operation(s) performed for the tiles into an output matrix. The system may be configured to initialize an output matrix. For example, for a multiplication of a 4×4 matrix with a 4×2 matrix, the system may initialize 4×2 matrix. In this example, the system may accumulate an output of each matrix operation in the 4×2 matrix (e.g., by adding the output of the matrix operation with a corresponding portion of the output matrix).

Figure 8:
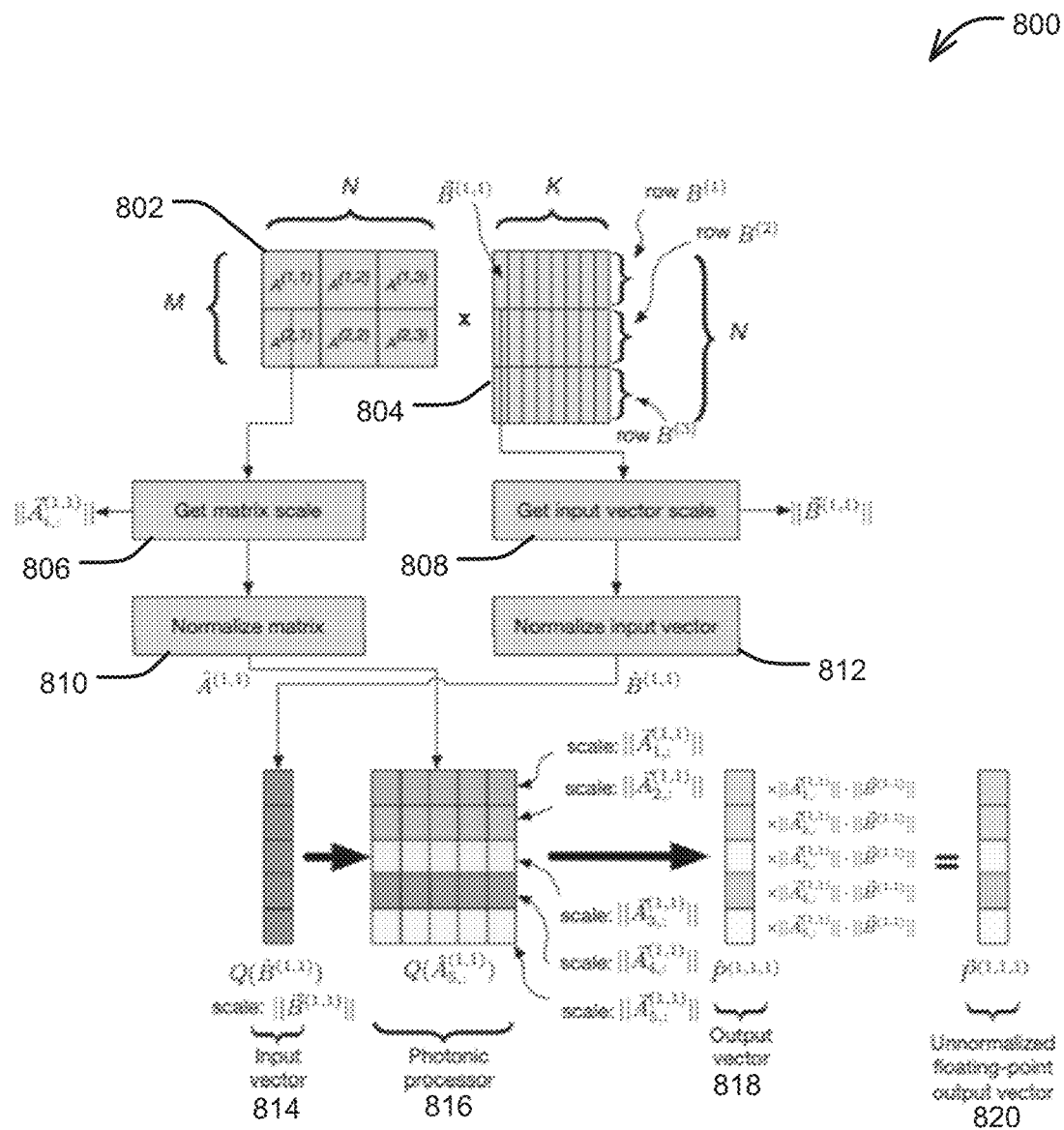
FIG. 8 shows a diagram illustrating performance of an example matrix operation by performing process described herein with reference to, according to some embodiments of the technology described herein.

FIG. 8 shows a diagram 800 illustrating performance of an example matrix operation by performing process 600 described herein with reference to FIG. 6, according to some embodiments of the technology described herein. In the example of FIG. 8, the analog processor is a photonic processor. In some embodiments, a different type of analog processor may be used instead of a photonic processor in the diagram 800 illustrated by FIG. 8.

The diagram 800 shows a matrix operation in which the matrix 802 is to be multiplied by a matrix 804. The matrix 802 is divided into multiple tiles labeled $A^{(1,1)}$, $A^{(1,2)}$, $A^{(1,3)}$, $A^{(2,1)}$, $A^{(2,2)}$, $A^{(2,3)}$. The diagram 800 shows a multiplication performed between the tile matrix $A^{(1,1)}$ from matrix 802 and a corresponding column vector $B^{(1,1)}$ from the matrix 804. At block 806, a scaling factor (also referred to as "scale") is determined for the tile $A^{(1,1)}$, and at block 808 a scale is determined for the input vector $B^{(1,1)}$. Although the embodiment of FIG. 8 shows that a single scale is determined for the tile at block 806, in some embodiments the system may determine multiple scales for the tile matrix. For example, the system may determine a scale for each row of the tile. Next, at block 810 the tile matrix is normalized using the scale determined at block 806, and the input vector is normalized using the scale determined at block 808. The tile matrix may be normalized by determining a scaled tile matrix using the scale obtained at block 806 as described at block 606 of process 600. Similarly, the input vector may be normalized by determined a scaled input vector using the scale obtained at block 808 as described at block 606 of process 600.

The normalized input vector is programmed into the photonic processor as illustrated at reference 814, and the normalized tiled matrix is programmed into the photonic processor as illustrated at reference 816. The tile matrix and the input vector may be programmed into the photonic processor using a fixed-point representation. The tile matrix and input vector may be programmed into the photonic processor using a DAC. The photonic processor performs a multiplication between the normalized tile matrix and input vector to obtain the output vector 818. The output vector 818 may be obtained by inputting an analog output of the photonic processor into an ADC to obtain the output vector 818 represented using a floating-point representation. Output scaling factors are then used to determine the unnormalized output vector 820 from the output vector 818 (e.g., as described at blocks 612-614 of process 600). The unnormalized output vector 820 may then be accumulated into an output matrix for the matrix operation between matrix 802 and matrix 804. For example, the vector 820 may be stored in a portion of a column of the output matrix. The process illustrated by diagram 800 may be repeated for each tile of matrix 802 and corresponding portion(s) of matrix 804 until the multiplication is completed.

Figure 9:
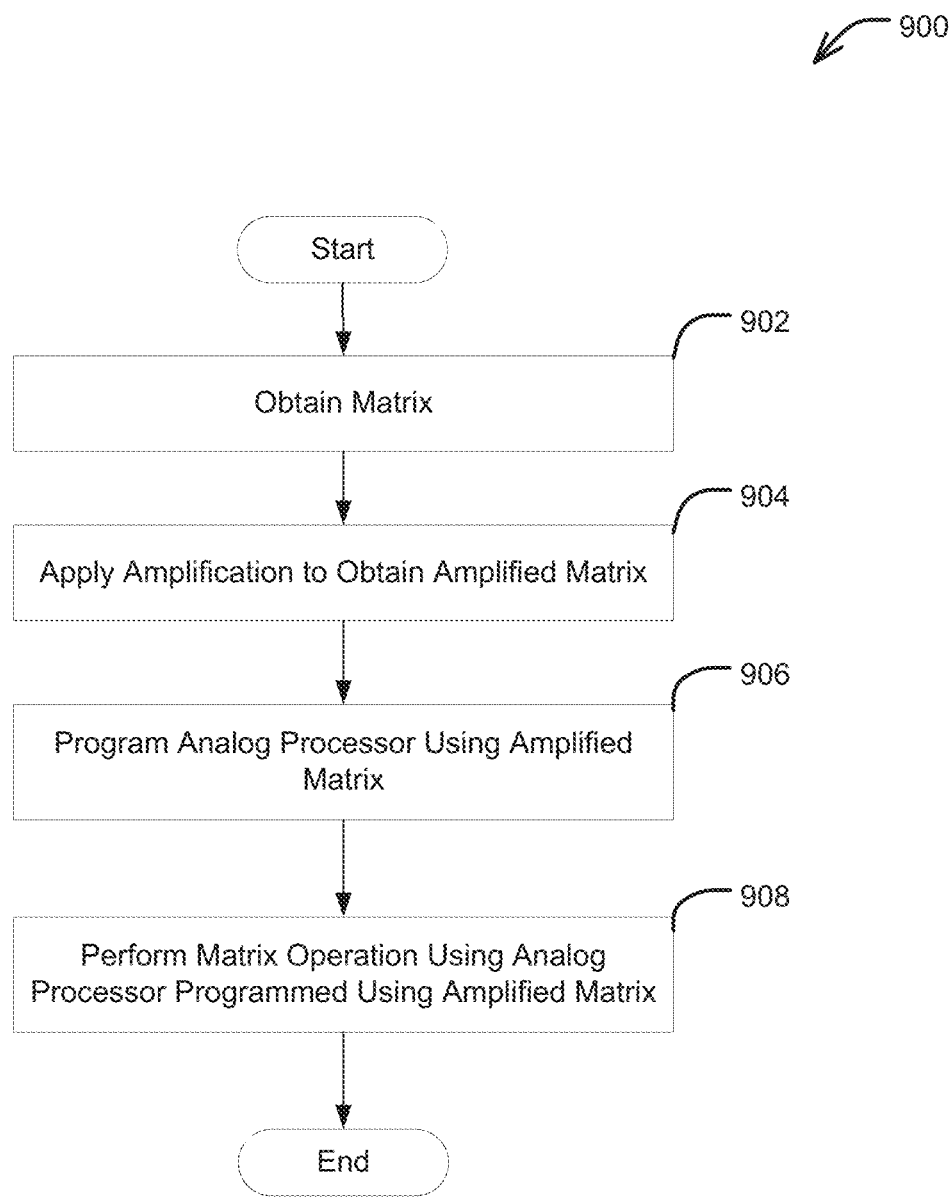
FIG. 9 shows a diagram illustrating an example technique of performing overamplification, according to some embodiments of the technology described herein.

FIG. 9 shows a diagram 900 illustrating an example technique of performing overamplification, according to some embodiments of the technology described herein. Process 900 may be performed by training system 101 described herein with reference to FIGS. 1A-1C. Process 900 may be performed as part of process 600 described herein with reference to FIG. 6. For example, process 900 may be performed as part of programming an analog processor at block 608 of process 600. As described herein, overamplification may allow the system to capture lower significant bits of an output of an operation that would otherwise not be captured. For example, an analog processor of the system may use a fixed-bit representation of numbers that is limited to a constant number of bits. In this example, the overamplification may allow the analog processor to capture additional lower significant bits in the fixed-bit representation.

Process 900 begins at block 902, where the system obtains a matrix. The system may be configured to obtain a matrix. For example, the system may obtain a matrix as described at blocks 602-606 of process 600 described herein with reference to FIG. 6. The matrix may be a scaled matrix or portion thereof (e.g., a tile or vector). In some embodiments, the system may be configured to obtain a matrix without any scaling applied to the matrix.

Next, process 900 proceeds to block 904, where the system applies amplification to the matrix to obtain an amplified matrix. In some embodiments, the system may be configured to apply amplification to a matrix by multiplying the matrix by a gain factor prior to programming the analog processor. For example, the system may multiply the matrix by a gain factor of 2, 4, 8, 16, 32, 64, 128, or another exponent of 2. To illustrate, the system may be limited to b bits for representation of a number output by the analog processor (e.g., through an ADC). A gain factor of 1 results in obtaining b bits of the output starting from the most significant bit, a gain factor of 2 results in obtaining b bits of the output starting from the $2^{nd}$ most significant bit, and a gain factor of 3 results in obtaining b bits of the output starting from the $3^{rd}$ most significant bit. In this manner, the system may increase lower significant bits captured in an output at the expense of higher significant bits. In some embodiments, a distribution of outputs of a machine learning model (e.g., layer outputs and inference outputs of a neural network) may not reach one or more of the most significant bits. Thus, in such embodiments, capturing lower significant bit(s) at the expense of high significant bit(s) during training of a machine learning model and/or inference may improve the performance of the machine learning model. Accordingly, overamplification may be used to capture additional lower significant bit(s).

Figure 10:
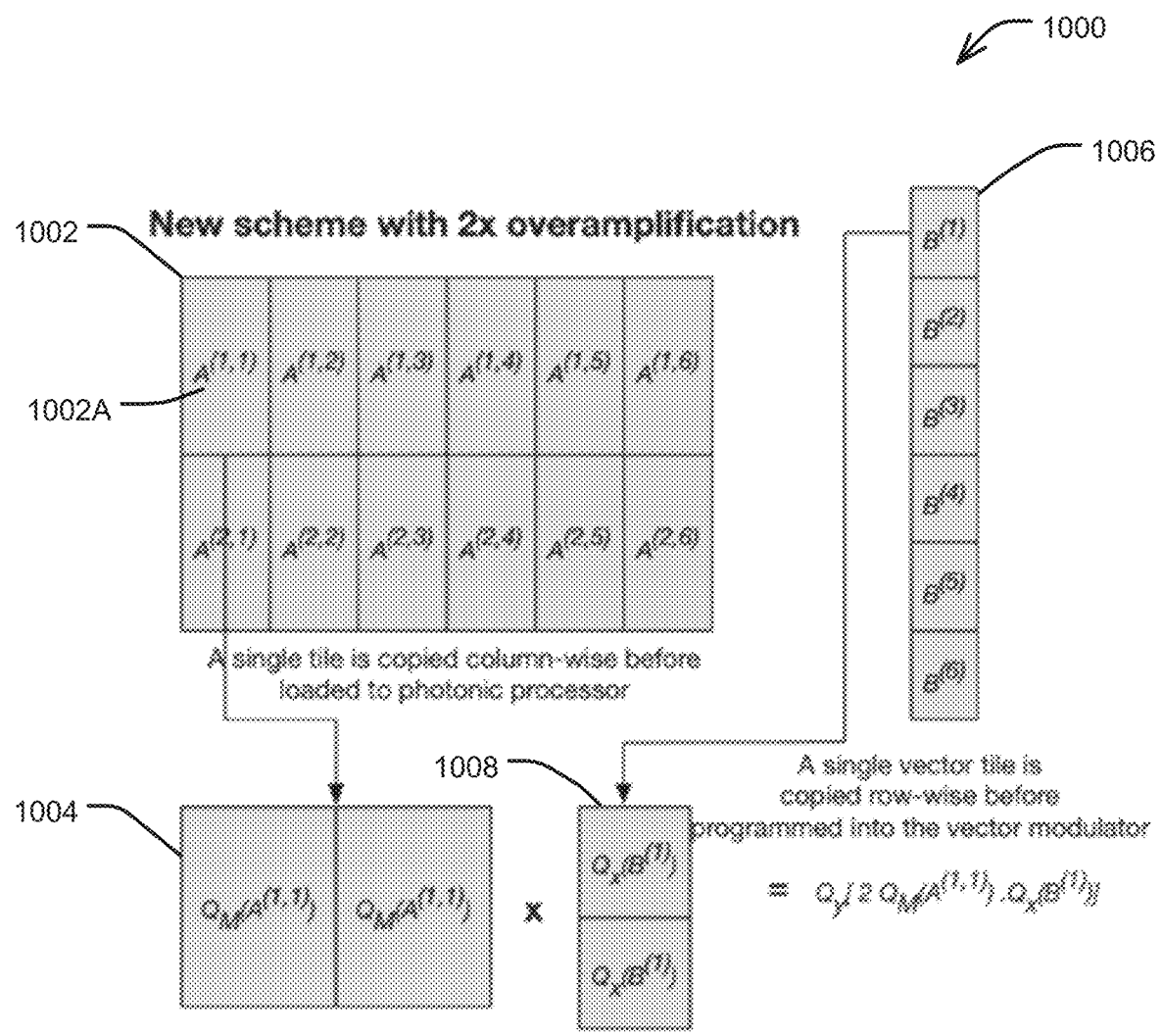
FIG. 10 shows a diagram illustrating amplification by copying a matrix, according to some embodiments of the technology described herein.

In some embodiments, the system may be configured to apply amplification by: (1) obtaining a copy of the matrix; and (2) appending the copy of the matrix to the matrix. FIG. 10 shows a diagram 1000 illustrating amplification by copying a matrix, according to some embodiments of the technology described herein. In the example of FIG. 10, the matrix tile 1002A of the matrix 1002 is the matrix that is to be loaded into an analog processor (e.g., a photonic processor) to perform a matrix operation. As shown in FIG. 10, the system copies the tile 1002A column-wise to obtain an amplified matrix. The amplified matrix 1004 is programmed into the analog processor. In the example of FIG. 10, the tile 1002A is to be multiplied by the vector tile 1006. The system makes a copy of the vector tile 1006 row-wise to obtain an amplified vector tile.

Figure 11A:
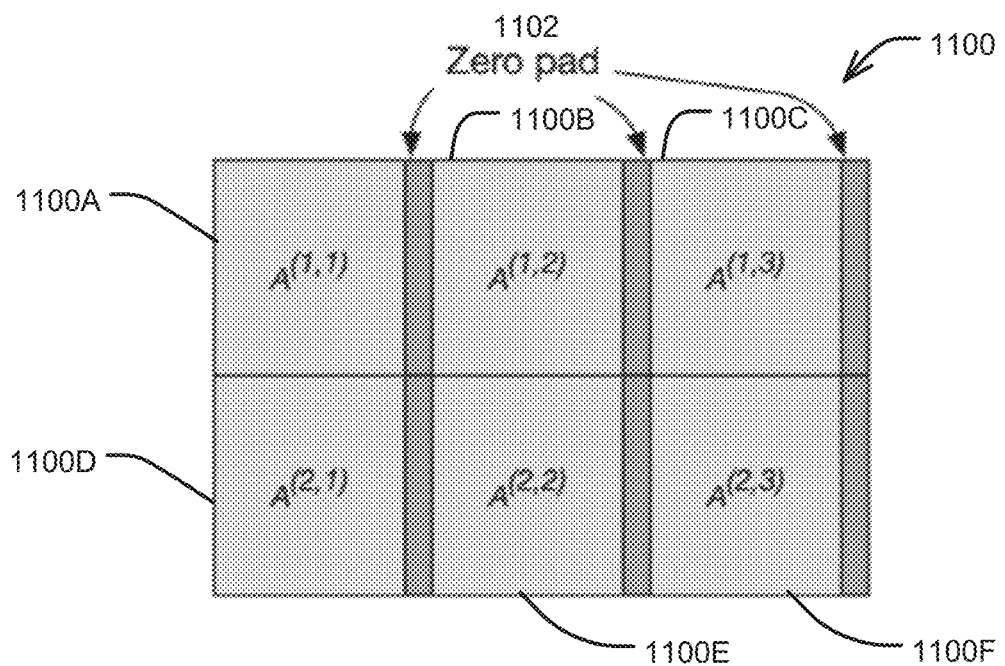
FIG. 11A shows a diagram illustrating a technique of maintaining overamplification by distributing zero pads among different tiles of a matrix, according to some embodiments of the technology described herein.

In some embodiments, the system may be configured to apply amplification by distributing a zero pad among different portions of a matrix. The size of an analog processor may be large relative to a size of the matrix. The matrix may thus be padded to fill the input of the analog processor. FIG. 11A shows a diagram illustrating a technique of maintaining overamplification by distributing zero pads among different tiles of a matrix, according to some embodiments of the technology described herein. As shown in FIG. 11A, the matrix 1100 is divided into tiles 1100A, 1100B, 1100C, 1100D, 1100E, 1100F. The system distributes zeroes of a zero pad 1102 among the tiles 1100A, 1100B, 1100C, 1100D, 1100E, 1100F. The system may be configured to distribute the zero pad 1102 among the tiles 1100A, 1100B, 1100C, 1100D, 1100E, 1100F instead of appending the zero pad to the end of matrix 1100 to obtain an amplified matrix.

Figure 11B:
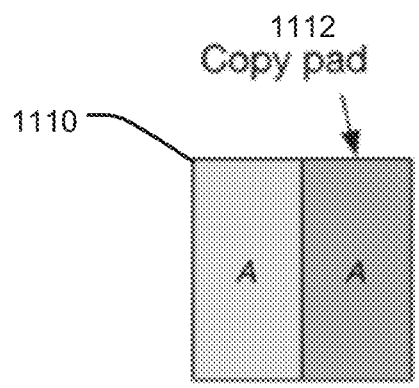
FIG. 11B shows a diagram illustrating a technique of performing overamplification by using a copy of a matrix as a pad, according to some embodiments of the technology described herein.

FIG. 11B shows a diagram illustrating a technique of performing overamplification by using a copy of a matrix as a pad, according to some embodiments of the technology described herein. In the example of FIG. 11B, instead of using a zero pad, the system uses a copy of the matrix 1110 as the copy pad 1112 to obtain an amplification of the matrix. The system may be configured to determine the amplification factor based on how many copies the system copies.

In some embodiments, the system may be configured to use any combination of one or more of the overamplification techniques described herein. For example, the system may apply a gain factor in addition to copying a matrix. In another example, the system may apply a gain factor in addition to distributing a zero pad among matrix tiles. In another example, the system may copy a matrix in addition to distributing a zero pad among matrix tiles. In some embodiments, the system may be configured to perform overamplification by repeating an operation multiple times. In such embodiments, the system may be configured to accumulate results of the multiple operations and average the results. In some embodiments, the system may be configured to average the results using a digital accumulator. In some embodiments, the system may be configured to average the results using an analog accumulator (e.g., a capacitor).

Returning again to FIG. 9, after obtaining the amplified matrix at block 904, process 900 proceeds to block 906, where the system programs the analog processor using the amplified matrix. After programming the analog processor using the amplified matrix, process 900 proceeds to block 908, where the system performs the matrix operation using the analog processor programmed using the amplified matrix. The system may be configured to obtain an analog output, and provide the analog output to an ADC to obtain a digital representation of the output.

Figure 12:
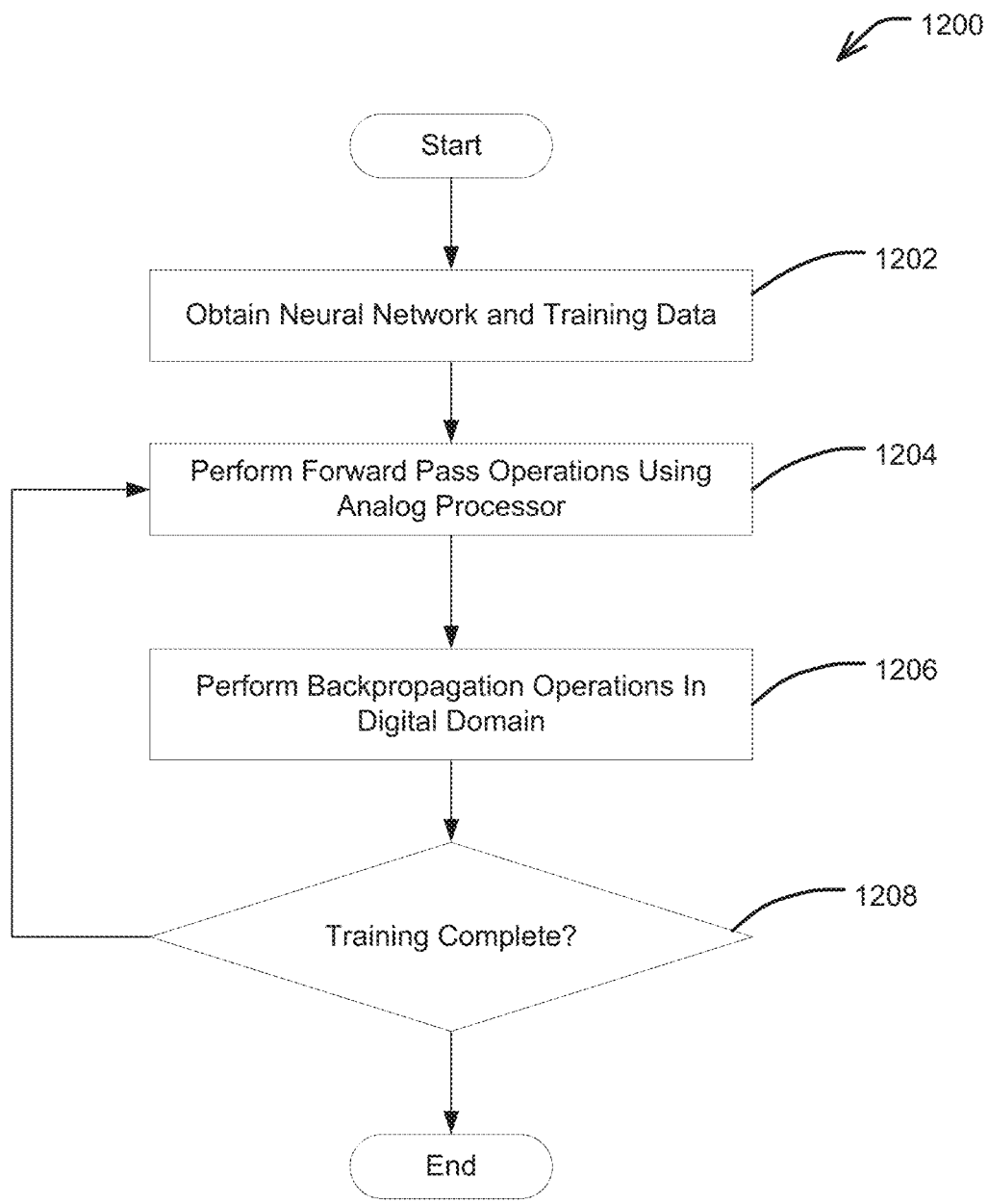
FIG. 12 shows a flowchart of an example process of performing quantization aware training (QAT) of a neural network, according to some embodiments of the technology described herein.

FIG. 12 shows a flowchart of an example process 1200 of performing quantization aware training (QAT) of a neural network, according to some embodiments of the technology described herein. Process 1200 may be performed by training system 101 described herein with reference to FIGS. 1A-1C.

Process 1200 begins at block 1202, where the system obtains a neural network and training data. In some embodiments, the system may be configured to obtain a previously trained neural network. For example, the parameters of the neural network may have been previously learned by previously performing training using a set of training data. In some embodiments, the system may be configured to obtain an untrained neural network in which the parameters have not been learned. For example, the parameters of the neural network may be initialized to random values. The system may be configured to obtain training data including sample inputs and corresponding outputs. The outputs may be target outputs for the sample inputs that are to be used to perform a supervised learning technique (e.g., gradient descent).

Next, process 1200 proceeds to block 1204, where the system performs forward pass operations using an analog processor (e.g., analog processor 106 of hybrid processor 100 in the training system 101). In some embodiments, the forward pass operations may include matrix operations (e.g., matrix multiplications) to determine layer outputs of the neural network. The outputs generated by the analog processor may be provided to an ADC (e.g., ADC 108) to obtain outputs of the forward pass operations. By using the analog processor to perform the forward pass operations, the system obtains layer outputs that incorporate effects of quantization resulting from use of the analog processor. For example, quantization may be caused because the analog processor 106 uses a fewer number of bits than the digital controller 102 of the hybrid processor 100 and/or due to noise of the ADC 108. Using the analog processor to perform the forward pass operations incorporates effects of quantization into the outputs that are subsequently used to set parameters of the neural network.

In some embodiments, the system may be configured to add noise to outputs of the forward pass operations. For example, the system may add noise in order to train parameters of the neural network to be more robust against noise. Adding noise may further regularize parameters of the neural network by preventing the parameters from overfitting to a training data set. In some embodiments, the system may be configured to add noise to outputs of matrix operations (e.g., matrix multiplications). In some embodiments, the system may be configured to add noise by: (1) obtaining a noise sample from a distribution modeling noise; and (2) adding the noise sample to an output. For example, the system may obtain a noise sample from a Gaussian distribution with mean 0 and a standard deviation commensurate to noise expected from an analog processor. An expected standard deviation may be determined from previously collected outputs of the analog processor (e.g., by determining a standard deviation of previous outputs). In another example, the system may obtain a noise sample from a noise distribution model of analog processor generated using previously collected data. For example, the system may obtain a noise model of a distribution of a difference between target output values of matrix operations and values generated by the analog processor. In another example, the system may obtain a noise model by deriving the noise model from an information-theoretic quantity involving target output values of matrix operations and output values generated by an analog processor.

A distribution of noise values may be obtained by aggregating noise values in various manners. The noise values may be aggregated from previously collected data. In some embodiments, noise values may be aggregated from all output element values. For example, the distribution may include a single distribution for an output tensor. In some embodiments, a distribution may include aggregation of noise values for respective channels of an output tensor. For example, the distribution may include a single distribution for a single channel of the output tensor. Such embodiments may be suitable for a convolutional neural network in which one channel may have a very different range of values relative to another channel. In some embodiments, the distribution may include aggregations of noise values for respective output elements of an output tensor. For example, the distribution may include a single distribution for each element of the output tensor.

In some embodiments, a noise distribution model may be stored in a digital processor as an empirical probability distribution. For example, the noise distribution model may be a histogram of noise samples obtained from an empirical distribution of values obtained using an analog processor. In this example, the system may obtain a noise sample according to the histogram of noise samples. In some embodiments, the noise distribution model may be stored as parameters of a prior distribution using a Bayesian approach. The system may obtain a noise sample from the posterior distribution. The Bayesian approach may provide faster noise sampling and require fewer memory storage resources than an empirical probability distribution. For example, the prior distribution may be sampled using an accelerated sampling algorithm. In some embodiments, the system may obtain a noise sample by comparing an output value of a digital processor against an output value of an analog processor.

Next, process 1200 proceeds to block 1206, where the system performs backpropagation operations in the digital domain. Example backpropagation operations are described herein. The system may be configured to use digital representations (e.g., floating-point representations) of the outputs generated by the analog processor at block 1204 through an ADC. The system may be configured to use the outputs to determine a gradient of a loss function, and then use the gradient to update parameters (e.g., weights and/or biases) of the neural network. The system determines updates to the parameters using outputs obtained using the analog processor, and thus incorporates quantization effects into training. The system may thus make the neural network more robust to effects (e.g., noise) caused by quantization.

Next, process 1200 proceeds to block 1208, where the system determines whether training is complete. In some embodiments, the system may be configured to determine whether training is complete based on whether the system has performed a threshold number of iterations. In some embodiments, the system may be configured to determine whether training is complete based on whether a loss function meets a threshold value of the loss function. In some embodiments, the system may be configured to determine whether training is complete based on whether a certain number of input samples have been processed. If the system determines that training is not complete, then process 1200 proceeds to block 1204. For example, the system may obtain one or more input samples and corresponding output(s), and perform the steps at block 1204 and 1206. If the system determines that training is complete, then process 1200 ends.

After process 1200 ends, the trained neural network may be used to perform inference. In some embodiments, the inference may be performed using an analog processor. As the neural network was trained to incorporate quantization effects of the analog processor, the inference may be more robust to effects of quantization when using the analog processor for inference.

Figure 13:
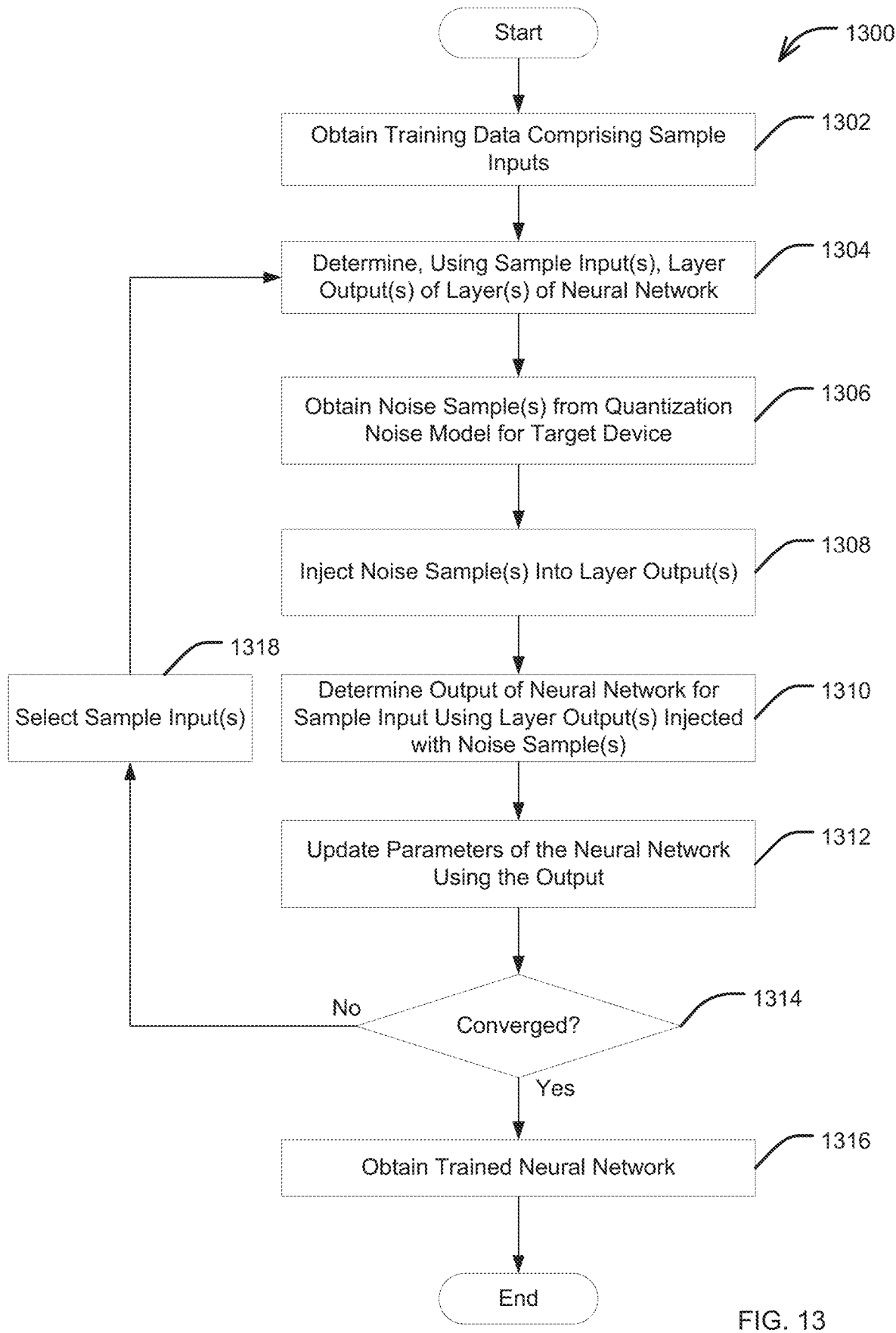
FIG. 13 shows a flowchart of an example process of injecting noise into layer(s) of a neural network during training of the neural network, according to some embodiments of the technology described herein.

FIG. 13 shows a flowchart of an example process 1300 of injecting noise into layer(s) of a neural network during training of the neural network, according to some embodiments of the technology described herein. Process 1300 may be performed by training system 101 described herein with reference to FIGS. 1A-1C. In some embodiments, process 1300 may be performed as part of process 400 described herein with reference to FIG. 4. For example, process 1300 may be performed as part of performing the forward pass matrix operations at block 406 of process 400.

Prior to beginning process 1300, the system performing process 1300 may obtain a neural network. The neural network may have parameters (e.g., weights). In some embodiments, the neural network may be a previously trained neural network. The parameters may have been learned from a previously performed training. For example, the neural network may have been previously trained by the system by performing process 1300. In such embodiments, the process 1300 may be performed as a technique of differential noise finetuning (DNF). In another example, the neural network may have been previously trained using another training technique. The system may perform process 1300 to further train the previously trained neural network. For example, the system may perform process 1300 to further train the neural network to be robust to quantization error that would be present when using hybrid process 100 to perform inference using the neural network. In some embodiments, the neural network may be an untrained neural network. For example, the parameters of the neural network may be initialized to random values that need to be learned by performing process 1300.

Process 1300 begins at block 1302, where the system performing process 1300 obtains training data comprising multiple sample inputs. In some embodiments, the system may be configured to obtain the sample inputs by: (1) obtaining sets of input data; and (2) generating the sample inputs using the sets of input data. In some embodiments, a sample input may be a set of input features generated by the system. The system may be configured to preprocess input data to generate the set of input features. As an illustrative example, the input data may be an image. The system may be configured to generate a sample input for the image by: (1) obtaining pixel values of the image; and (2) storing the pixel values in a data structure to obtain the sample input. For example, the data structure may be a matrix, vector, tensor, or other type of data structure. In some embodiments, the system may be configured to preprocess input data by normalizing the input data. In some embodiments, the system may be configured to preprocess input data by encoding categorical parameters (e.g., one-hot encoding the categorical parameters).

In some embodiments, the system may be configured to obtain outputs for the sample inputs. The outputs may be used as target outputs corresponding to the sample inputs to use during training (e.g., to perform a supervised learning technique). Continuing with the example of input data consisting of an input image, the system may obtain an output image corresponding to the input image. The output image may represent a target enhancement of the input image that is to be generated by the neural network. In some embodiments, the system may be configured to obtain labels comprising target classifications for respective sets of input data. For example, the input data may be diagnostic scans of patients and the labels may be disease diagnoses for the patients (e.g., determined from diagnosis by clinicians using other techniques).

After obtaining the training data at block 1302, process 1300 proceeds to block 1304, where the system uses a sample input of the training data to determine layer output(s) of one or more layers of the neural network. In some embodiments, the system may be configured to determine a layer output of a layer of the neural network using an input to the layer and parameters (e.g., weights and/or biases) associated with the layer. For example, the system may determine an output of the first layer using the output from a previous layer, and weights associated with the first layer. In another example, the system may determine a layer output by convolving an input matrix with a convolution kernel to obtain the layer output. In some embodiments, the system may be configured to perform matrix operations to determine an output of a neural network layer. Example matrix operations for determining an output of a neural network layer are described herein.

In some embodiments, the system may be configured to determine a layer output matrix using an input matrix and a parameter matrix using tiling. Tiling may divide a matrix operation into multiple operations between smaller matrices. The system may be configured to use tiling to perform the multiplication operation in multiple passes. In each pass, the system may perform an operation over a tile of a matrix. In some embodiments, the system may perform tiling to simulate computation that would be performed on a target device. For example, a target device may use tiling due to resource constraints. As an example, the processor of the target device may not be sufficiently large to perform a multiplication between large matrices (e.g., with thousands of rows and/or columns) in one pass. Tiling may allow the target device to perform matrix operations using a smaller processor.

Although the example of FIG. 13 is described using a sample input, in some embodiments, the system may be configured to determine the layer output(s) using multiple sample inputs. For example, the system may use a mini-batch of sample inputs. The system may be configured to perform the steps at blocks 1304-1312 using the multiple sample inputs.

Next, process 1300 proceeds to block 1306, where the system obtains one or more noise samples from a quantization noise model for a target device. In some embodiments, the target device may be a device including an analog processor. For example, the target device may be a device including hybrid processor 100. The target device may be configured to use the hybrid processor 100 to perform inference using a neural network trained by performing process 1300. In some embodiments, the system may be configured to obtain a noise sample from a quantization noise model by randomly sampling the quantization noise model.

In some embodiments, the quantization noise model may be a distribution of error values (e.g., empirically determined error values) and the system may randomly sample error values according to the distribution (e.g., based on probabilities of different error values). The quantization noise model for the target device may be obtained by determining a difference between target neural network layer outputs, and neural network layer outputs determined by the target device. The target neural network layer outputs may be those determined using a floating-point representation (e.g., float32) of numbers. For example, the target neural network layer outputs may be determined by a digital processor, without using an analog processor. The behavior of the analog processor may be simulated by the digital processor. The neural network layer outputs determined by the target device may be determined by the target device using an analog processor to perform matrix operations for determining the layer outputs. For example, the layer outputs may be determined by performing process 500 described herein with reference to FIG. 5 and/or process 600 described herein with reference to FIG. 6. The layer outputs determined by the target device may use a fixed-point representation of numbers during operations (e.g., for matrix operations performed by an analog processor).

In some embodiments, the quantization noise model for the target device may include noise models for respective layers of the neural network. The system may be configured to obtain a noise sample for a layer by: (1) accessing a noise model for the layer; and (2) obtaining a noise sample from the noise model for the layer. In some embodiments, the quantization noise model for the target device may be a single noise model for all the layers of the neural network.

A noise sample for a layer output may include multiple values. For example, the noise sample may include a noise sample for each output value. To illustrate, the noise sample may include a noise sample value for each output value in an output matrix of a neural network layer. In some embodiments, the noise sample may be a matrix having the same dimensions as the output matrix. For example, for a 100× 100 output matrix, the noise sample may be a 100×100 matrix of noise values.

After obtaining the noise sample(s) at block 1306, process 1300 proceeds to block 1308, where the system injects the noise sample(s) into one or more layer outputs. The system may be configured to inject a noise sample for a layer (e.g., obtained from a quantization noise model for the layer) into the corresponding layer output of the layer. In some embodiments, the system may be configured to additively inject a noise sample into a layer output. For example, a layer output matrix may be summed with a noise sample matrix to obtain a layer output injected with the noise sample. In some embodiments, the system may be configured to multiplicatively inject a noise sample into a layer output. The system may be configured to perform element-wise multiplication between a layer output matrix and a noise sample matrix to obtain a layer output injected with the noise sample. In some embodiments, the system may be configured to inject a noise sample into a layer output per matrix. For example, the system may add a noise matrix to an output matrix, or perform element-wise multiplication between the noise matrix and an output matrix. In some embodiments, the system may be configured to inject a noise sample into a layer output using tiling. The noise sample may include one or more noise matrices for tiles of an output matrix. The system may be configured to inject each of the noise matrices into a respective tile of the output matrix. In this manner, the system may simulate tiling that may be performed by a target device that is to employ the trained neural network. In some embodiments, the system may add the noise sample to a layer output by performing perturbations of an information-theoretic quantity involving a layer output matrix. For example, the system may perform perturbation using entropy or mutual information.

After injecting the noise sample(s) into layer output(s) at block 1308, process 1300 proceeds to block 1310, where the system determines an output of the neural network for the sample input using the layer output(s) injected with the noise sample(s). In some embodiments, the system may be configured to determine the output of the neural network by using the layer output(s) injected with the noise sample(s) to compute outputs of subsequent layers. For example, a layer output injected with a noise sample may be used to determine the layer output of a subsequent layer. The output may thus reflect a simulated effect of quantization error on the neural network. In some embodiments, the output may reflect a simulated effect of clipping error on the neural network.

Next, process 1300 proceeds to block 1312, where the system updates parameters of the neural network using the output obtained at block 1310. In some embodiments, the system may be configured to determine an update to the parameters of the neural network by determining a difference between the output and an expected output (e.g., a label from the training data). For example, the system may determine a gradient of a loss function with respect to the parameters using the difference. In some embodiments, the system may be configured to update parameters by performing backpropagation operations to determine a gradient, and updating the parameters based on the gradient. Example backpropagation operations are described herein.

Next, process 1300 proceeds to block 1314, where the system determines whether the training has converged. In some embodiments, the system may be configured to determine whether the training has converged based on a loss function or gradient thereof. For example, the system may determine that the training has converged when the gradient of the loss function is less than a threshold value. In another example, the system may determine that the training has converged when the loss function is less than a threshold value. In some embodiments, the system may be configured to determine whether the training has converged by determining whether the system has performed a threshold number of iterations. For example, the system may determine that the training has converged when the system has performed a maximum number of iterations of blocks 1304 to 1312.

If at block 1314, the system determines that the training has not converged, then process 1300 proceeds to block 1320, where the system selects sample input(s) from the training data. In some embodiments, the system may be configured to select the sample input randomly. After selecting the next sample input, process 1300 proceeds to block 1304 where the system determines layer output(s) of layer(s) of the neural network.

In some embodiments, the system may be configured to inject noise for some sample inputs of the training data and not inject noise for some sample inputs of the training data. For example, each sample input may be a mini-batch and the system may perform noise injection for some mini-batches and not perform noise injection for other mini-batches. In this example, the system may mask some of the mini-batches from noise injection. In some embodiments, the training data may include a first plurality of sample inputs and a second plurality of inputs that is a duplicate of the first plurality of sample inputs. The system may be configured to perform noise injection (e.g., as performed at block 1308) for the first plurality of sample inputs and not the second plurality of inputs.

If at block 1314, the system determines that the training has converged, then process 1300 proceeds to block 1316, where the system obtains a trained neural network. The system may be configured to store parameters of the trained neural network. In some embodiments, the system may be configured to provide the trained neural network to a target device (e.g., target device 104). The system may be configured to provide the trained neural network to the target device by transmitting the trained parameters to the target device. The target device may be configured to use the trained neural network for inference using input data received by the target device. In some embodiments, the target device may use an analog processor to perform inference.

Figure 14:
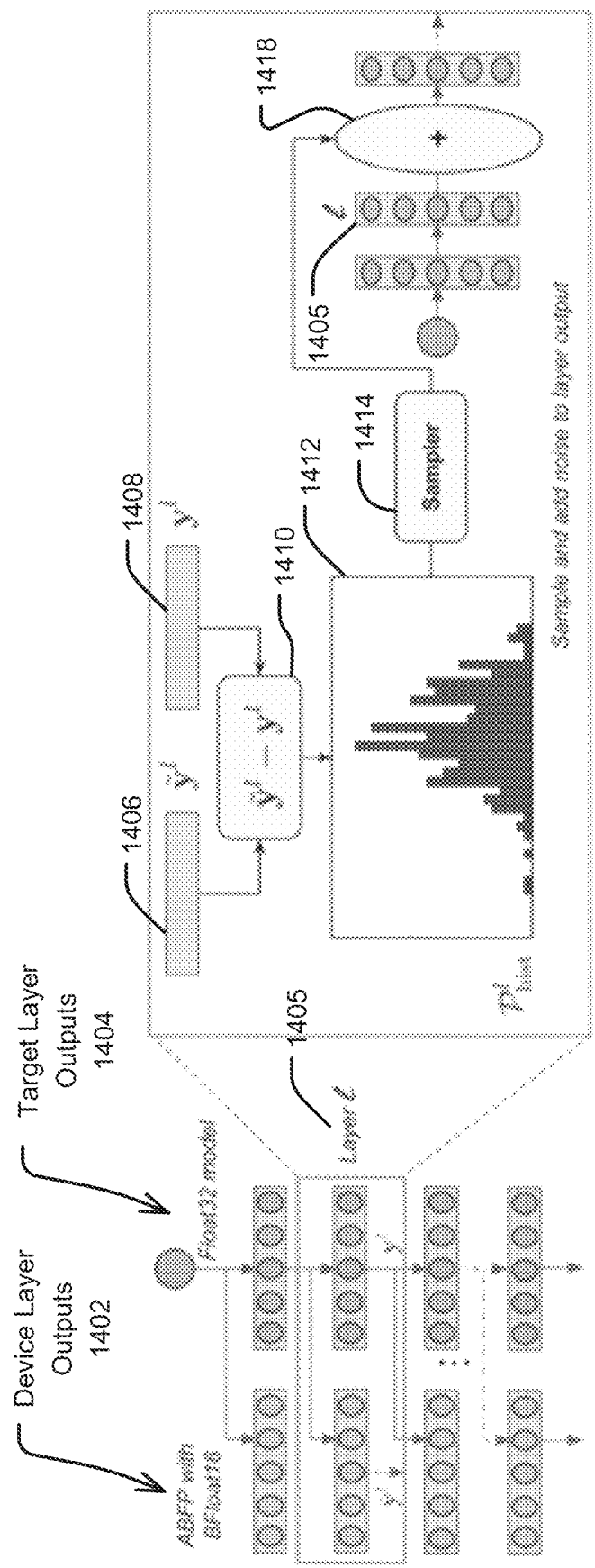
FIG. 14 shows a diagram illustrating injection of noise into a layer of a neural network, according to some embodiments of the technology described herein.

FIG. 14 shows a diagram 1400 illustrating injection of noise into a layer of a neural network, according to some embodiments of the technology described herein. The injection of noise into a layer of a neural network illustrated by diagram 1400 may be performed as part of performing process 1300 described herein with reference to FIG. 13. The diagram 1400 depicts layer outputs 1402 generated by a target device, and target layer outputs 1404. The device layer outputs 1402 may be generated using an analog processor (e.g., analog processor 106). For example, the layer outputs 1402 may be generated by performing process 500 described herein with reference to FIG. 5 and process 600 described herein with reference to FIG. 6. The target layer outputs 1404 by performing matrix operations exclusively in a digital domain using a floating-point representation of numbers (e.g., float32). For a layer 1405, the system determines differences 1410 between device outputs 1406 of the layer and target outputs 1408 of the layer. The differences 1410 may provide a noise model of the device as depicted by the bar graph 1412 of diagram 1400. To inject noise into the layer 1405 during training, a sampler 1414 may obtain a noise sample from the noise model, and inject it into an output of the layer 1405 as indicated by reference 1418. The noise sample may be injected as described at block 1308 of process 1300. The layer output injected with the noise sample may then be used as input to a subsequent layer of the neural network.

Figure 15:
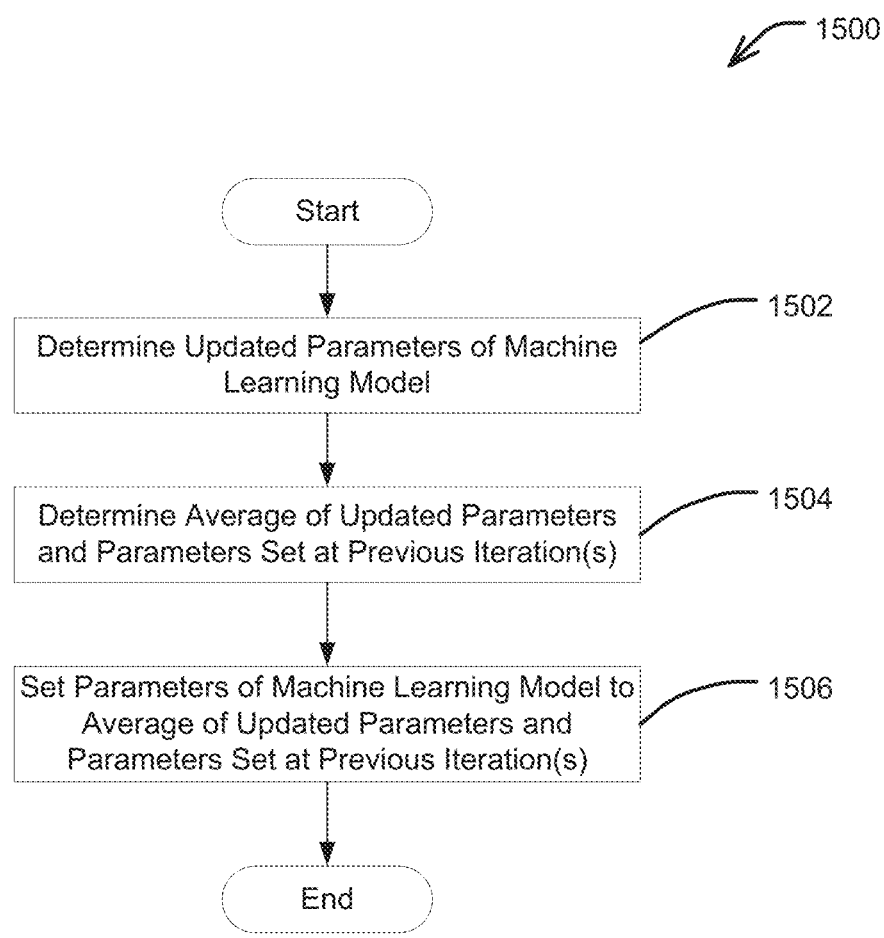
FIG. 15 shows a flowchart of an example process of updating parameters of a machine learning model during training, according to some embodiments of the technology described herein.

FIG. 15 shows a flowchart of an example process 1500 of updating parameters of a machine learning model during training, according to some embodiments of the technology described herein. For example, process 1500 may be performed to update weights and/or biases of a neural network during training. Process 1500 may be performed by training system 101 described herein with reference to FIGS. 1A-1C. In some embodiments, process 1500 may be performed at block 410 of process 400 described herein with reference to FIG. 4 to update parameters of a machine learning model, at block 1206 of process 1200 described herein with reference to FIG. 12, and/or at block 1312 of process 1300 described herein with reference to FIG. 13. Process 1500 may be performed in an iteration of training technique. For example, process 1500 may be performed as part of an iteration of a gradient descent learning technique.

In some embodiments, the process 1500 may be performed for certain iterations of a training process, but not all iterations. In such embodiments, the process 1500 may be performed after a threshold number of iterations have been performed. For example, the process 1500 may be performed for iterations after 5, 10, 15, 20, 25, 50, 75, 100, 150, 200, 500, 750, or 1000 previous iterations have been performed. In some embodiments, the process 1500 may be performed in epochs after a threshold number of epochs have been performed. In some embodiments, the process 1500 may be performed multiple times within an epoch. In some embodiments, the learning rate and other training parameters may be adjusted at different iterations or epochs.

Process 1500 begins at block 1502, where the system determines updated parameters of a machine learning model. In some embodiments, the system may be configured to determine updated parameters by: (1) performing forward pass operations to determine output of a machine learning model; (2) determine a difference between the output and target output (e.g., labels); and (3) performing backpropagation operations to determine updated parameters of the machine learning model. Examples of forward pass operations and backpropagation operations are described herein. For example, the system may determine updated parameters by determining a gradient of a loss function, and determining updated parameters based on the gradient of the loss function (e.g., by adding or subtracting a proportion of the gradient to previous parameter values).

Next, process 1500 proceeds to block 1504, where the system determines an average of the updated parameters determined at block 1502, and parameters of the machine learning model determined at one or more previous iterations. For example, the system may determine an average of the updated parameters and those determined at previous iteration(s) of a gradient descent learning technique. In some embodiments, the system may be configured to maintain a running average of the parameters of the machine learning model over the iteration(s). The system may update the running average with the updated parameters of the machine learning model determined at block 1502.

Next, process 1500 proceeds to block 1506, where the system sets parameters of the machine learning model to the average of the updated parameters and parameters set at previous iteration(s) of training.

Figure 16:
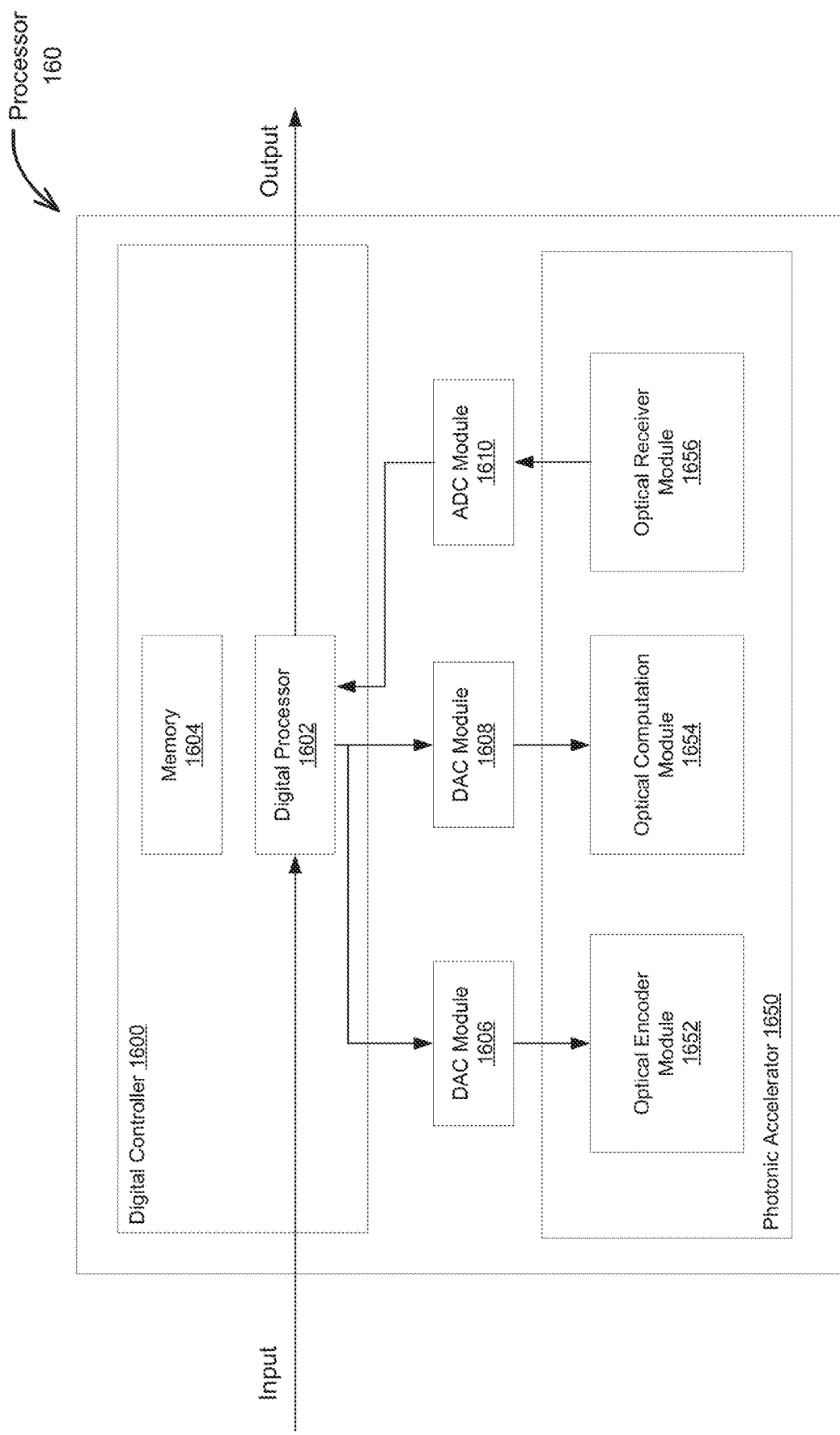
FIG. 16 illustrates an example processor, according to some embodiments of the technology described herein.

FIG. 16 illustrates an example processor 160, according to some embodiments of the technology described herein. The processor 160 may be hybrid processor 100 described herein with reference to FIGS. 1A-1C. The example processor 160 of FIG. 16 is a hybrid analog-digital processor implemented using photonic circuits. As shown in FIG. 16, the processor 160 includes a digital controller 1600, digital-to-analog converter (DAC) modules 1606, 1608, an ADC module 1610, and a photonic accelerator 1650. The photonic accelerator 1650 may be used as the analog processor 106 in the hybrid processor 100 of FIGS. 1A-1C. Digital controller 1600 operates in the digital domain and photonic accelerator 1650 operates in the analog photonic domain. Digital controller 1600 includes a digital processor 1602 and memory 1604. Photonic accelerator 1650 includes an optical encoder module 1652, an optical computation module 154, and an optical receiver module 1656. DAC modules 106, 108 convert digital data to analog signals. ADC module 1610 converts analog signals to digital values. Thus, the DAC/ADC modules provide an interface between the digital domain and the analog domain used by the processor 160. For example, DAC module 1606 may produce N analog signals (one for each entry in an input vector), a DAC module 1608 may produce N×N analog signals (e.g., one for each entry of a matrix storing neural network parameters), and ADC module 1610 may receive N analog signals (e.g., one for each entry of an output vector).

The processor 160 may be configured to generate or receive (e.g., from an external device) an input vector of a set of input bit strings and output an output vector of a set of output bit strings. For example, if the input vector is an N-dimensional vector, the input vector may be represented by N bit strings, each bit string representing a respective component of the vector. An input bit string may be an electrical signal and an output bit string may be transmitted as an electrical signal (e.g., to an external device). In some embodiments, the digital process 1602 does not necessarily output an output bit string after every process iteration. Instead, the digital processor 1602 may use one or more output bit strings to determine a new input bit string to feed through the components of the processor 160. In some embodiments, the output bit string itself may be used as the input bit string for a subsequent process iteration. In some embodiments, multiple output bit streams are combined in various ways to determine a subsequent input bit string. For example, one or more output bit strings may be summed together as part of the determination of the subsequent input bit string.

DAC module 1606 may be configured to convert the input bit strings into analog signals. The optical encoder module 1652 may be configured to convert the analog signals into optically encoded information to be processed by the optical computation module 1654. The information may be encoded in the amplitude, phase, and/or frequency of an optical pulse. Accordingly, optical encoder module 1652 may include optical amplitude modulators, optical phase modulators and/or optical frequency modulators. In some embodiments, the optical signal represents the value and sign of the associated bit string as an amplitude and a phase of an optical pulse. In some embodiments, the phase may be limited to a binary choice of either a zero phase shift or a $\pi$ phase shift, representing a positive and negative value, respectively. Some embodiments are not limited to real input vector values. Complex vector components may be represented by, for example, using more than two phase values when encoding the optical signal.

The optical encoder module 1652 may be configured to output N separate optical pulses that are transmitted to the optical computation module 1654. Each output of the optical encoder module 1652 may be coupled one-to-one to an input of the optical computation module 1654. In some embodiments, the optical encoder module 1652 may be disposed on the same substrate as the optical computation module 1654 (e.g., the optical encoder 1652 and the optical computation module 1654 are on the same chip). The optical signals may be transmitted from the optical encoder module 1652 to the optical computation module 1654 in waveguides, such as silicon photonic waveguides. In some embodiments, the optical encoder module 1652 may be on a separate substrate from the optical computation module 1654. The optical signals may be transmitted from the optical encoder module 1652 to optical computation module 1654 with optical fibers.

The optical computation module 1654 may be configured to perform multiplication of an input vector 'X' by a matrix 'A'. In some embodiments, the optical computation module 1654 includes multiple optical multipliers each configured to perform a scalar multiplication between an entry of the input vector and an entry of matrix 'A' in the optical domain. Optionally, optical computation module 1654 may further include optical adders for adding the results of the scalar multiplications to one another in the optical domain. In some embodiments, the additions may be performed electrically. For example, optical receiver module 1656 may produce a voltage resulting from the integration (over time) of a photocurrent received from a photodetector.

The optical computation module 1654 may be configured to output N optical pulses that are transmitted to the optical receiver module 1656. Each output of the optical computation module 1654 is coupled one-to-one to an input of the optical receiver module 1656. In some embodiments, the optical computation module 1654 may be on the same substrate as the optical receiver module 1656 (e.g., the optical computation module 1654 and the optical receiver module 1656 are on the same chip). The optical signals may be transmitted from the optical computation module 1654 to the optical receiver module 1656 in silicon photonic waveguides. In some embodiments, the optical computation module 1654 may be disposed on a separate substrate from the optical receiver module 1656. The optical signals may be transmitted from the optical computation module 1654 to the optical receiver module 1656 using optical fibers.

The optical receiver module 1656 may be configured to receive the N optical pulses from the optical computation module 1654. Each of the optical pulses may be converted to an electrical analog signal. In some embodiments, the intensity and phase of each of the optical pulses may be detected by optical detectors within the optical receiver module. The electrical signals representing those measured values may then be converted into the digital domain using ADC module 1610, and provided back to the digital process 1602.

The digital processor 1602 may be configured to control the optical encoder module 1652, the optical computation module 1654 and the optical receiver module 1656. The memory 1604 may be configured to store input and output bit strings and measurement results from the optical receiver module 1656. The memory 1604 also stores executable instructions that, when executed by the digital processor 1602, control the optical encoder module 1652, optical computation module 1654, and optical receiver module 1656. The memory 1604 may also include executable instructions that cause the digital processor 1602 to determine a new input vector to send to the optical encoder based on a collection of one or more output vectors determined by the measurement performed by the optical receiver module 1656. In this way, the digital processor 1602 may be configured to control an iterative process by which an input vector is multiplied by multiple matrices by adjusting the settings of the optical computation module 1654 and feeding detection information from the optical receive module 1656 back to the optical encoder 1652. Thus, the output vector transmitted by the processor 160 to an external device may be the result of multiple matrix multiplications, not simply a single matrix multiplication.

Figure 17:
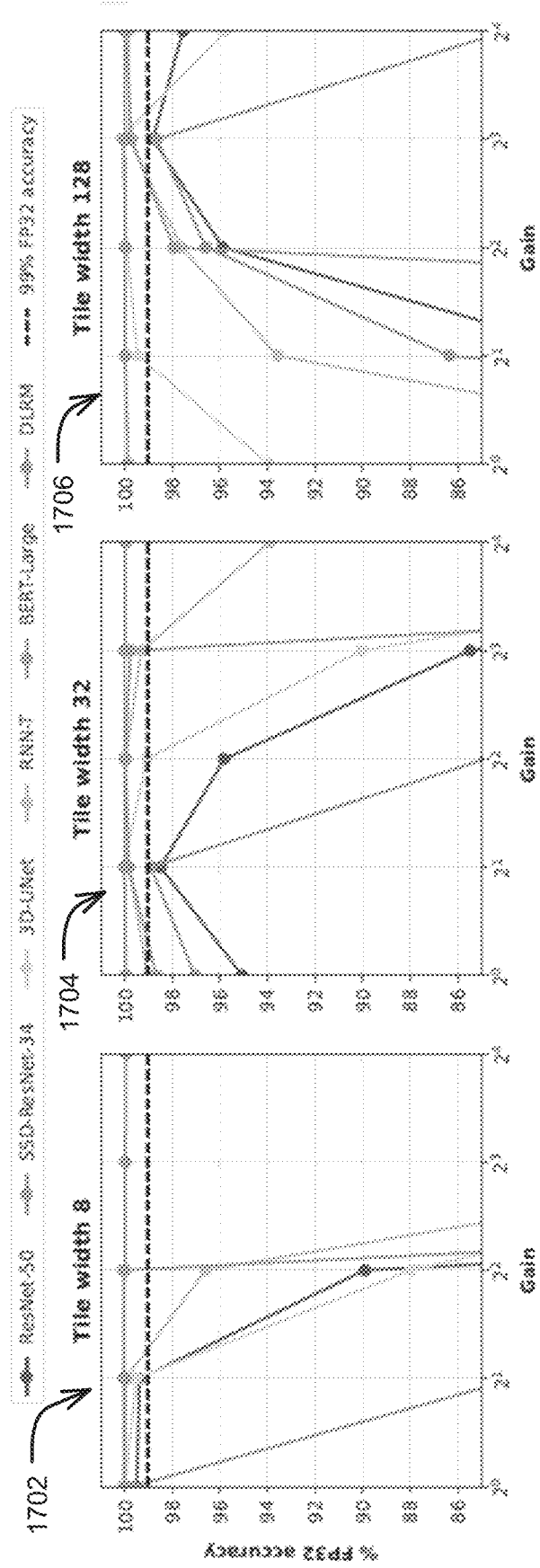
FIG. 17 shows graphs illustrating accuracy versus gain factor of various neural network models trained according to some embodiments of the technology described herein.

FIG. 17 shows graphs 1702, 1704, 1706 illustrating accuracy versus gain factor of various neural network models trained according to some embodiments of the technology described herein. Each of the graphs 1702, 1704, 1706 corresponds to a respective tile width (e.g., used by analog processor 106 to perform matrix operations). In the example of FIG. 17, a fixed-point representation of 8 bits was used by the analog processor to represent the weights, inputs, and outputs. The graph 1702 shows accuracy of neural network models trained using a tile width of 8, the graph 1704 shows accuracy of neural network models trained using a tile width of 32, and the graph 1706 shows accuracy of neural network models trained using a tile width of 128. The graph 1702 shows that all the models achieve accuracy that is 99% of the accuracy when training the neural networks exclusively in the digital domain using float32 representation ("float32 accuracy"). The graph 1704 shows that the 3D-UNet, RNN-T, BERT-Large, and DLRM neural network models all achieve 99% of the float32 accuracy for multiple different gain factors. The ResNet-50 and SSD-ResNet-34 neural networks achieve close to 99% of the float32 accuracy at a gain factor of 2. The graph 1706 shows that the 3D-UNet, RNN-T, BERT-Large, and DLRM neural network models all achieve 99% of the float32 accuracy for multiple different gain factors. The ResNet-50 and SSD-ResNet-34 neural networks achieve close to 99% of the float32 accuracy at a gain factor of $2^3$.

Table 1 below shows results of fine tuning the ResNet50 and SSD-ResNet34 neural network models by finetuning using QAT of process 1200, and the DNF of process 1300. The performance metric for ResNet50 is top-1 accuracy and the performance metric for SSD-ResNet34 is mean average precision (mAP) score. The bolded values in the table are those that achieve a performance metric of greater than 99% of the performance when training the neural network using float32 representation exclusively in the digital domain. The performance metrics is shown when using the following two fixed-bits representations: (1) 6 bits for weights, 6 bits for inputs, and 8 bits for output; and (2) 8 bits for the weights, inputs, and outputs. As can be appreciated from Table 1, that QAT and DNF techniques improve performance of the neural networks. For ResNet50, the QAT and DNF techniques allows the neural network models to achieve greater than 99% float32 performance. For SSD-ResNet34, the DNF technique allows the neural network models to achieve greater than 99% float32 performance.

TABLE 1

| Neural Network Model | Fine Tuning Technique | Performance Metric | |
|---|---|---|---|
| | | 6/6/8 | 8/8/8 |
| ResNet50 | None | 74.69 | 75.23 |
| | QAT | 76.04 | 76.14 |
| | DNF | 75.15 | 75.97 |
| SSD-ResNet34 | None | 19.16 | 19.32 |
| | QAT | 19.23 | 19.34 |
| | DNF | 19.55 | 19.64 |

Example Implementation for Matrix Operation Using Analog Processor

Below is an example series of steps that may be performed (e.g., by training system 101) for performing the matrix operation R=A*B+C involving matrices A, B, and C to obtain the matrix R. Denote Q(M) to be the analog representation of the matrix M. The following steps may, for example, be performed to perform a matrix operation as part of training or performing inference with a machine learning model (e.g., a neural network).

1) Break matrix A into M×N tiles. Call the (m,n)-th tile with $A^{(m,n)}$, where m=1, ..., M and n=1, ..., N.

2) Break matrix B into N rows. Call the n-th row with $B^{(n)}$ where n=1, ..., N.

Each row will contain K column vectors and name these vectors $B^{(n,k)}$.

3) Initialize a temporary floating point matrix D with zeros. The matrix D will be computed vector-by-vector by computing $D^{(m,k)} = \sum_{n=1}^{N} A^{(m,n)} B^{(n,k)} = \sum_{n=1}^{N} D^{(m,n,k)}$.

4) For m=1 . . . M:
  i. For n=1 . . . N:
    1. Normalize $A^{(m,n)}$ by taking out floating point scale(s), i.e., $\hat{A}^{(m,n)} = A^{(m,n)}/\|A^{(m,n)}\|$. (Each scale can be shared per row of the tile $A^{(m,n)}$ or by the entire tile).
    2. Program $Q(\hat{A}^{(m,n)})$ into the matrix modulators of analog processor.
    3. For k=1 . . . K:
      a. Normalize $B^{(n,k)}$ by taking out a floating point scale, i.e., $\vec{B}^{(n,k)} = B^{(n,k)}/\|B^{(n,k)}\|$.
      b. Program $Q(\hat{B}^{(n,k)})$ into the input vector modulators of analog processor.
      c. Compute and readout the quantized partial results using the analog processor $Q(Q(A^{(m,n)}) * Q(\hat{B}^{(n,k)}))$.
      d. Obtain $D^{(m,n,k)}$: the scaled FP32 partial results by multiplying result of step 4(3)(b) with $\|A^{(m,n)}\|$ and $\|B^{(n,k)}\|$.
    4. $D^{(m,k)} += D^{(m,n,k)}$. (The accumulation is done in floating point.)
5) Output R=D+C. (The addition is done in floating point.)

Figure 18:
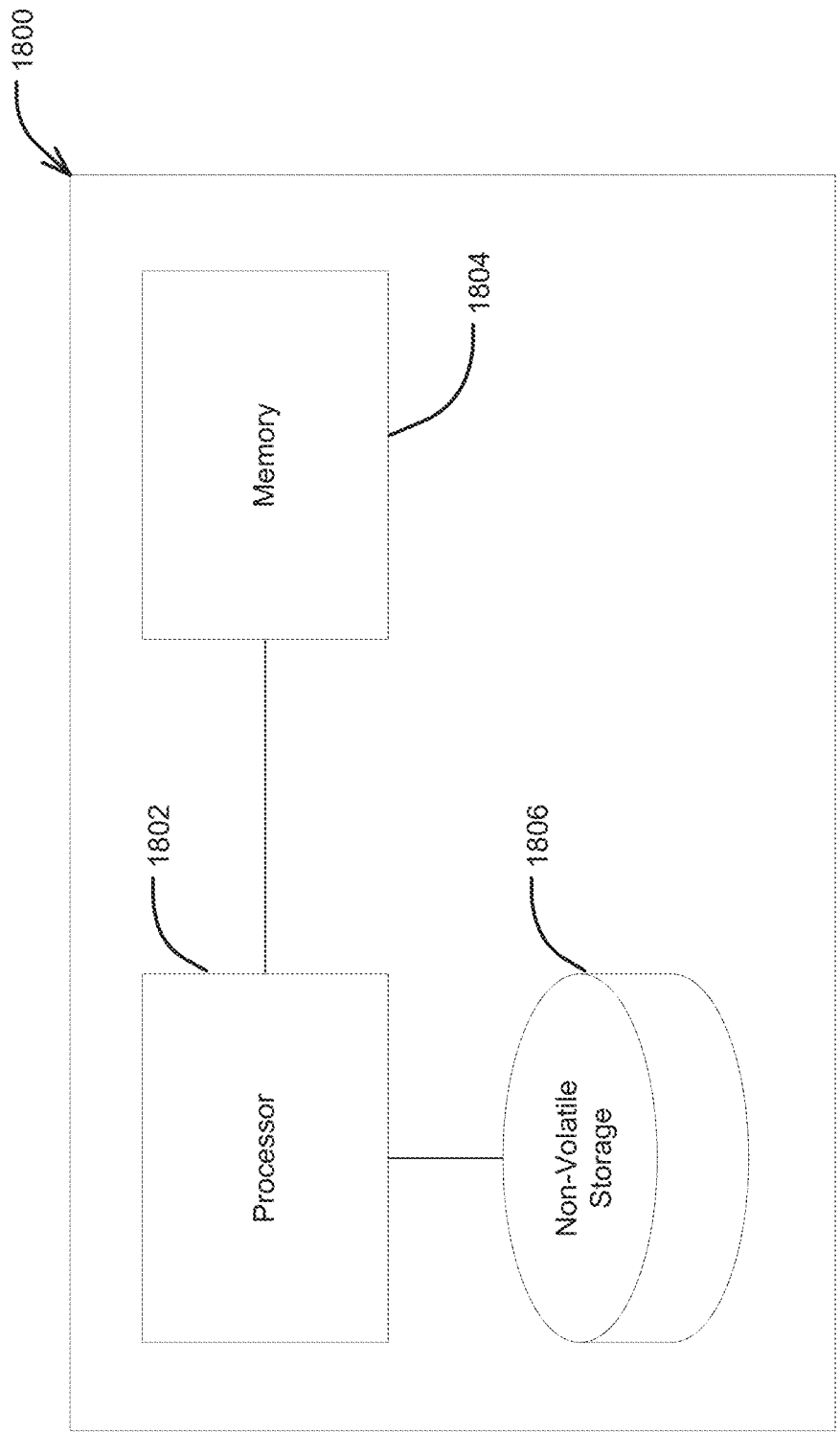
FIG. 18 shows a block diagram of an example computer system that may be used to implement some embodiments of the technology described herein.

FIG. 18 shows a block diagram of an example computer system 1800 that may be used to implement some embodiments of the technology described herein. The computing device 1800 may include one or more computer hardware processors 1802 and non-transitory computer-readable storage media (e.g., memory 1804 and one or more non-volatile storage devices 1806). The processor(s) 1802 may control writing data to and reading data from (1) the memory 1804; and (2) the non-volatile storage device(s) 1806. To perform any of the functionality described herein, the processor(s) 1802 may execute one or more processor-executable instructions stored in one or more non-transitory computer-readable storage media (e.g., the memory 1804), which may serve as non-transitory computer-readable storage media storing processor-executable instructions for execution by the processor(s) 1802.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system comprising:
circuitry comprising an analog processor;
wherein the circuitry is configured to train a machine learning model, the training comprising performing one or more matrix operations to learn parameters of the machine learning model using the analog processor, wherein performing a matrix operation of the one or more matrix operations to learn the parameters of the machine learning model using the analog processor comprises:
- determining a scaling factor for a first portion of a first matrix involved in the matrix operation;
- scaling the first portion of the first matrix using the scaling factor for the first portion of the first matrix to obtain a scaled first portion of the first matrix;
- programming the analog processor using the scaled first portion of the first matrix;
- performing, by the analog processor programmed using the scaled first portion of the first matrix, the matrix operation to generate a first output; and
- determining a result of the matrix operation using the first output generated by the analog processor.

2. The system of claim 1, wherein performing the matrix operation further comprises:
- determining a scaling factor for a first portion of a second matrix involved in the matrix operation;
- scaling the first portion of the second matrix using the scaling factor for the first portion of the second matrix to obtain a scaled first portion of the second matrix;
- programming the analog processor using the scaled first portion of the second matrix; and
- performing, by the analog processor programmed using the scaled first portion of the second matrix, the matrix operation to generate the first output.

3. The system of claim 1, wherein performing the one or more matrix operations to learn the parameters of the machine learning model using the analog processor comprises:
- determining a scaling factor for a second portion of the first matrix;
- scaling the second portion of the first matrix using the scaling factor for the second portion of the first matrix to obtain a scaled second portion of the first matrix;
- programming the analog processor using the scaled second portion of the first matrix;
- performing, by the analog processor programmed using the scaled second portion of the first matrix, the matrix operation to generate a second output; and
- determining the result of the matrix operation using the second output generated by the analog processor.

4. The system of claim 3, wherein the first scaling factor is different from the second scaling factor.

5. The system of claim 1, wherein the first portion of the first matrix is a first vector of the first matrix.

6. The system of claim 1, wherein determining the result of the matrix operation using the first output generated by the analog processor comprises:
- determining an output scaling factor for the first output generated by the analog processor using the first scaling factor;
- scaling the first output using the output scaling factor to obtain a scaled first output; and
- determining the result of the matrix operation using the scaled first output.

7. The system of claim 1, wherein:
- determining the first scaling factor for the first portion of the first matrix comprises determining a maximum absolute value of the first portion of the first matrix; and
- scaling the first portion of the first matrix using the first scaling factor comprises scaling values of the first portion of the first matrix using the maximum absolute value of the first portion of the first matrix.

8. The system of claim 1, wherein:
- the analog processor is configured to operate using a fixed-point representation of values; and
- programming the analog processor using the scaling of the first portion of the first matrix comprises converting values of the scaled first portion of the first matrix into the fixed-point representation.

9. The system of claim 8, wherein:
- the circuitry further comprises a digital controller configured to operate using a floating-point representation of values; and
- a dynamic range of the floating-point representation is greater than a dynamic range of the fixed-point representation.

10. The system of claim 1, wherein performing the one or more matrix operations to learn parameters of the machine learning model using the analog processor comprises amplifying or attenuating at least one analog signal used to perform a matrix operation of the one or more matrix operations.

11. The system of claim 10, wherein amplifying or attenuating the at least one analog signal used to perform the matrix operation comprises:
- distributing a zero pad among different portions of a matrix involved in the matrix operation; and
- programming of the analog processor using the matrix with the zero pad distributed among different portions of the matrix.

12. The system of claim 1, wherein performing the one or more matrix operations comprises performing the one or more matrix operations between a matrix of parameters of the machine learning model and a matrix of inputs to the machine learning model.

13. The system of claim 1, wherein performing the one or more matrix operations to learn the parameters of the machine learning model using the analog processor comprises performing the one or more matrix operations to determine outputs of the machine learning model for a set of inputs.

14. The system of claim 1, wherein performing the one or more matrix operations to learn the parameters of the machine learning model using the analog processor further comprises:
- performing the one or more matrix operations using the analog processor to determine a gradient of a loss function; and
- updating parameters of the machine learning model using the gradient of the loss function.

15. The system of claim 1, wherein the training comprises performing a plurality of iterations, wherein performing each of at least some of the plurality of iterations comprises:
- determining updated parameters of the machine learning model; and
- setting parameters of the machine learning model to an average of the updated parameters and parameters set at one or more previous iterations of the plurality of iterations.

16. The system of claim 1, wherein the matrix operation is a matrix multiplication.

17. The system of claim 1, wherein the analog processor is a photonic processor, wherein performing the one or more matrix operations to learn the parameters of the machine learning model using the analog processor comprises processing light using the photonic processor.

18. The system of claim 1, wherein the circuitry further comprises a digital controller.

19. The system of claim 1, wherein the machine learning model is a neural network.

20. A system comprising:
circuitry comprising an analog processor;
wherein the circuitry is configured to train a machine learning model, the training comprising performing one or more matrix operations to learn parameters of the machine learning model using the analog processor, wherein performing the one or more matrix operations to learn parameters of the machine learning model using the analog processor comprises amplifying or attenuating at least one analog signal used to perform a matrix operation of the one or more matrix operations, wherein amplifying or attenuating the at least one analog signal used to perform the matrix operation comprises:
programming the analog processor using multiple copies of a matrix involved in the matrix operation.

21. The system of claim 20, wherein performing the one or more matrix operations comprises performing the one or more matrix operations between a matrix of parameters of the machine learning model and a matrix of inputs to the machine learning model.

22. The system of claim 20, wherein performing the one or more matrix operations to learn the parameters of the machine learning model using the analog processor comprises performing the one or more matrix operations to determine outputs of the machine learning model for a set of inputs.

23. The system of claim 20, wherein performing the one or more matrix operations to learn the parameters of the machine learning model using the analog processor further comprises:
performing the one or more matrix operations using the analog processor to determine a gradient of a loss function; and
updating parameters of the machine learning model using the gradient of the loss function.

24. A method comprising:
training a machine learning model using a system comprising an analog processor, the training comprising performing one or more matrix operations to learn parameters of the machine learning model using the analog processor, wherein performing a matrix operation of the one or more matrix operations to learn the parameters of the machine learning model using the analog processor comprises:
determining a scaling factor for a first portion of a first matrix involved in the matrix operation;
scaling the first portion of the first matrix using the scaling factor for the first portion of the first matrix to obtain a scaled first portion of the first matrix;
programming the analog processor using the scaled first portion of the first matrix;
performing, by the analog processor programmed using the scaled first portion of the first matrix, the matrix operation to generate a first output; and
determining a result of the matrix operation using the first output generated by the analog processor.

25. The method of claim 24, wherein performing the matrix operation further comprises:
determining a scaling factor for a first portion of a second matrix involved in the matrix operation;
scaling the first portion of the second matrix using the scaling factor for the first portion of the second matrix to obtain a scaled first portion of the second matrix;
programming the analog processor using the scaled first portion of the second matrix; and
performing, by the analog processor programmed using the scaled first portion of the second matrix, the matrix operation to generate the first output.

26. A non-transitory computer-readable storage medium storing instructions that, when executed by circuitry including an analog processor, cause circuitry to perform:
training a machine learning model, the training comprising performing one or more matrix operations to learn parameters of the machine learning model using the analog processor, wherein performing a matrix operation of the one or more matrix operations to learn the parameters of the machine learning model using the analog processor comprises:
determining a scaling factor for a first portion of a first matrix involved in the matrix operation;
scaling the first portion of the first matrix using the scaling factor for the first portion of the first matrix to obtain a scaled first portion of the first matrix;
programming the analog processor using the scaled first portion of the first matrix;
performing, by the analog processor programmed using the scaled first portion of the first matrix, the matrix operation to generate a first output; and
determining a result of the matrix operation using the first output generated by the analog processor.

* * * * *